(12) United States Patent
Aipperspach et al.

(10) Patent No.: US 6,629,236 B1
(45) Date of Patent: Sep. 30, 2003

(54) MASTER-SLAVE LATCH CIRCUIT FOR MULTITHREADED PROCESSING

(75) Inventors: Anthony Gus Aipperspach, Rochester, MN (US); Merwin Herscher Alferness, Rochester, MN (US); Gregory John Uhlmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,581

(22) Filed: Nov. 12, 1999

(51) Int. Cl.[7] ................................................. G06F 9/38
(52) U.S. Cl. ........................ 712/228; 709/108; 327/203
(58) Field of Search ......................... 326/103; 327/203; 709/108; 712/228

(56) References Cited

U.S. PATENT DOCUMENTS

| | | | |
|---|---|---|---|
| 4,276,488 A | * | 6/1981 | Benedict et al. ............ 327/202 |
| 5,345,588 A | | 9/1994 | Greenwood et al. |
| 5,353,418 A | | 10/1994 | Nikhil et al. |
| 5,421,014 A | | 5/1995 | Bucher |
| 5,499,349 A | | 3/1996 | Nikhil et al. |
| 5,778,243 A | | 7/1998 | Aipperspach et al. |
| 5,799,188 A | | 8/1998 | Manikundalam et al. |
| 5,809,554 A | | 9/1998 | Benayon et al. |
| 5,907,702 A | | 5/1999 | Flynn et al. |
| 6,341,347 B1 | * | 1/2002 | Joy et al. .................... 712/228 |

OTHER PUBLICATIONS

Weste et al., *Principles of CMOS VLSI Design: A Systems Perspective*, Addison–Wesley, 1985, pp. 212–215.*

* cited by examiner

*Primary Examiner*—William M. Treat
(74) *Attorney, Agent, or Firm*—Roy W. Truelson

(57) ABSTRACT

A master-slave latch circuit for a multithreaded processor stores information for multiple threads. The basic cell contains multiple master elements, each corresponding to a respective thread, selection logic coupled to the master elements for selecting a single one of the master outputs, and a single slave element coupled to the selector logic. Preferably, the circuit supports operation in a scan mode for testing purposes. In scan mode, one or more elements which normally function as master elements, function as slave elements. When operating in scan mode using this arrangement, the number of master elements in the pair of cells equals the number of slave elements, even though the number of master elements exceeds the number of slave elements during normal operation, permitting data to be successively scanned through all elements of the circuit. In an alternative embodiment, elements function as in scan mode during a HOLD mode of operation, and a feedback loop controlled by a HOLD signal is added to each pair of master/slave elements. The feedback loop drives the master element with the value of the slave.

17 Claims, 65 Drawing Sheets

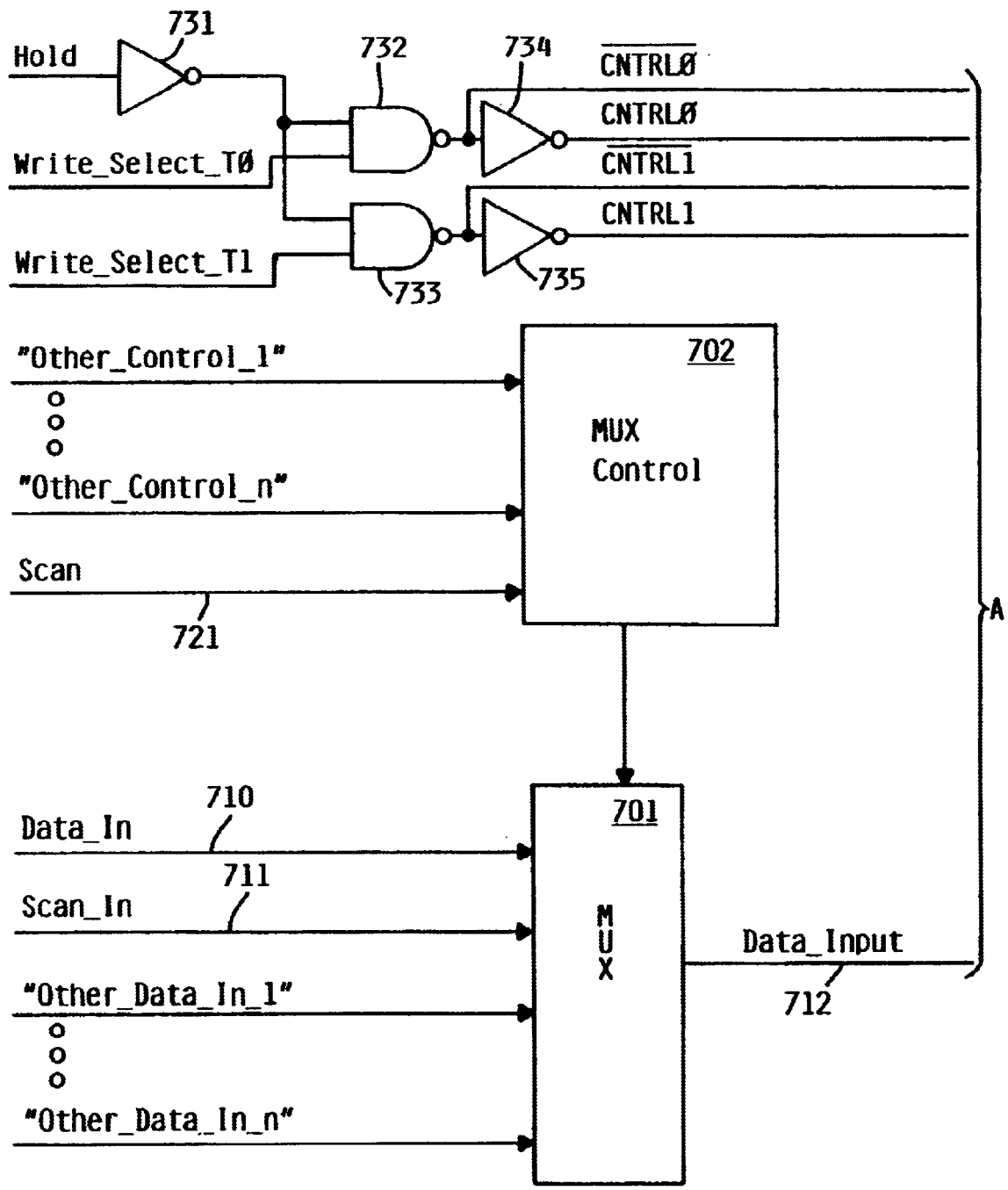
FIG. 7A-I

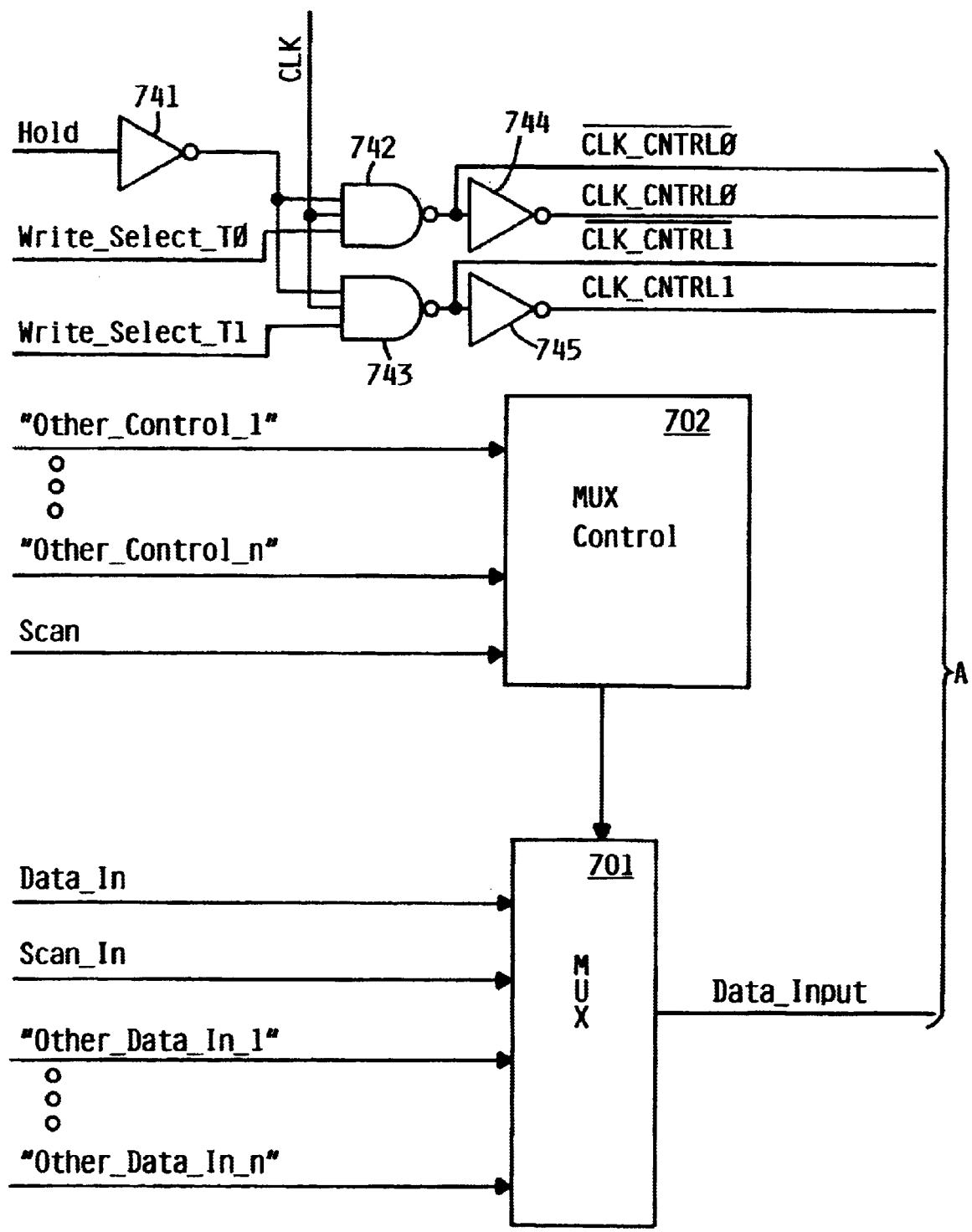
FIG. 7B-I

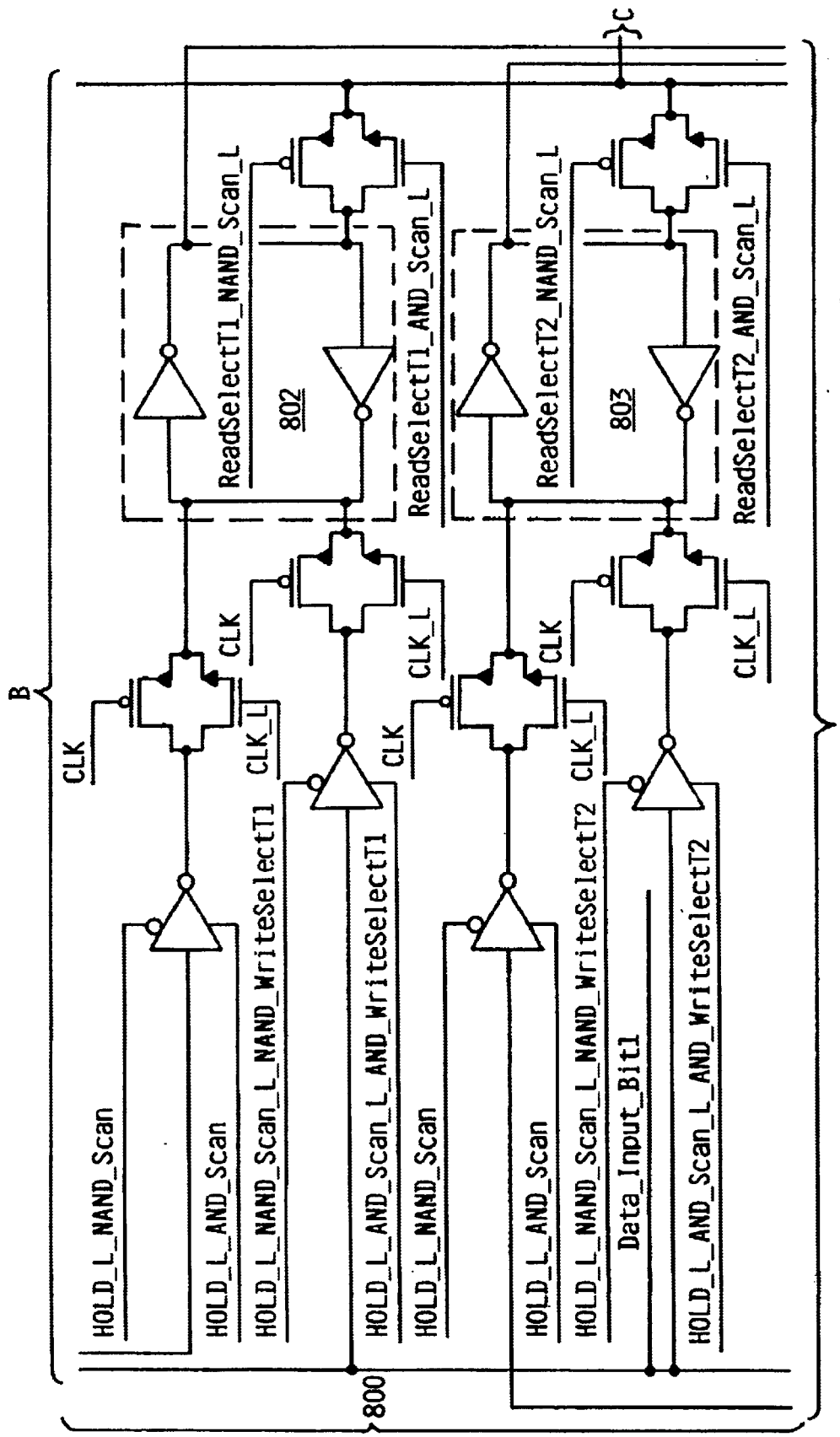
FIG. IOA-2

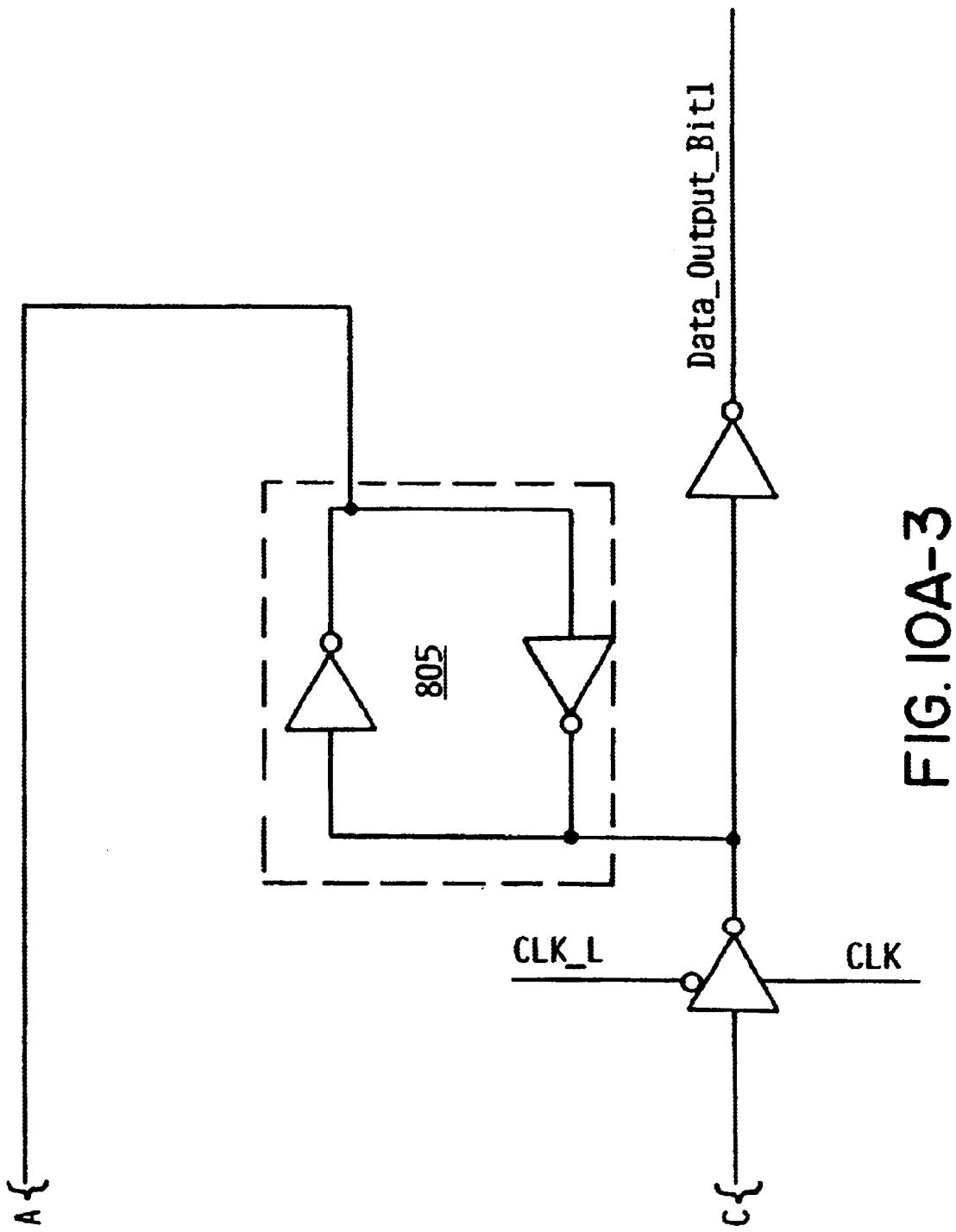
FIG. IOA-3

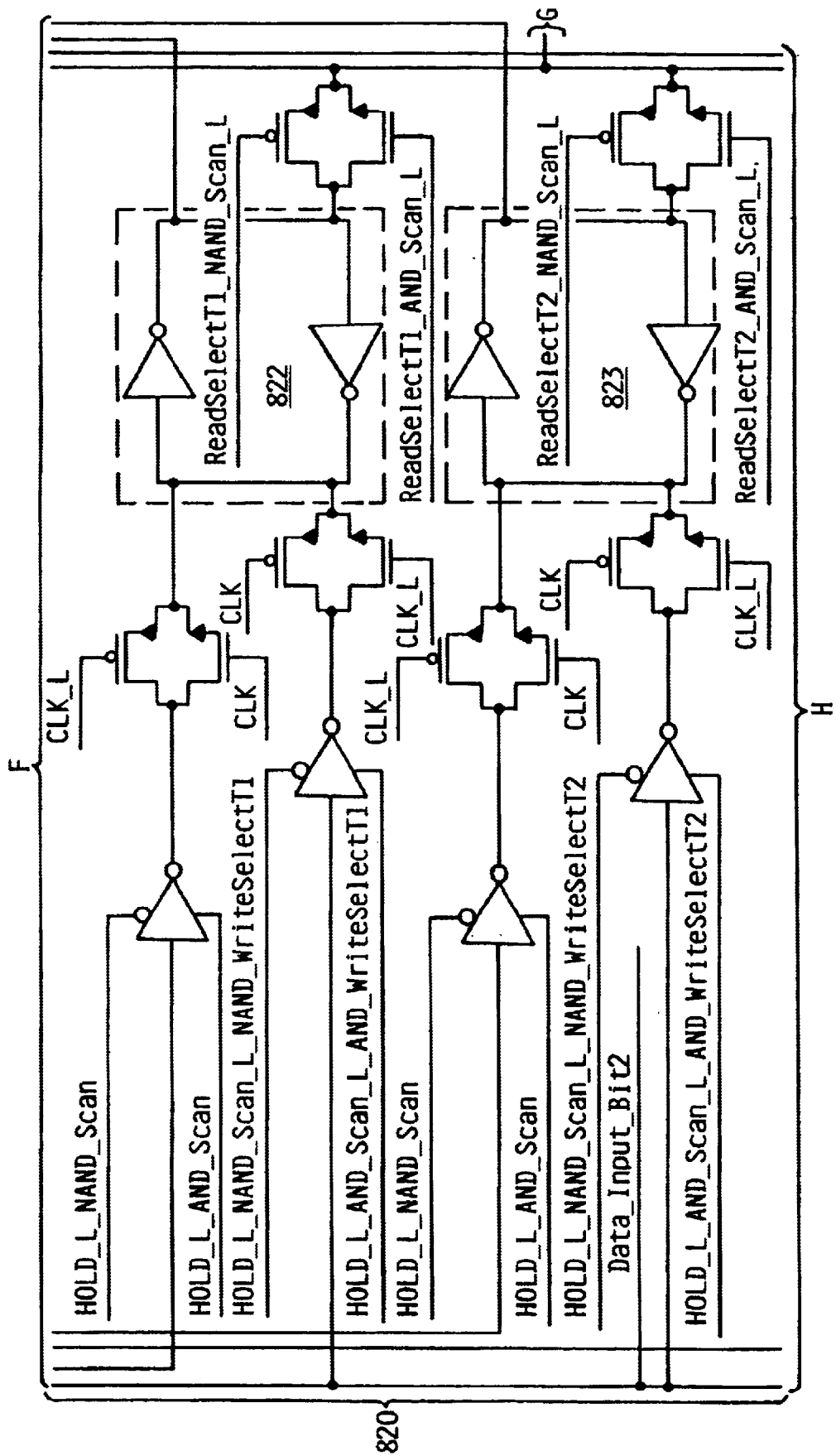
FIG. IOA-6

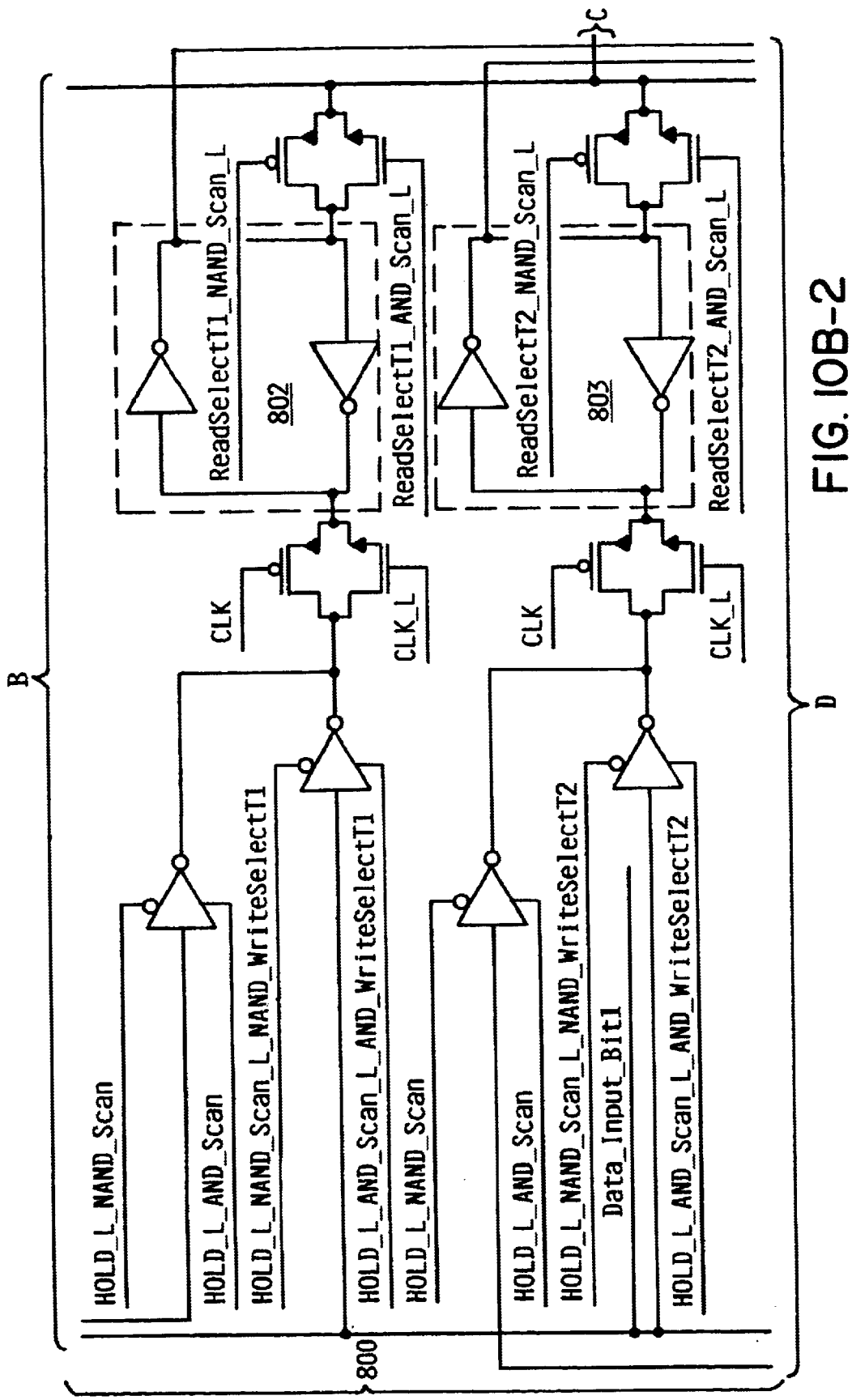
FIG. IOB-2

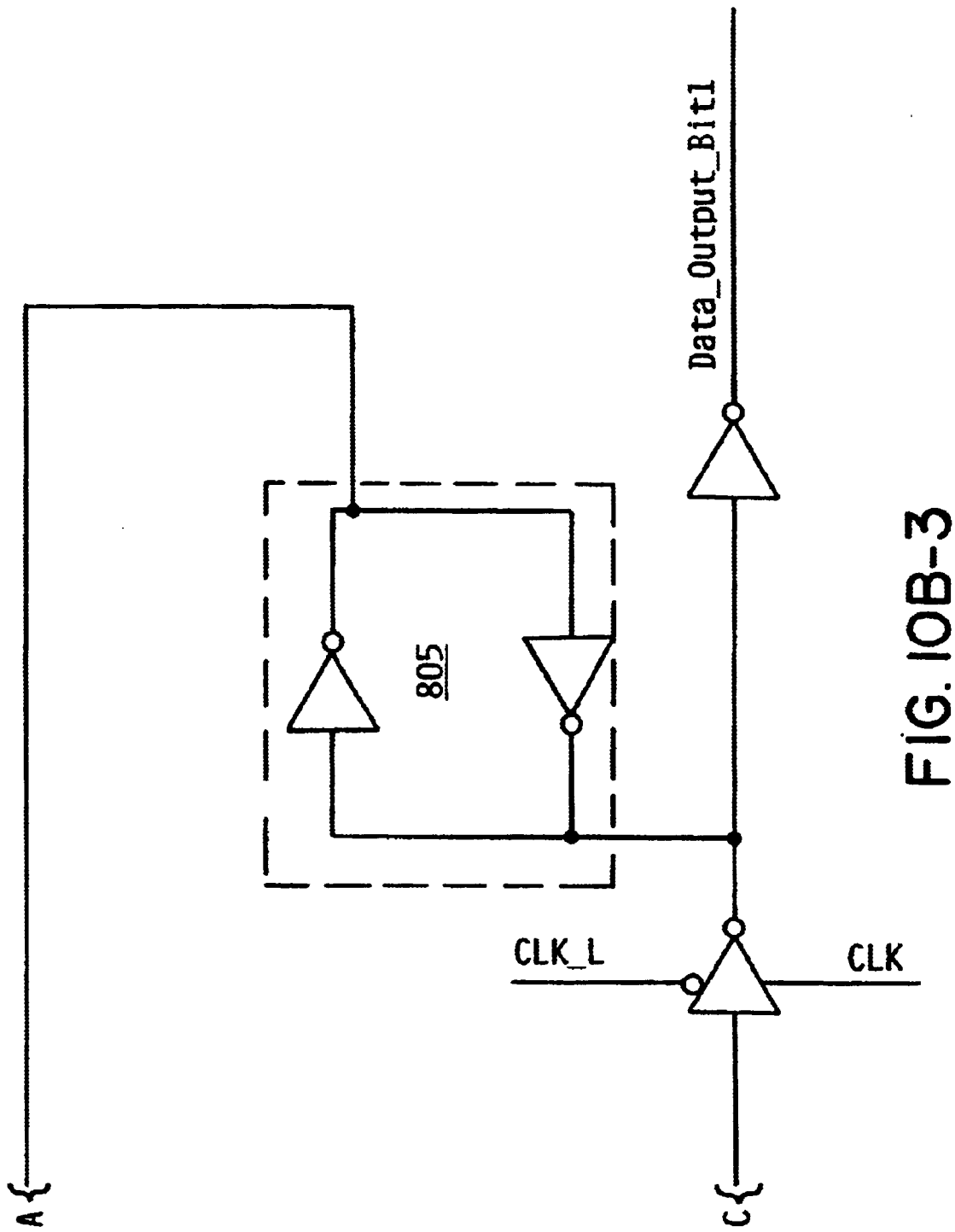
FIG. IOB-3

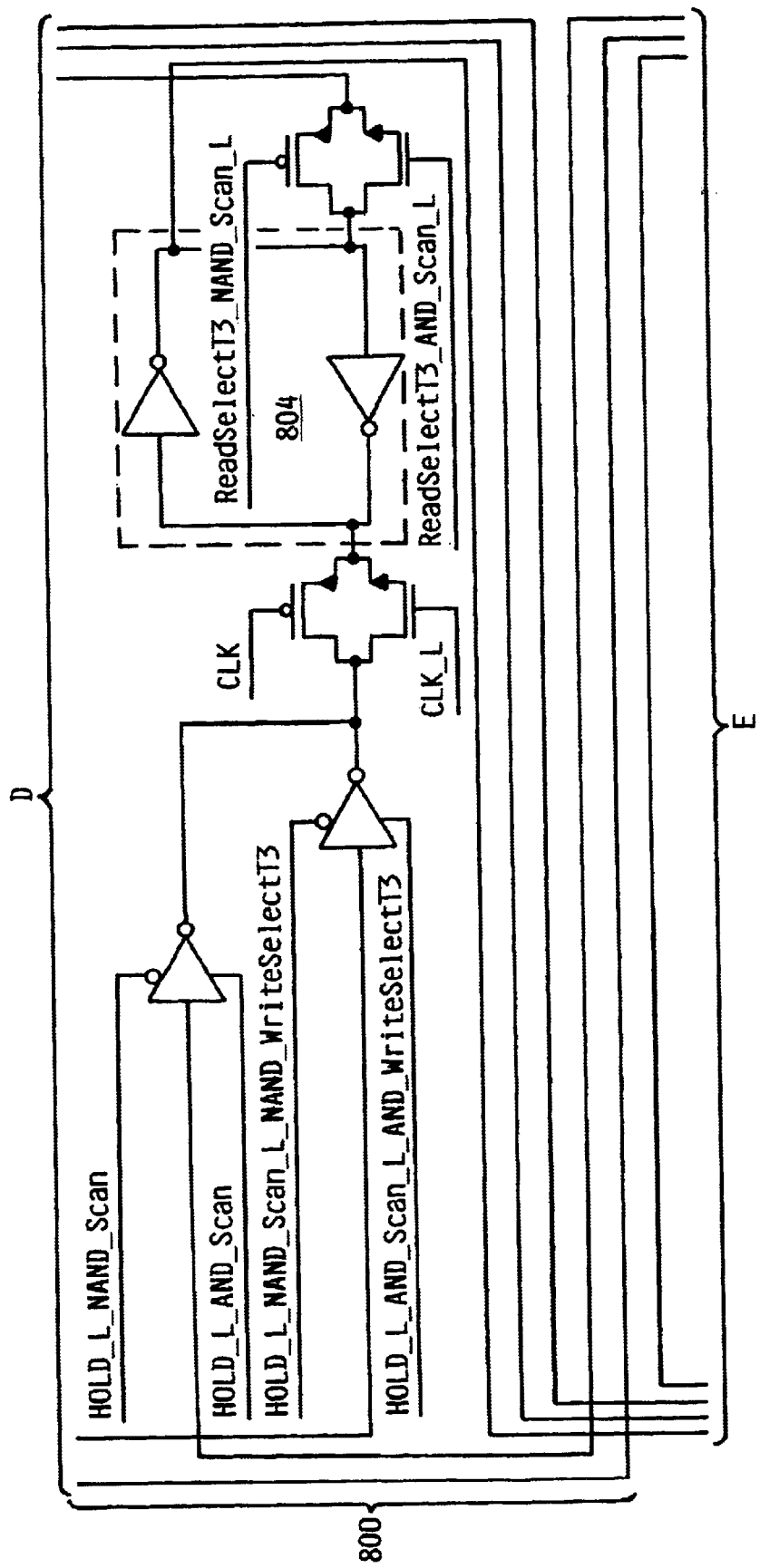
FIG. IOB-4

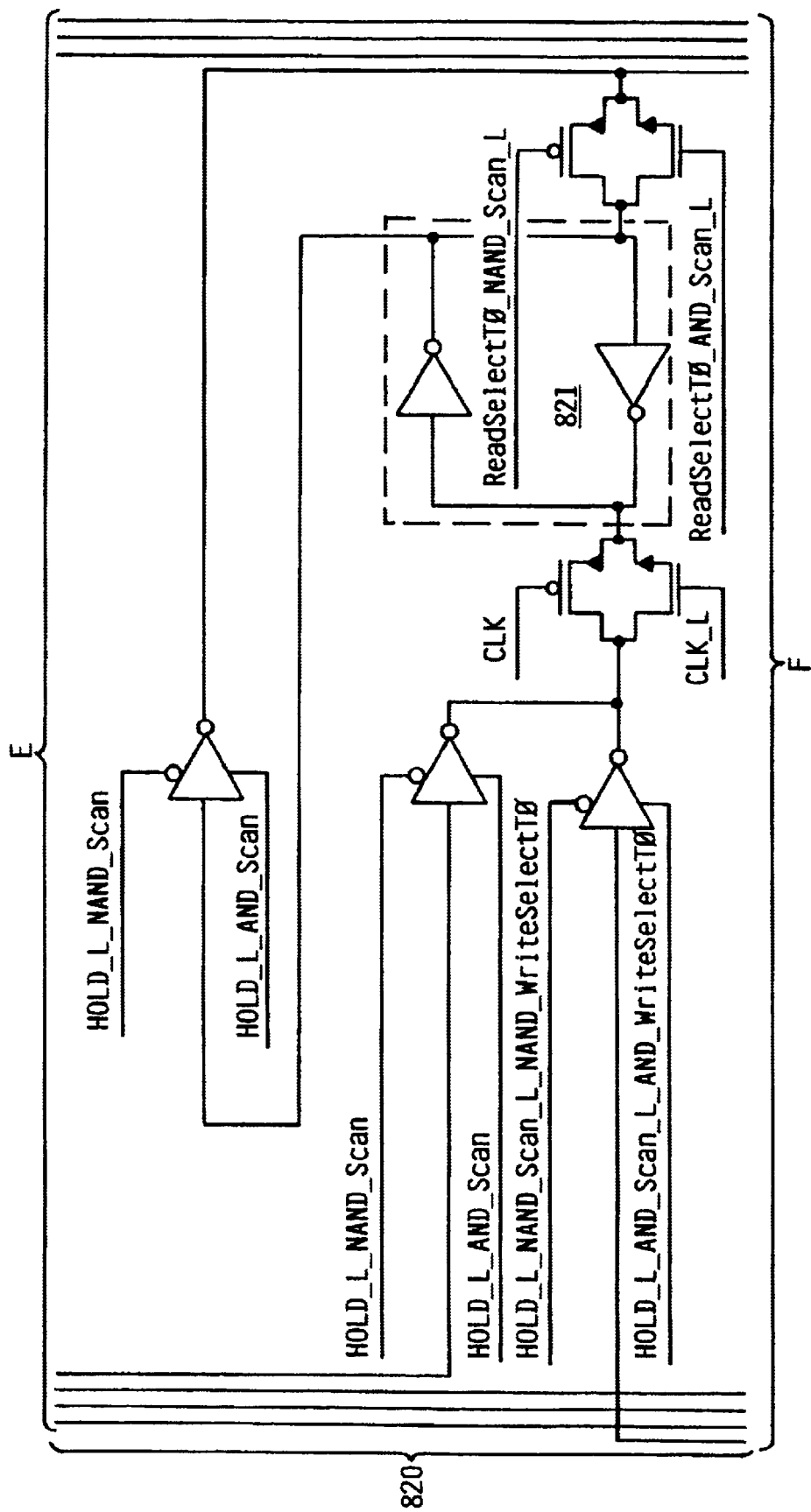
FIG. IOB-5

MASTER-SLAVE LATCH CIRCUIT FOR MULTITHREADED PROCESSING

FIELD OF THE INVENTION

The present invention relates to digital data processing systems, and in particular to high-speed latches used in register memory of digital computing devices.

BACKGROUND OF THE INVENTION

A modem computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of circuits, and by various other techniques. However, designers can see that physical size reductions can not continue indefinitely, and there are limits to their ability to continue to increase clock speeds of processors. Attention has therefore been directed to other approaches for further improvements in overall speed of the computer system.

Without changing the clock speed, it is possible to improve system throughput by using multiple processors. The modest cost of individual processors packaged on integrated circuit chips has made this approach practical. However, one does not simply double a system's throughput by going from one processor to two. The introduction of multiple processors to a system creates numerous architectural problems. For example, the multiple processors will typically share the same main memory (although each processor may have its own cache). It is therefore necessary to devise mechanisms that avoid memory access conflicts, and assure that extra copies of data in caches are tracked in a coherent fashion. Furthermore, each processor puts additional demands on the other components of the system as storage, I/O, memory, and particularly, the communications buses that connect various components. As more processors are introduced, there is greater likelihood that processors will spend significant time waiting for some resource being used by another processor.

Without delving into further architectural complications of multiple processor systems, it can still be observed that there are many reasons to improve the speed of the individual CPU, whether a system uses multiple CPUs or a single CPU. If the CPU clock speed is given, it is possible to further increase the work done by the individual CPU, i.e., the number of operations executed per unit time, by increasing the average number of operations executed per clock cycle.

In order to boost CPU speed, it is common in high performance processor designs to employ instruction pipelining, as well as one or more levels of cache memory. Pipeline instruction execution allows subsequent instructions to begin execution before previously issued instructions have finished. Cache memories store frequently used and other data nearer the processor and allow instruction execution to continue, in most cases, without waiting the full access time of a main memory access.

Pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be executed until the data becomes available in the cache. Maintaining the requisite data in the cache necessary for continued execution and sustaining a high hit ratio (i.e., the number of requests for data compared to the number of times the data was readily available in the cache), is not trivial, especially for computations involving large data structures. A cache miss can cause the pipelines to stall for several cycles, and the total amount of memory latency will be severe if the data is not available most of the time. Although memory devices used for main are becoming faster, the speed gap between such memory chips and high-end processors is becoming increasingly larger. Accordingly, a significant amount of execution time in current high-end processor designs is spent waiting for resolution of cache misses.

Reducing the amount of time that the processor is idle waiting for certain events, such as re-filling a pipeline or retrieving data from memory, will increase the average number of operations per clock cycle. One architectural innovation directed to this problem is called "hardware multithreading" or simply "multithreading". This technique involves concurrently maintaining the state of multiple executable sequences of instructions, called threads, within a single CPU. As a result, it is relatively simple and fast to switch threads.

The term "multithreading" as defined in the computer architecture community is not the same as the software use of the term. In the case of software, "multithreading" refers to one task being subdivided into multiple related threads. In the hardware definition, the threads being concurrently maintained in a processor are merely arbitrary sequences of instructions, which don't necessarily have any relationship with one another. Therefore the term "hardware multithreading" is often used to distinguish the two used of the term. As used herein, "multithreading" will refer to hardware multithreading.

There are two basic forms of multithreading. In the more traditional form, sometimes called "fine-grained multithreading", the processor executes N threads concurrently by interleaving execution on a regular basis, such as interleaving cycle-by-cycle. This creates a gap in time between the execution of each instruction within a single thread, which removes the need for the processor to wait for certain short term latency events, such as re-filling an instruction pipeline. In the second form of multithreading, sometimes called "coarse-grained multithreading", multiple instructions in a single thread are sequentially executed until the processor encounters some longer term latency event, such as a cache miss, which triggers a switch to another thread.

Like any innovation, multithreading comes with a price. Typically, multithreading involves replicating the processor registers for each thread in order to maintain the state of multiple threads. For instance, for a processor implementing the architecture sold under the trade name PowerPC™ to perform multithreading, it will generally be necessary to replicate the following registers for each thread: general purpose registers, floating point registers, condition registers, floating point status and control register, count register, link register, exception register, save/restore registers, and special purpose registers. Additionally, the special buffers, such as a segment lookaside buffer, can be replicated or each entry can be tagged with the thread number (or alternatively, be flushed on every thread switch). Some branch prediction mechanisms, e.g., the correlation register and the return stack, should also be replicated.

The replication of so many registers consumes a significant amount of chip area. Since chip area is typically in great demand, the hardware designer must face difficult choices. One can reduce cache sizes, reduce the number of general purpose registers available to each thread, or make other significant concessions, but none of these choices is desirable. There is a need for an improved method of dealing with the proliferation of registers which accompanies multithreading.

SUMMARY OF THE INVENTION

It is therefore an object of the present invention to provide an improved multithreaded processor.

Another object of this invention is to provide an improved master-slave latch circuit for supporting hardware multithreading operation of a digital data computing device.

Another object of this invention is to reduce the size and complexity of latch circuitry for supporting hardware multithreading operation of a digital data computing device.

In a digital processor supporting hardware multithreading, a master-slave latch circuit stores information for multiple threads. The basic cell contains multiple master elements, each corresponding to a respective thread, selection logic coupled to the master elements for selecting a single one of the master outputs, and a single slave element coupled to the selector logic.

In the preferred embodiment, the circuit supports operation in a scan mode for testing purposes. In scan mode, cells are paired. One cell of each pair contains one or more elements which normally function as master elements, but which may also function as slave elements during scan mode operation. These dual function elements are coupled to master elements of the other cell of the pair. When operating in scan mode using this arrangement, the number of master elements in the pair of cells equals the number of slave elements, even though the number of master elements exceeds the number of slave elements during normal operation. This permits data to be successively scanned through all elements of the circuit, ensuring thorough testing.

In an alternative embodiment, elements function as in scan mode during a HOLD mode of operation, and a feedback loop controlled by a HOLD signal is added to each pair of master/slave elements. The feedback loop drives the master element with the value of the slave.

The details of the present invention, both as to its structure and operation, can best be understood in reference to the accompanying drawings, in which like reference numerals refer to like parts, and in which:

DESCRIPTION OF THE PREFERRED EMBODIMENT

Figure 1:
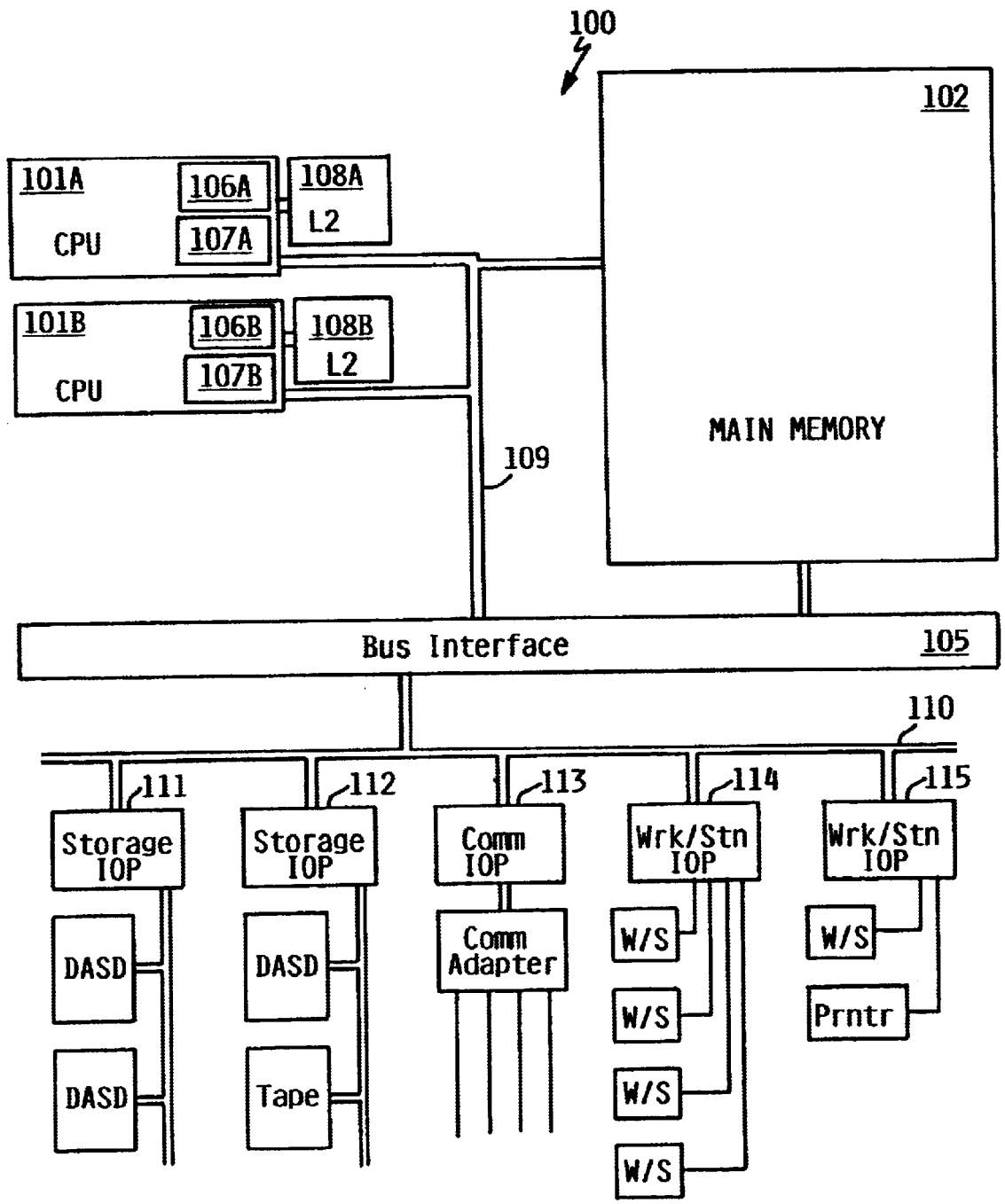
FIG. 1 shows the major hardware components of a computer system for utilizing the multithreaded master-slave latch circuit according to the preferred embodiment of the present invention

The major hardware components of a computer system 100 for utilizing the multithreaded master-slave latch circuit according to the preferred embodiment of the present invention are shown in FIG. 1. Central processing units (CPUs) 101A and 101B support hardware multithreaded operation in performing basic machine processing function on instructions and data from main memory 102. Each processor contains respective internal level one instruction caches 106A, 106B (L1 I-cache), and level one data caches 107A, 107B (L1 D-cache). Each L1 I-cache 106A, 106B stores instructions for execution by its CPU. Each L1 D-cache stores data (other than instructions) to be processed by its CPU. Each CPU 101A, 101 B is coupled to a respective level two cache (L2-cache) 108A, 108B, which can be used to hold both instructions and data. Memory bus 109 transfers data among CPUs and memory. CPUs and memory also communicate via memory bus 109 and bus interface 105 with system I/O bus 110. Various I/O processing unist (IOPs) 111–115 attach to system I/O bus 110 and support communication with a variety of storage and I/O devices, such as direct access storage devices (DASD), tape drives, workstations, printers, and remote communication lines for communicating with remote devices or other computer systems. For simplicity, CPU, L1 I-cache, L1 D-cache, and L2 cache are herein designated generically by reference numbers 101, 106, 107 and 108, respectively. While various buses are shown in FIG. 1, it should be understood that these are intended to represent various communications paths at a conceptual level, and that the actual physical configuration of buses may vary, and in fact may be considerably more complex. It should further be understood that FIG. 1 is intended as but one example of a system configuration, and that the actual number, type and configuration of components in a computer system may vary. In particular, the present invention could be employed in systems having a single multithreaded CPU, or in systems have multiple multithreaded CPUs.

Each CPU 101 is capable of maintaining the state of multiple threads. CPU 101 will typically include a plurality of general purpose registers for storing data, and various special-purpose registers for storing conditions, intermediate results, instructions, and other information which collectively determines the state of the processor. This information is replicated for each thread supported by CPU 101.

Additional background information concerning multithreaded processor design is contained in the following commonly assigned copending U.S. patent applications, herein incorporated by reference: Ser. No. 09/266,133, filed Mar. 10, 1999, entitled Instruction Cache for Multithreaded Processor, now U.S. Pat. No. 6,161,166, Ser. No. 08/976,533, filed Nov. 21, 1997, entitled Accessing Data from a Multiple Entry Fully Associative Cache Buffer in a Multithread Data Processing System now U.S. Pat. No. 6,263,604, Ser. No. 08/966,706, filed Nov. 10, 1997, entitled Effective-To-Real Address Cache Managing apparatus and Method, now U.S. Pat. No. 6,021,481, Ser. No. 08/958,718, filed Oct. 23, 1997, entitled Altering Thread Priorities in a Multithreaded Processor, now U.S. Pat. No. 6,112,544; Ser. No. 08/958,716, filed Oct. 23, 1997, entitled Method and Apparatus for Selecting Thread Switch Events in a Multithreaded Processor Ser. No. 08/957,002, filed Oct. 23, 1997, entitled Thread Switch Control in a Multithreaded Processor System Ser. No. 08/956,875, filed Oct. 23, 1997, entitled An Apparatus and Method to Guarantee Forward Progress in a Multithreaded Processor, now U.S. Pat. No. 6,105,051; Ser. No. 08/956,577, filed Oct. 23,1997, entitled Method and Apparatus To Force a Thread Switch in a Multithreaded processor, now U.S. Pat. No. 6,026,157; Ser. No. 08/773,572, filed Dec. 27, 1996, entitled Background Completion of Instruction and Associated Fetch Request in a Multithread Processor, now U.S. Pat. No. 6,088,788. While the multithreaded processor design described in the above applications is a coarse-grained multithreading implementation, it should be understood that the present invention is applicable to either coarse-grained or fine-grained multithreading.

Figure 2:
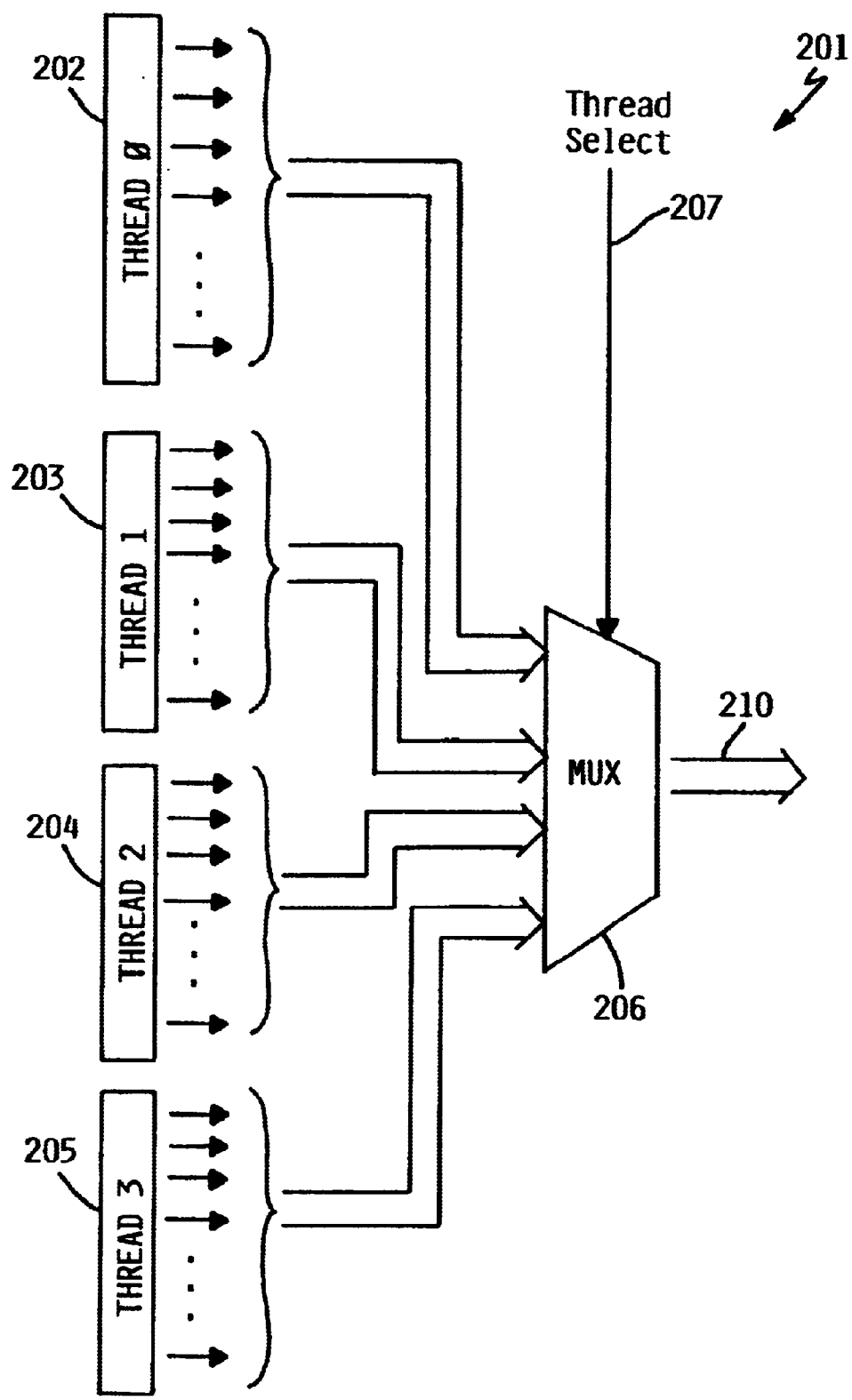
FIG. 2 is a conceptual high-level view of a typical register which records state information in a multithreaded processor.
Figure 3A:
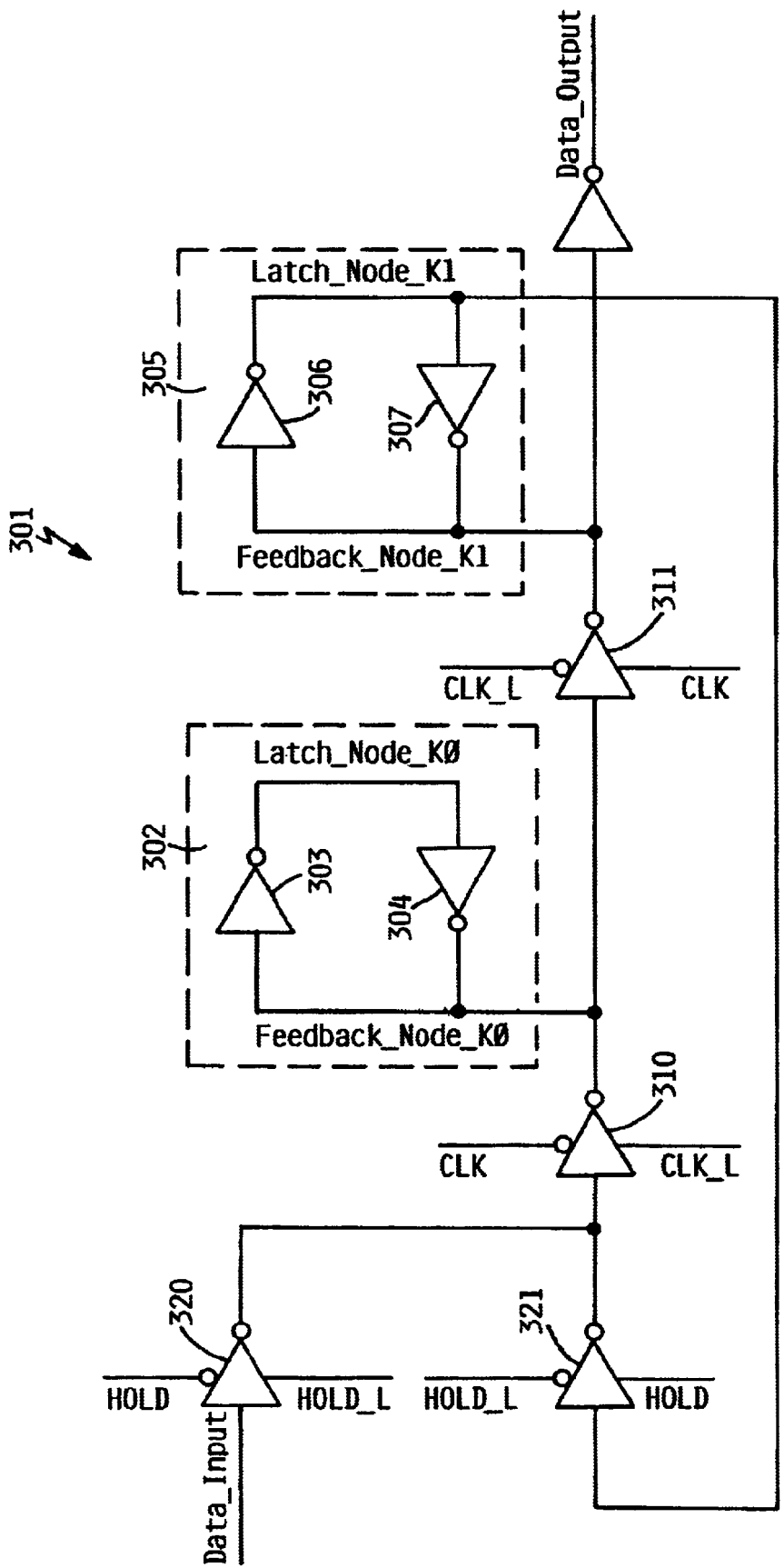
FIG. 3 shows a typical prior art master-slave latch circuit.
Figure 3B:
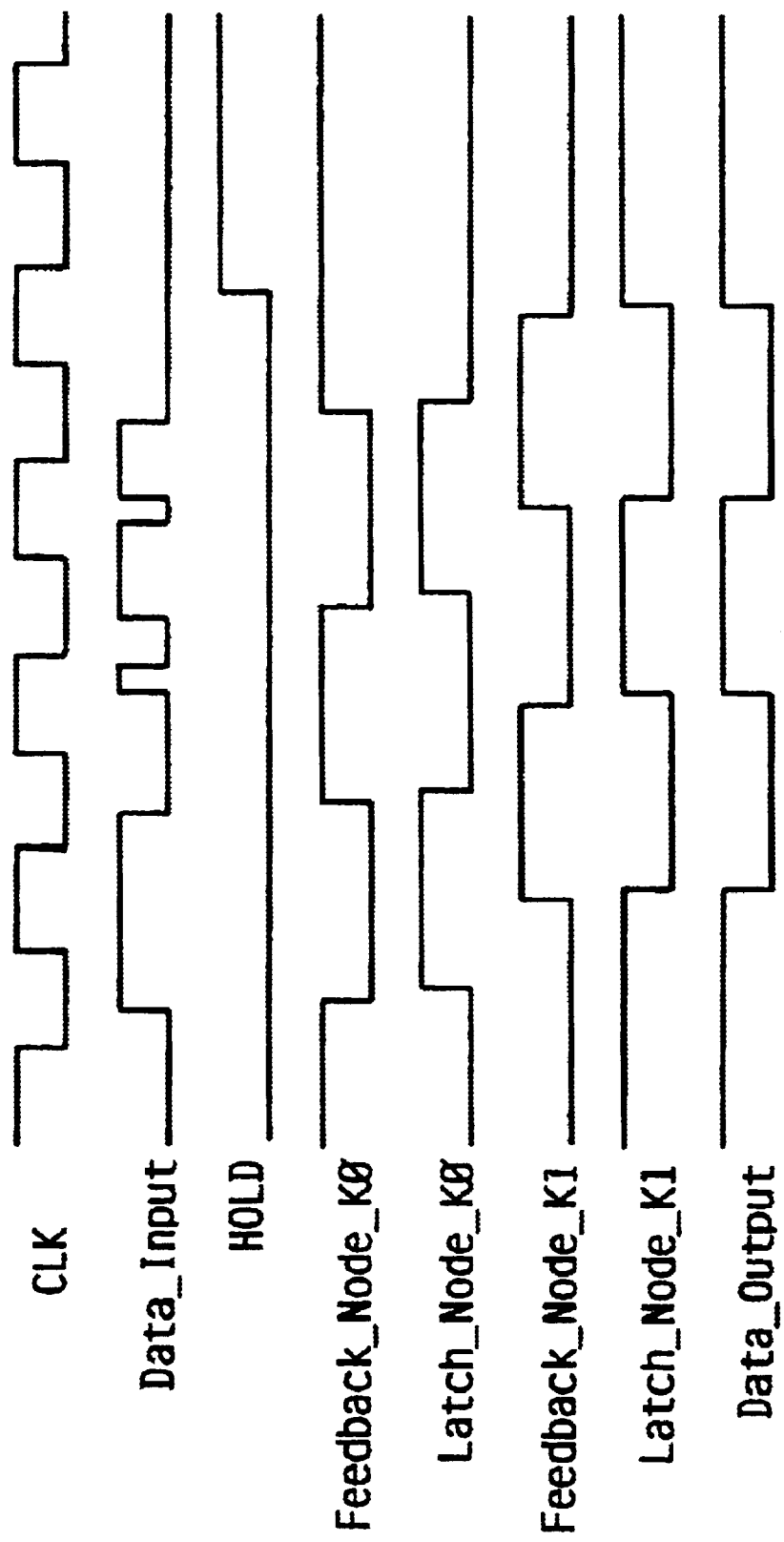

FIG. 2 is a conceptual high-level view of a typical register which records state information in a multithreaded processor. In the example of FIG. 2, four threads are supported, it being understood that the number of supported threads may vary. Where hardware multithreading is used, it is necessary to maintain the register state of each thread supported by the hardware. Therefore, a separate register portion 202–205 is required for each thread. Each register portion 202–205 typically contains multiple bits, although a single-bit register is possible. At any given instant, only one thread state is needed by the processor. This is typically, although not always, the active thread. I.e., in fine-grained multithreading, where processor cycles are allocated to threads on a round-robin basis, only the register information corresponding to the thread for the current machine cycle is typically needed. In coarse-grained multithreading, where the active thread changes from time to time upon a cache miss, interrupt or similar event, only the register information corresponding to the currently active thread is typically needed. In either case, a thread select input 207 to multiplexer logic 206 selects the contents of one of the register portions 202–205 for output on output lines 210.

It will be understood that FIG. 2 represents a multithreading register configuration at a conceptual level. A register is typically implemented as a set of individual bit storage circuits. While FIG. 2 shows each register portion 202–205 corresponding to a thread as a separate entity for ease of understanding, in fact the individual bit circuits of the registers would typically be physically interleaved on a chip, i.e., bit 0 of register portion 202 would be physically adjacent bit 0 of register portions 203, 204 and 205; the respective bit 1 circuits would all be physically adjacent each other, etc.

For certain types of state information, it is desirable to store the bits in master-slave latches. In particular, information which may need to be read and written to on the same processor clock cycle is often stored in such a circuit.

Figures 1, 4A:
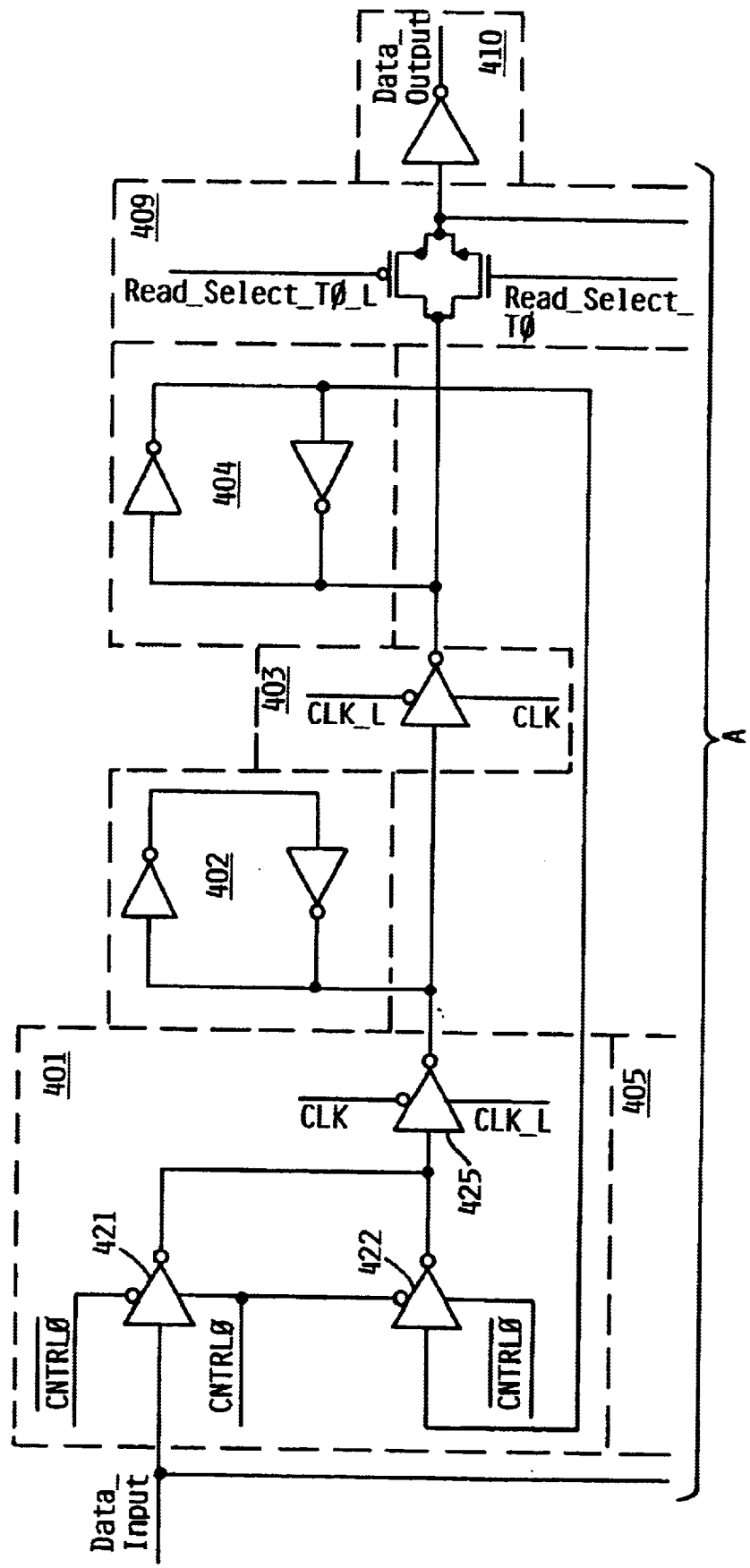
FIG. 4A shows a prior art implementation of a master-slave latch circuit in a multithreaded register environment, and functional waveforms associated therewith.
Figures 2, 4A:
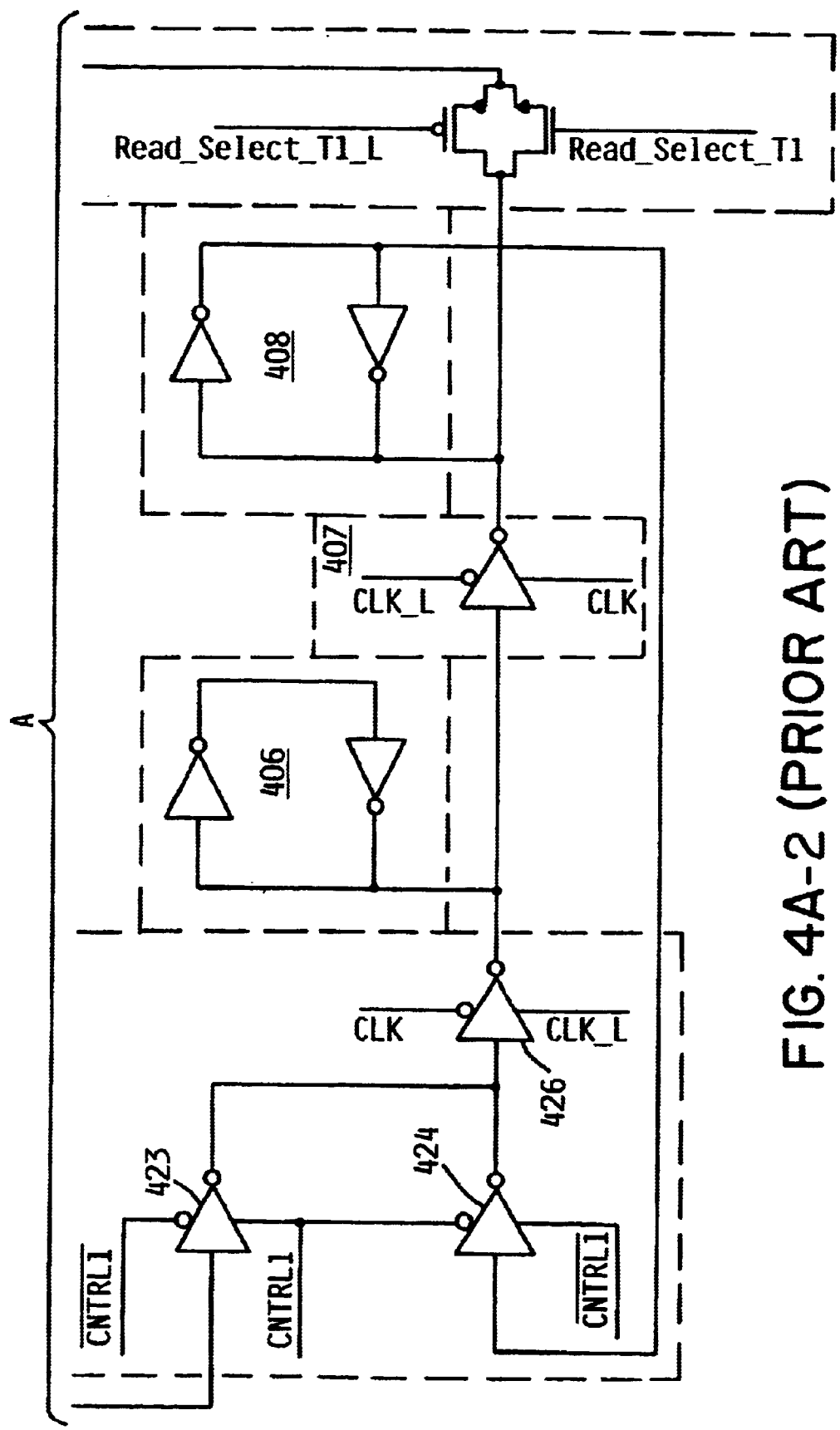
Figures 3, 4A:
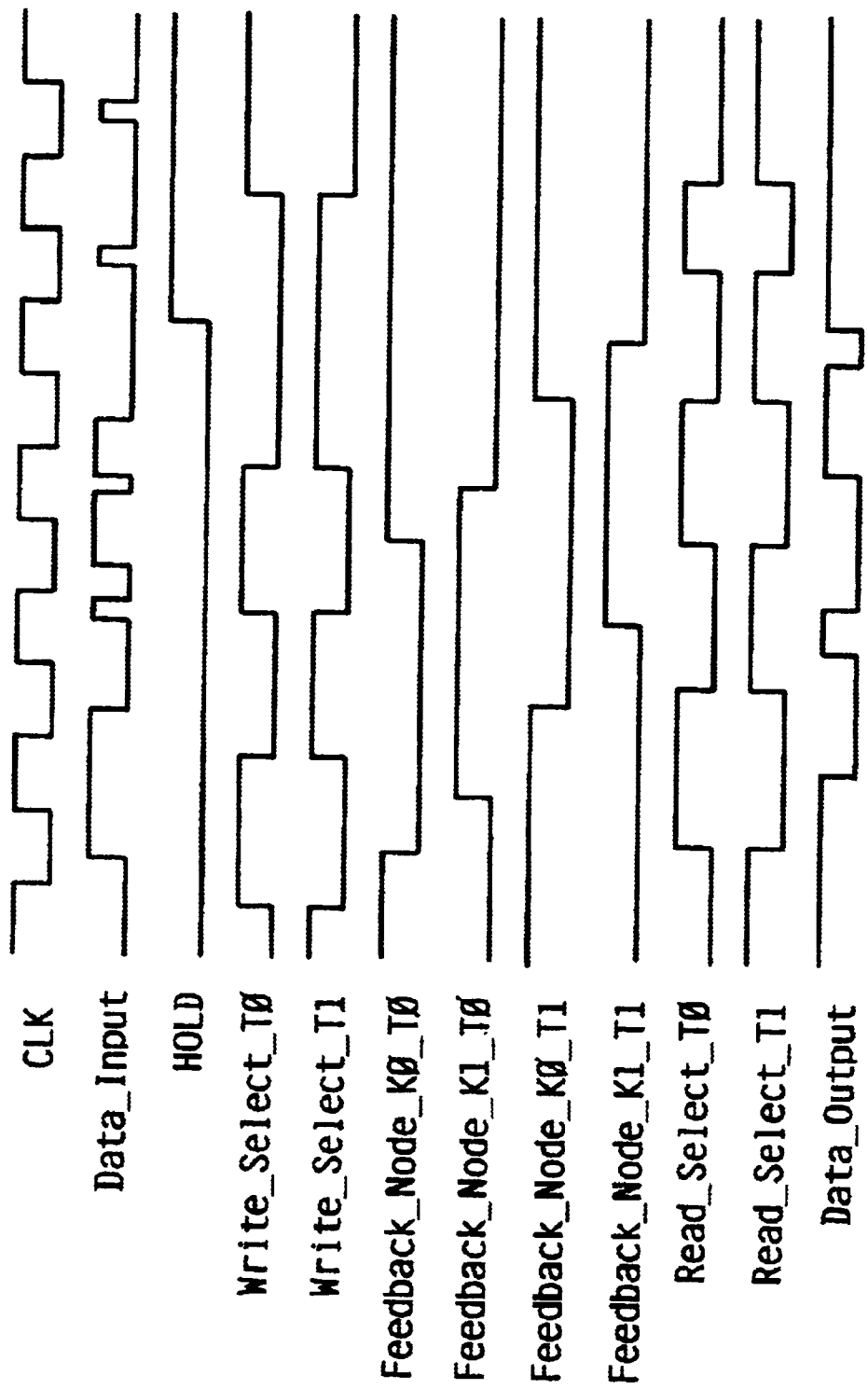

FIG. 3 shows a typical master-slave latch circuit 301, also known as a K0–K1 latch, as is well known in the art, and functional waveforms associated therewith. Master-slave latch circuit 301 contains a master (K0) storage element 302, comprising K0 latch inverter 303 and K0 feedback inverter 304, and a slave (K1) storage element 305, comprising K1 latch inverter 306 and K1 feedback inverter 307. Master storage element 302 is set by K0 clocked inverter 310, which drives an output when the processor clock (CLK) is low. Slave storage element 305 is set by K1 clocked inverter 311, which drives an output when the processor clock is high. (In fact, processor clocks may have additional phases to avoid timing overlaps which could corrupt data, but for purposes of understanding the present application, one may simply assume that clocked inverters on different clock phases, e.g., inverters 310 and 311, are never active simultaneously). A pair of gated inverters 320, 321 coupled to the input of clocked inverter 310 are controlled by a HOLD signal; these determine whether the master element will be set with new data from the Data_Input line, or with be refreshed with existing data in the latch from latch node K1.

It will be appreciated by those skilled in the art that there are many different variations of master-slave latch circuit.

However, in general they function in a similar manner, i.e., data is clocked into a master element, and then a slave element, on different phases of a clock, thus preventing input data from going directly through the latch to the output on the same clock cycle. This characteristic enables the existing data in the latch to be read on the same cycle that new data is written to the latch. The present invention is not necessarily limited to the type of master-slave latch circuit shown in FIG. 3, and could be applied to different types of master-slave latch circuits.

Figure 4B:
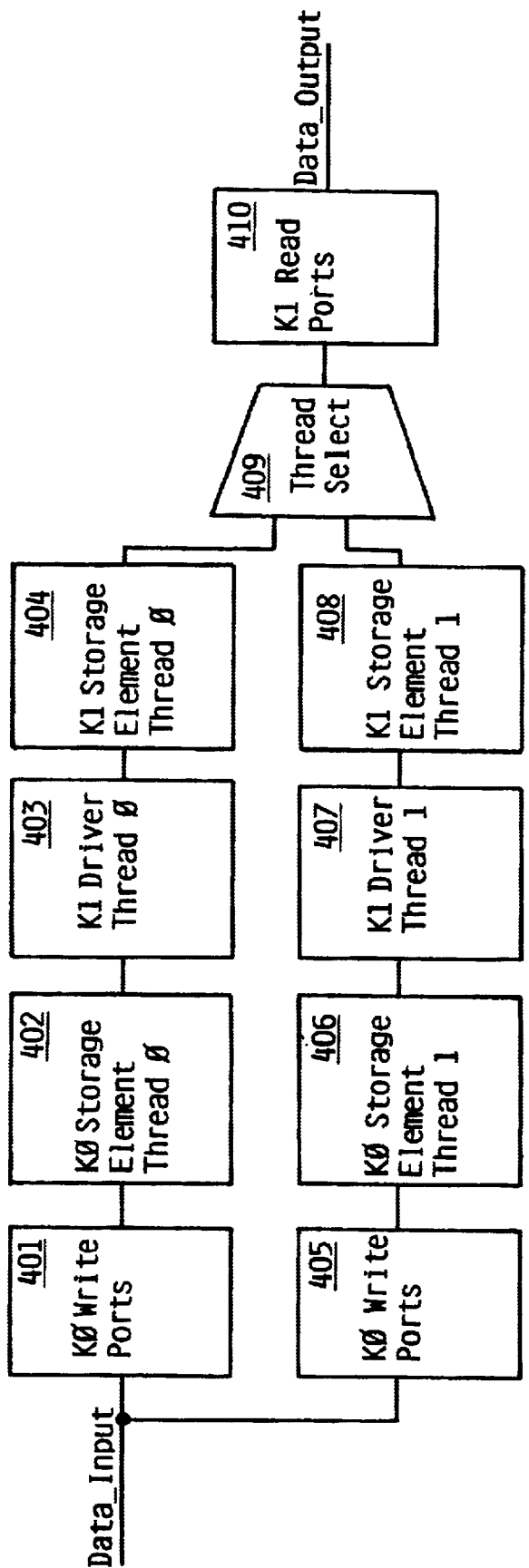
FIG. 4B shows the prior art master-slave latch circuit of FIG. 4A at a higher level of abstraction.

FIGS. 4A and 4B shows a straightforward implementation of the master-slave latch circuit 301 for a multithreaded register environment, and functional waveforms associated therewith. FIG. 4A shows the detailed circuit and functional waveforms, while FIG. 4B shows the same circuit at a higher level of abstraction. In the example of FIG. 4, two threads are supported, it being understood that this circuit could be generalized for a larger number of threads. The multi-threaded latch circuit contains two K0–K1 latch circuits similar to that of FIG. 3, one for each thread. I.e., circuit elements 401–404 constitute a K0–K1 latch circuit for thread 0, while circuit elements 405–408 constitute a K0–K1 latch circuit for thread 1. As shown in the high-level view of FIG. 4B, circuit may be conceptualized as a pair of write ports 401,405, each of which is physically implemented as a pair of gated inverters 421–424 which provide input to a clocked inverter 425, 426, the clocked inverted serving as a driver for the K0 storage elements 402, 406. Because a common data input line feeds both latch circuits, the data on this line will generally be intended for the Thread 0 latch or the Thread 1 latch, but not both. Therefore the gated inverters 421–424 (equivalents of gated inverted 320 and 321 in FIG. 3) are gated by signals designated CNTRL0 and CNTRL1, where CNTRL0=(-HOLD AND Write_Select_T0), and CNTRL1=(-HOLD AND Write_Select_T1). Each K0 storage element 402, 406 is physically implemented as a pair of inverters driving each other's input, as shown. The K0 storage elements provide input to respective K1 drivers 403, 407, which are implemented as clocked inverters. These provide input to the K1 storage cells 404,408, implemented as shown. Each of the two latch circuits serve as input to thread select logic 409, which in this embodiment is a pair of transmission gates controlled by a thread select signal. The read port 410 for the latch is represented as a single inverter driver coupled to the output of the thread select logic.

In accordance with the present invention, the number of transistors required in a multithreaded master-slave latch as illustrated by FIG. 4A is reduced by placing the thread select logic between the K0 storage elements and the K1 driver. As a result, only one K1 driver, and only one K1 storage element, are required, regardless of the number of threads supported.

Figure 5:
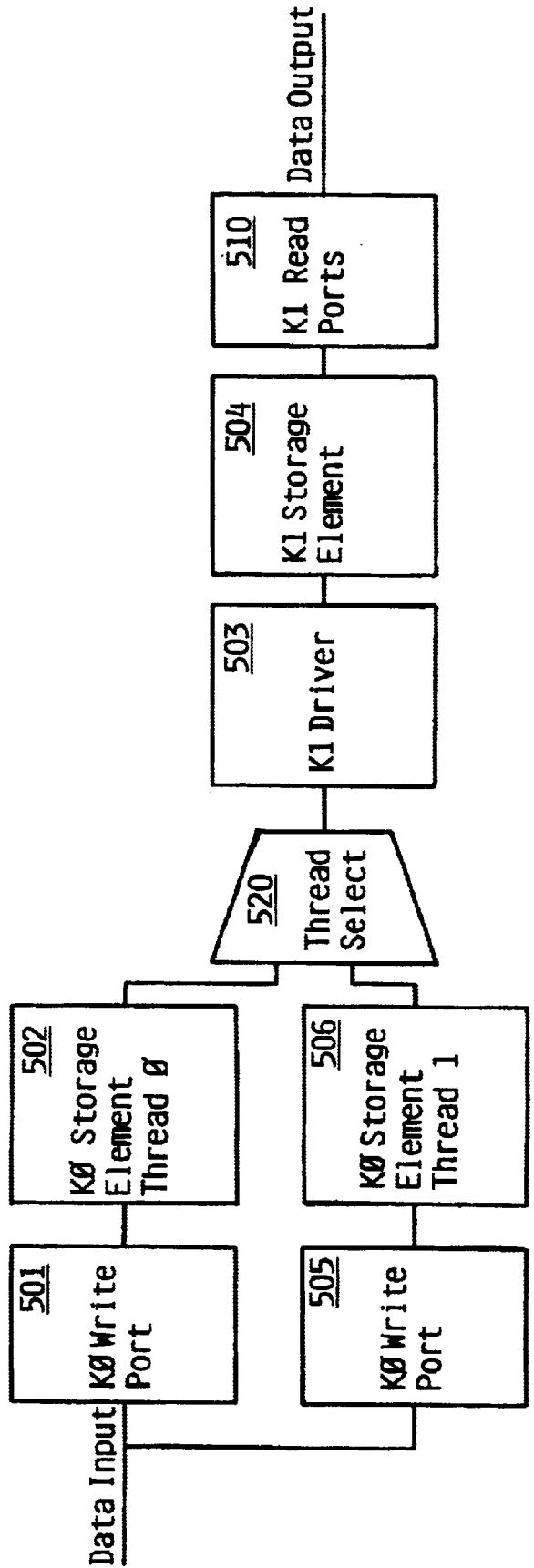
FIG. 5 represents at a high level of abstraction a master-slave latch circuit, in accordance with an embodiment of the present invention.

FIG. 5 represents at a high level of abstraction a master-slave latch circuit in accordance with an embodiment of the present invention. For simplicity of illustration, the circuit of FIG. 5 supports two threads, it being understood that the number of threads may vary.

The improved master-slave latch circuit contains a pair of K0 write ports 501, 505, which drive a respective pair of K0 storage elements 502, 506. A thread select circuit 520 is coupled to the outputs of each K0 storage element 502, 506. Thread select circuit 520 selects one and only one of the storage elements 502, 506 to provide input to a common K1 driver 503, which drives a common K1 storage element 504. K1 Storage element 504 is coupled to read port 510, which drives the output.

It can readily be seen that the improved circuit of FIG. 5 reduces the number of storage elements, and thus the complexity of the latch circuit. Furthermore, the concept is easily extendable to latch circuits supporting a larger number of threads for even greater savings of circuit elements.

Figures 1, 6A:
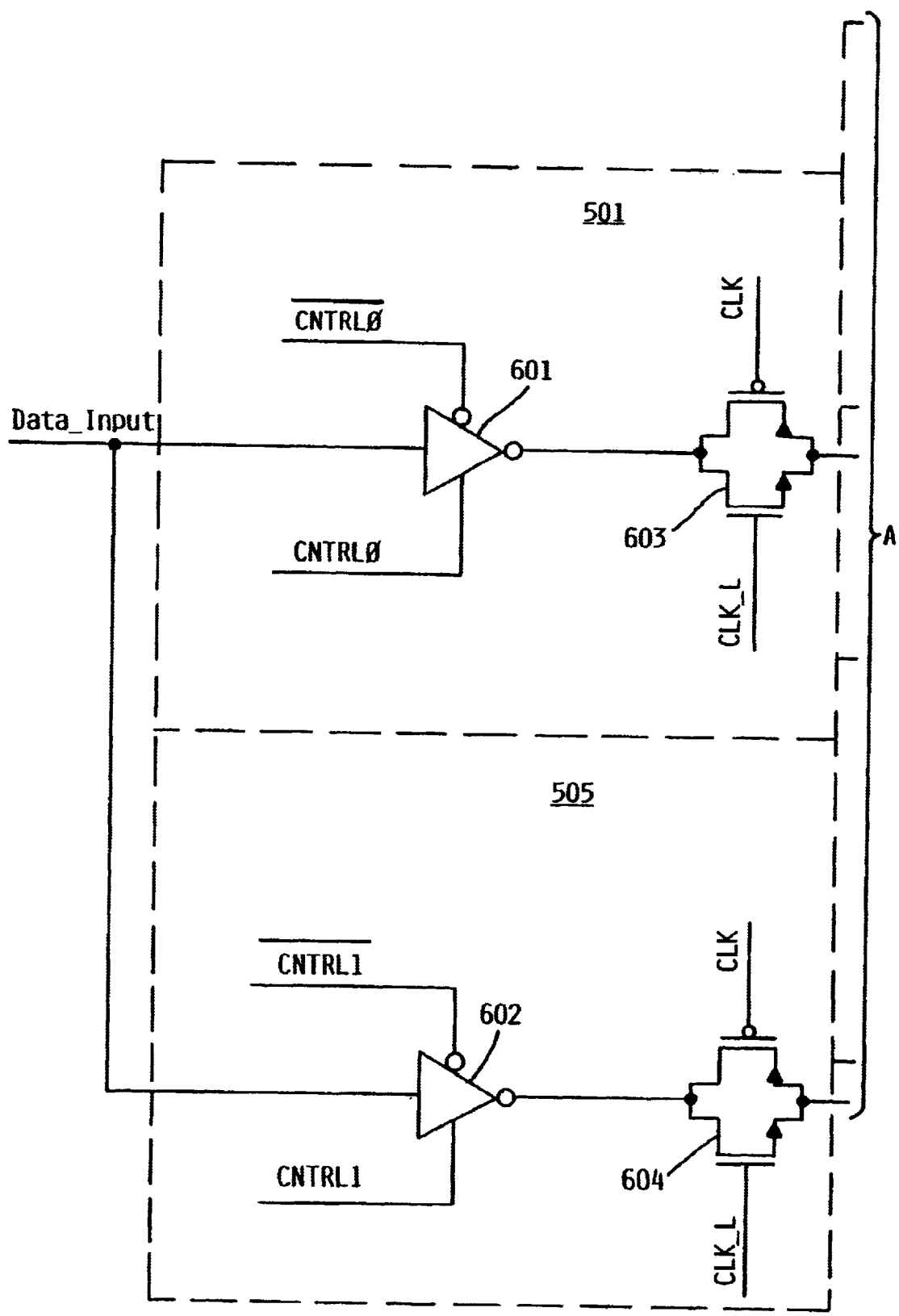
FIG. 6A shows a detailed implementation and functional waveforms of one embodiment of the circuit of FIG. 5.
Figures 2, 6A:
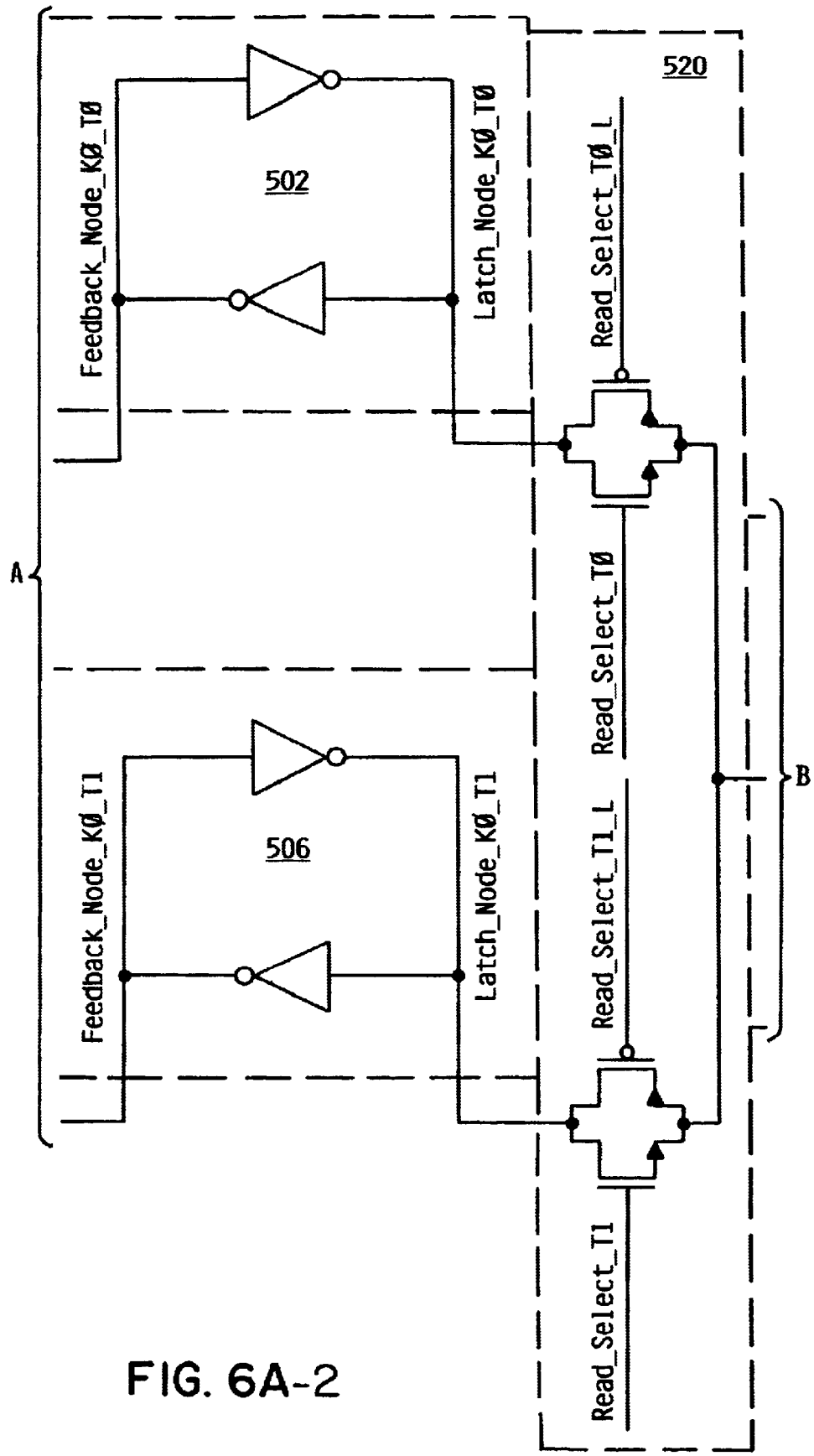
Figures 3, 6A:
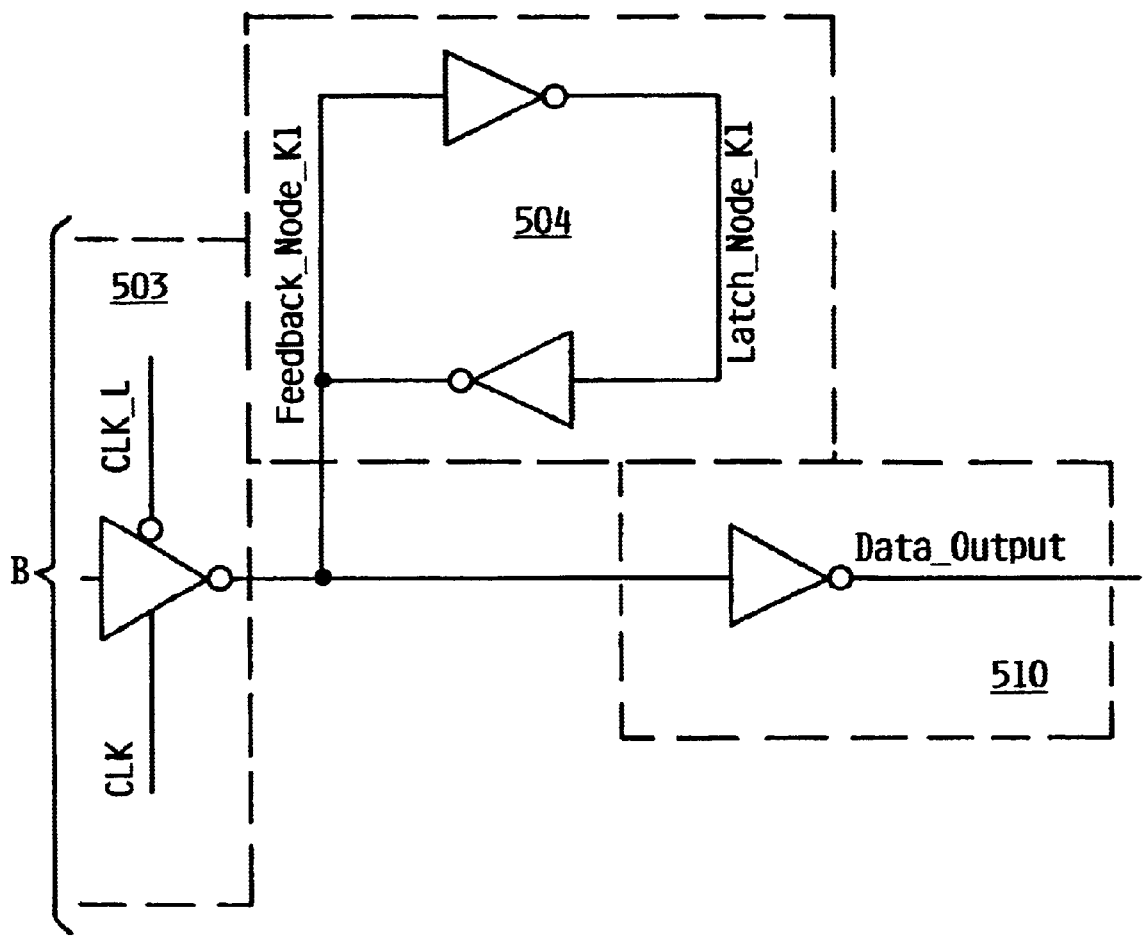
Figures 4, 6A:
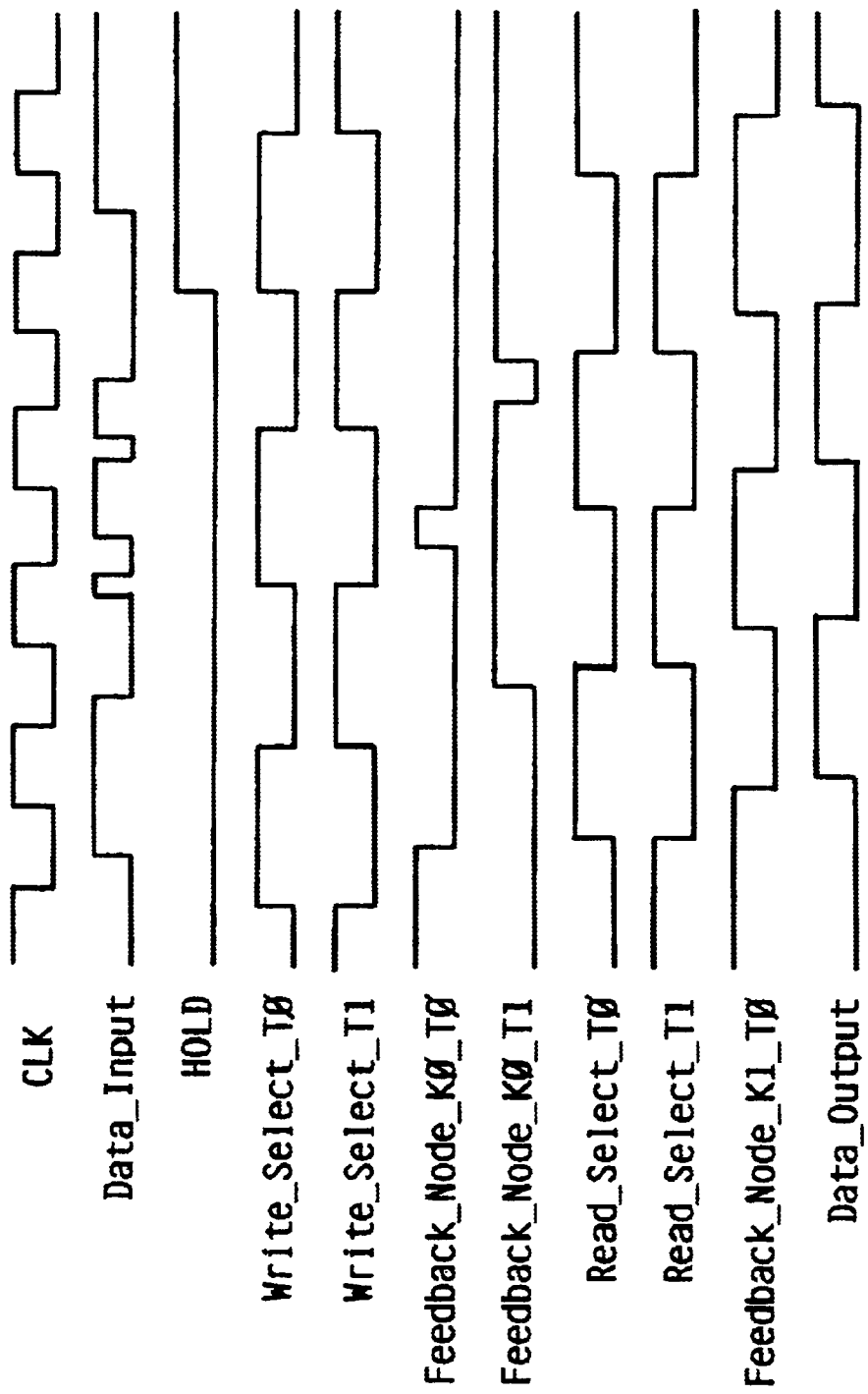

FIG. 6A shows a detailed implementation and functional waveforms of one embodiment of the circuit of FIG. 5. In order to support a select circuit 520 between the K0 and K1 stages, several modifications are made to the circuit of FIG. 4. CNTRL0 and CNTRL1 control gated inverters 601, 602, and are derived as explained above with respect to FIG. 4A. Because there is only one K1 storage element, it is not possible to take feedback from the K1 element as gated input to the K0 stage. Therefore, the K0 write ports 501, 502 must be designed to hold state when no input is present. This is accomplished by replacing clocked inverters 425, 426 of FIG. 4 with clocked transmission gates 603, 604. Since transmission gates 603, 604 do not invert the input signal, the polarity of the K0 elements 502, 506 is effectively reversed. Therefore the latch nodes of K0 elements 502, 506 are used to provide input to selection logic 520, which is implemented as a pair of transmission gates. The output of the gates is input to common K1 driver 503, which is a clocked inverter. This in turn drives common K1 storage element 504, and ultimately read port 520, which is shown as a single inverter coupled to the feedback node of K1 storage element 504.

The replacement of clocked inverters 425,426 of FIG. 4 with transmission gates 603, 604 of FIG. 6A may result in a small increase in set-up time for the improved latch circuit of FIG. 6A vis-a-vis that of FIG. 4. On the other hand, the removal of additional logic level from the output path (i.e., removal of select logic 409) should improve read performance. From a performance standpoint, the circuit of FIG. 6A is therefore more or less equivalent, if not slightly better, than the prior art circuit. At the same time, a very substantial savings in transistors is accomplished.

Figures 1, 6B:
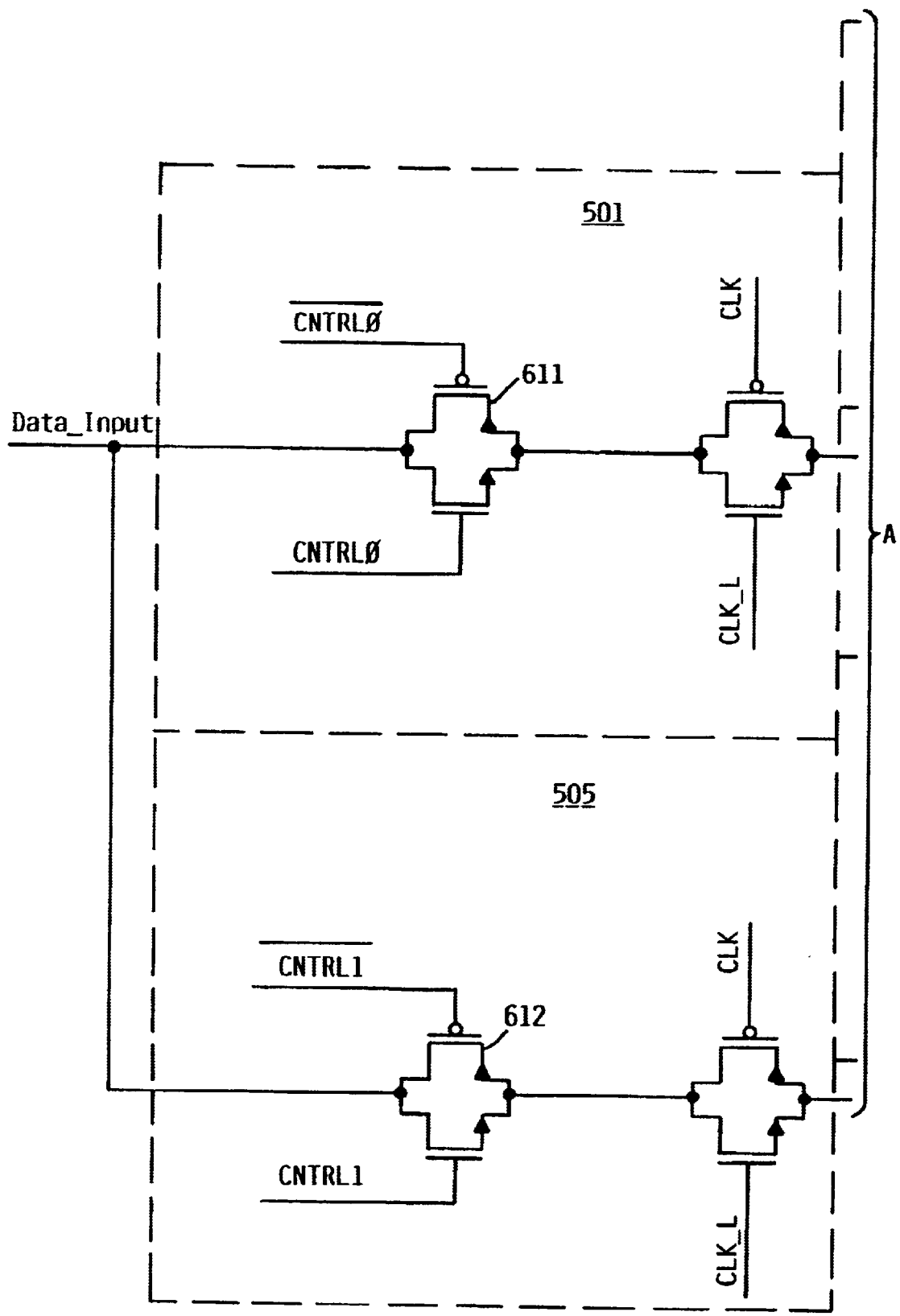
FIGS. 6B, 6C and 6D illustrate detailed implementations of various alternative embodiments of the circuit of FIG. 5.
Figures 2, 6B:
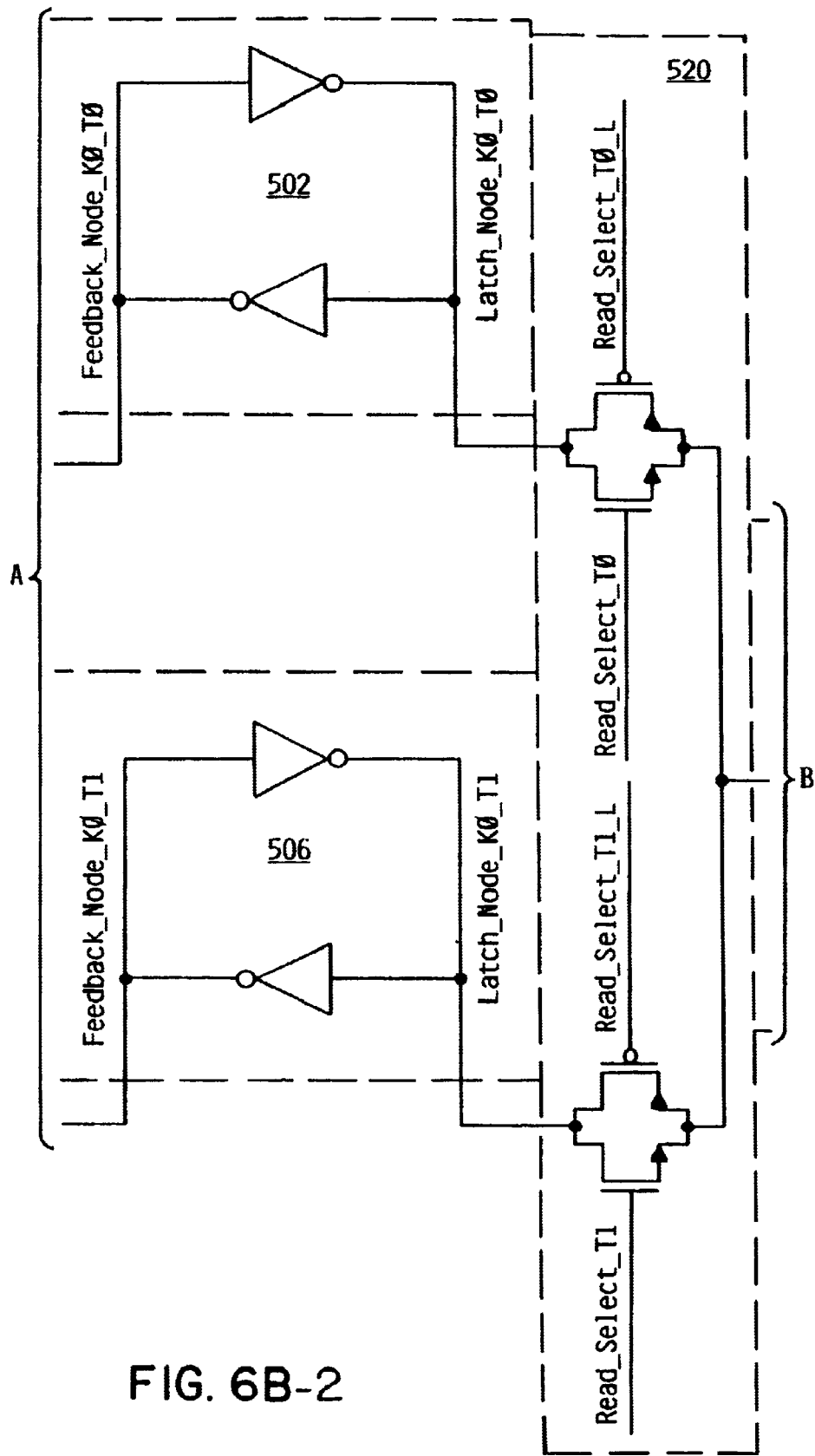
Figures 3, 6B:
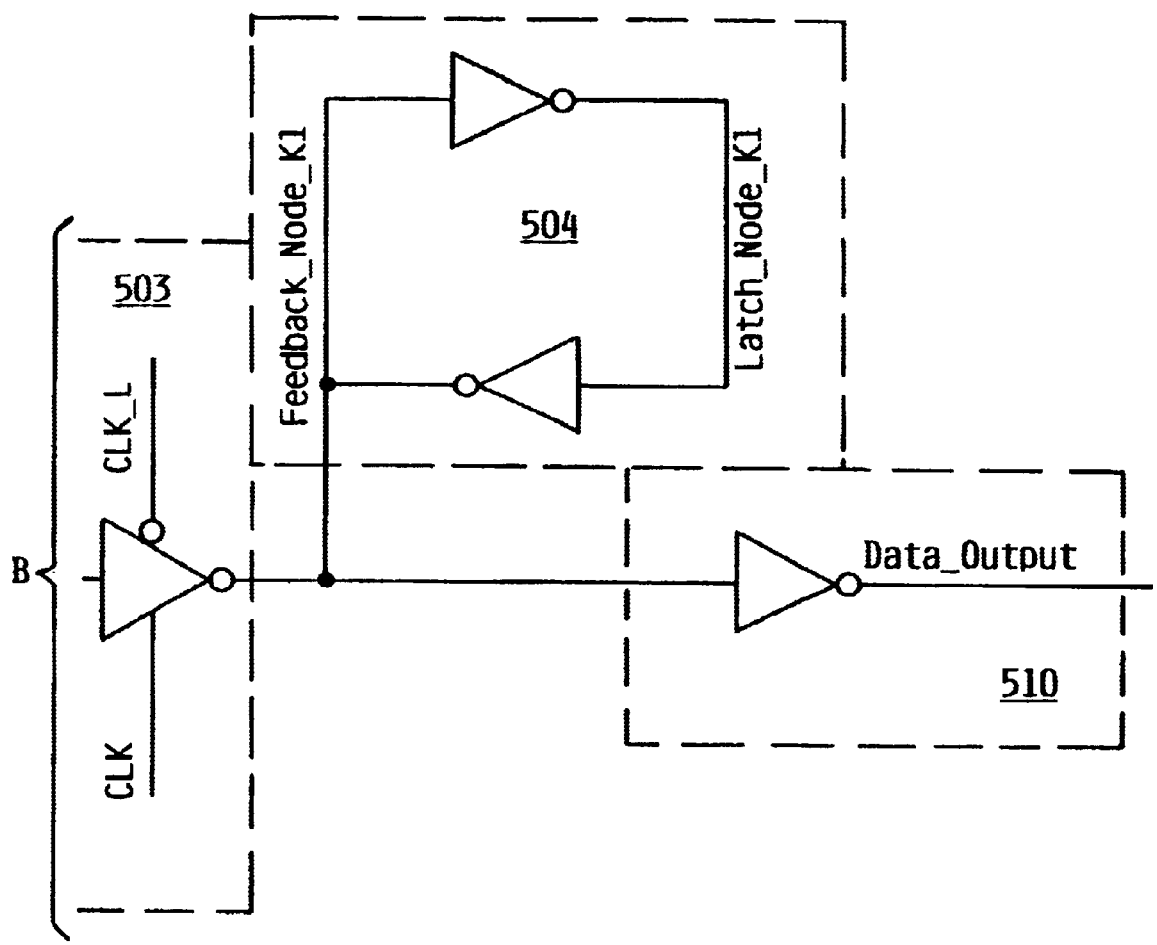
Figures 1, 6C:
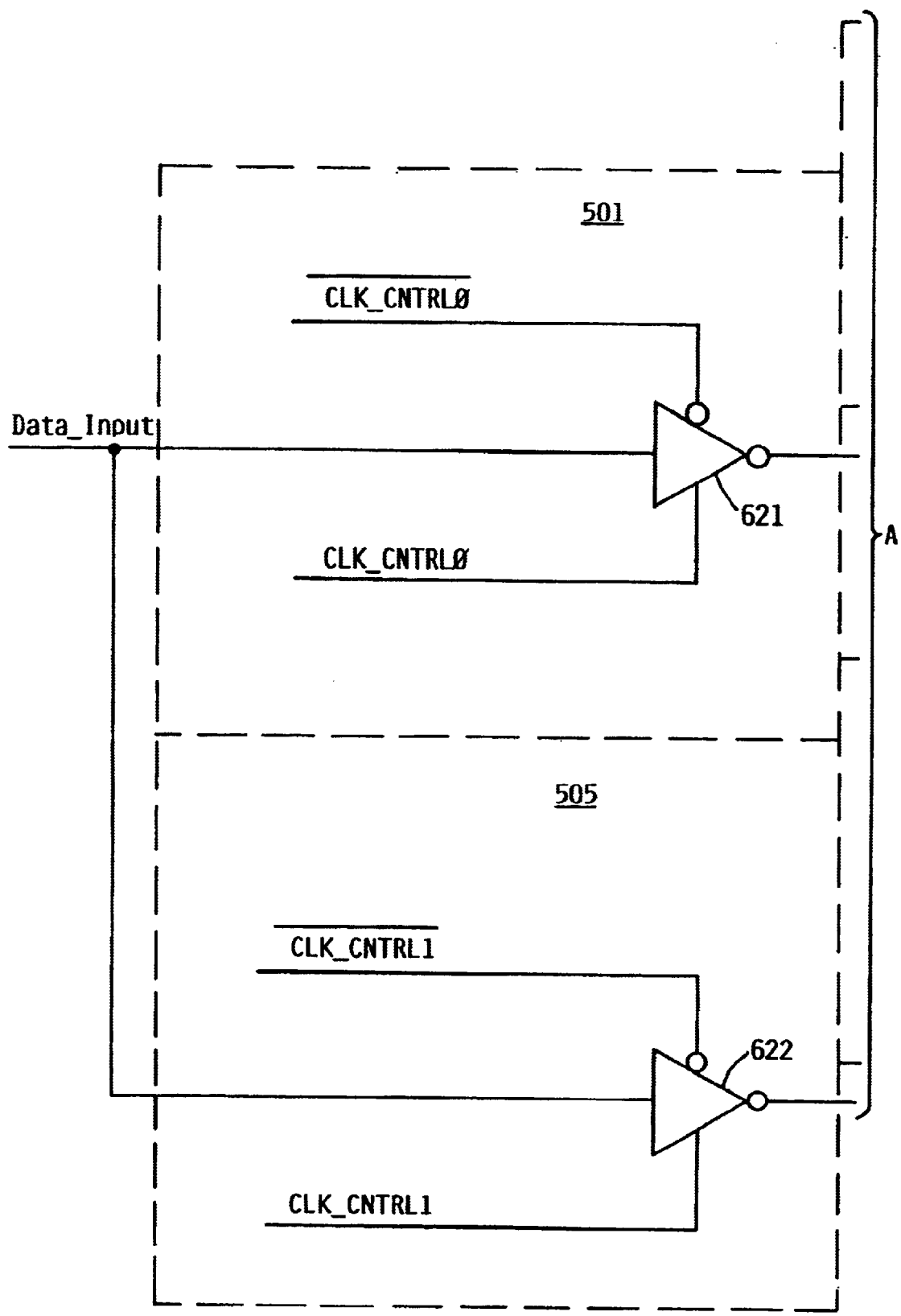
Figures 2, 6C:
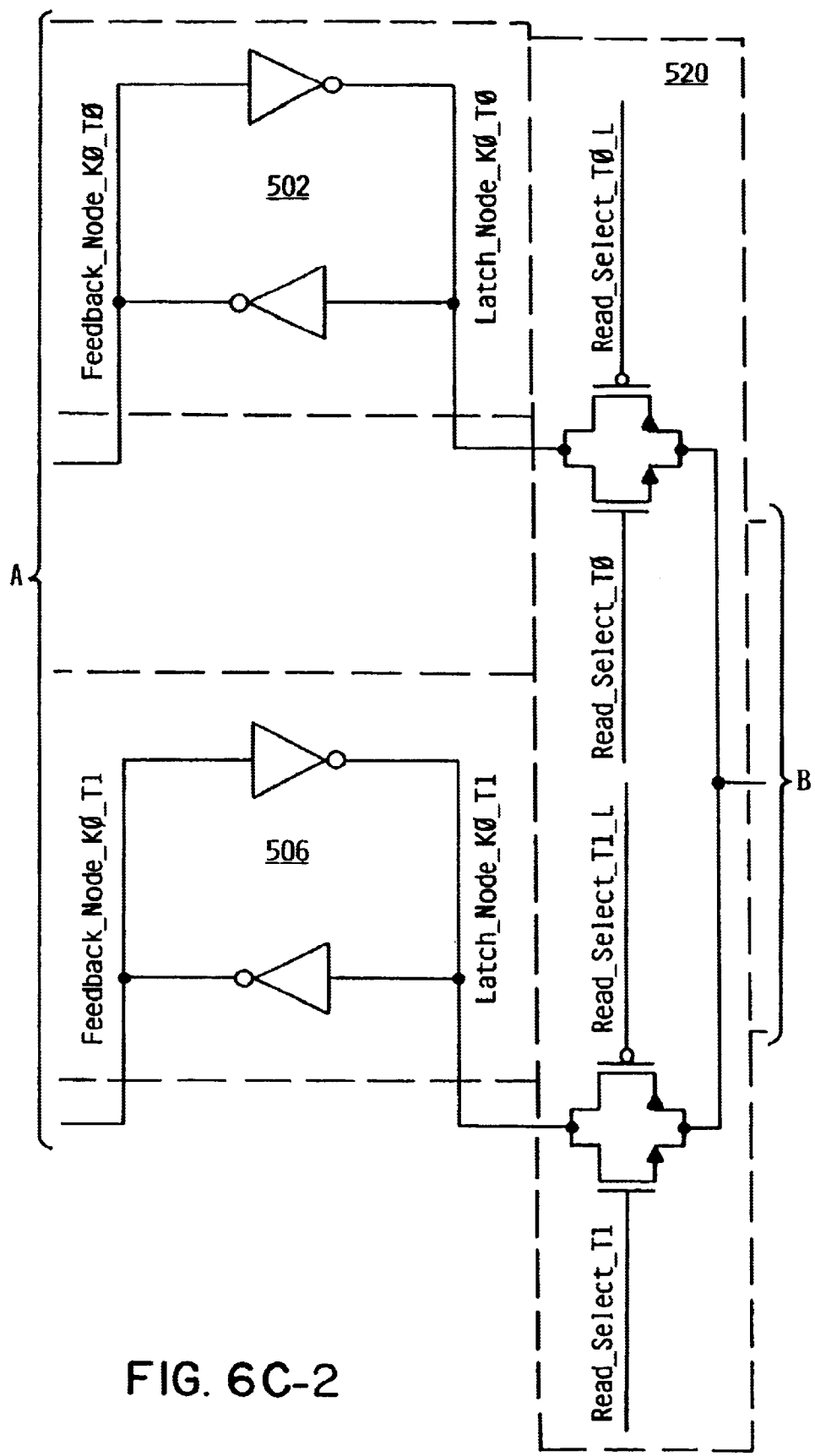
Figures 3, 6C:
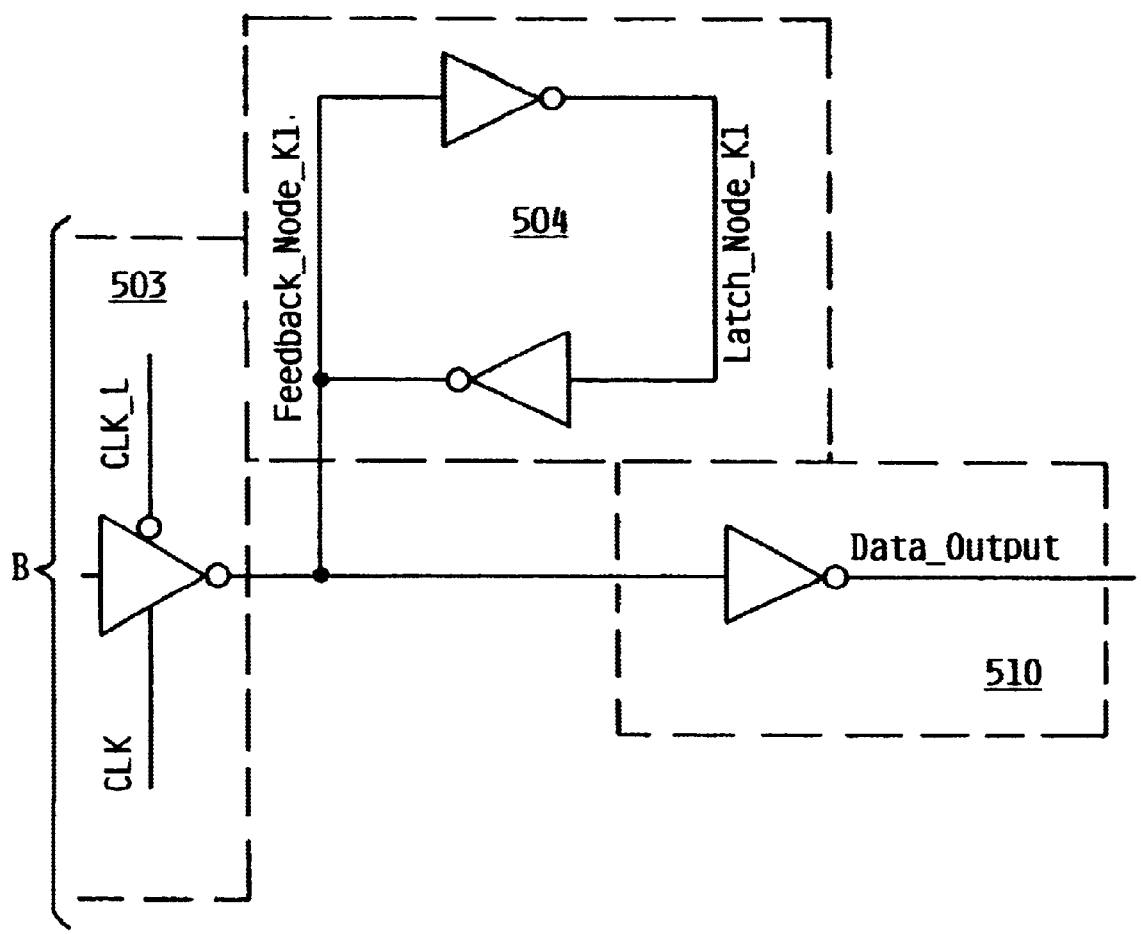
Figures 1, 6D:
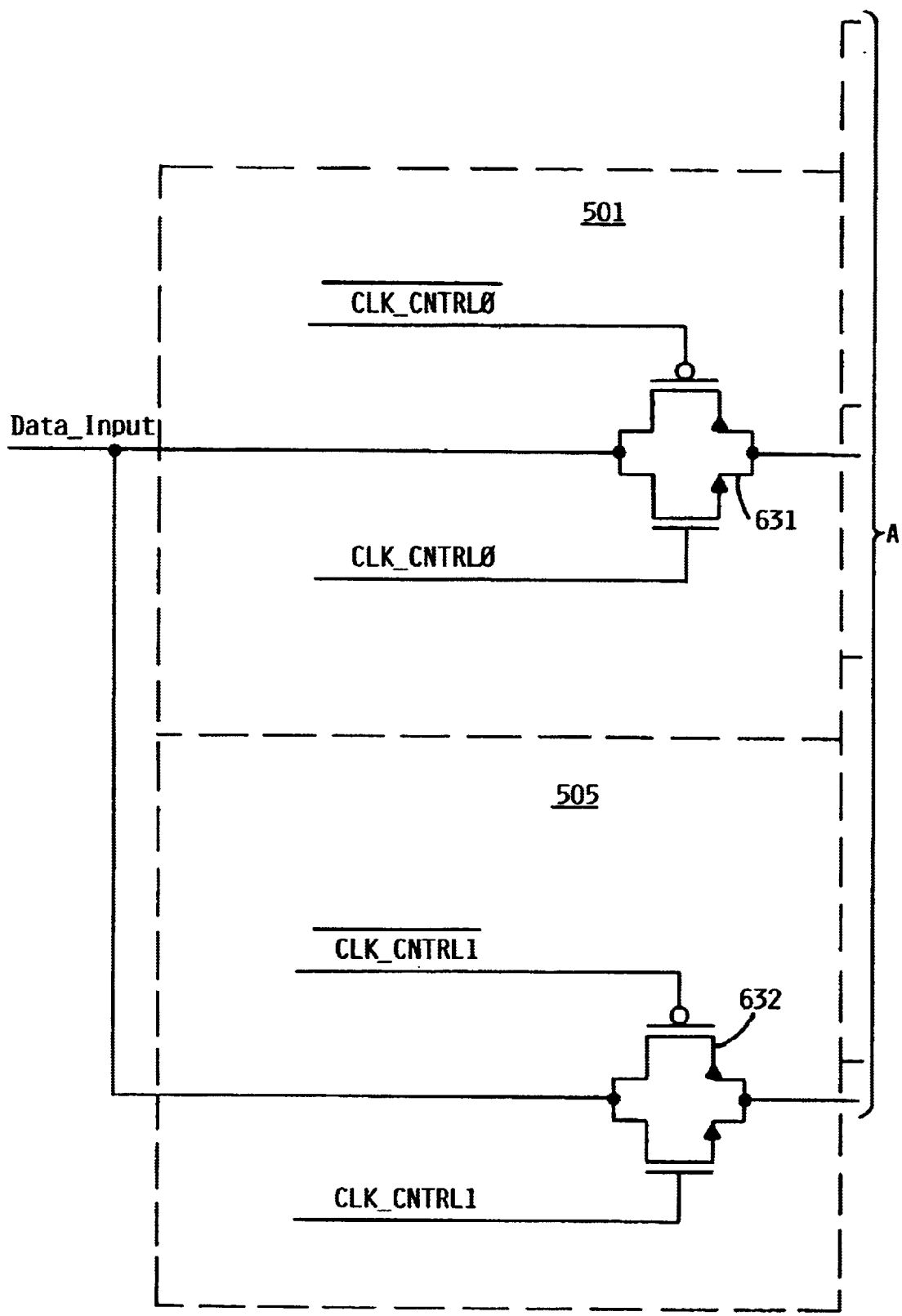
Figures 2, 6D:
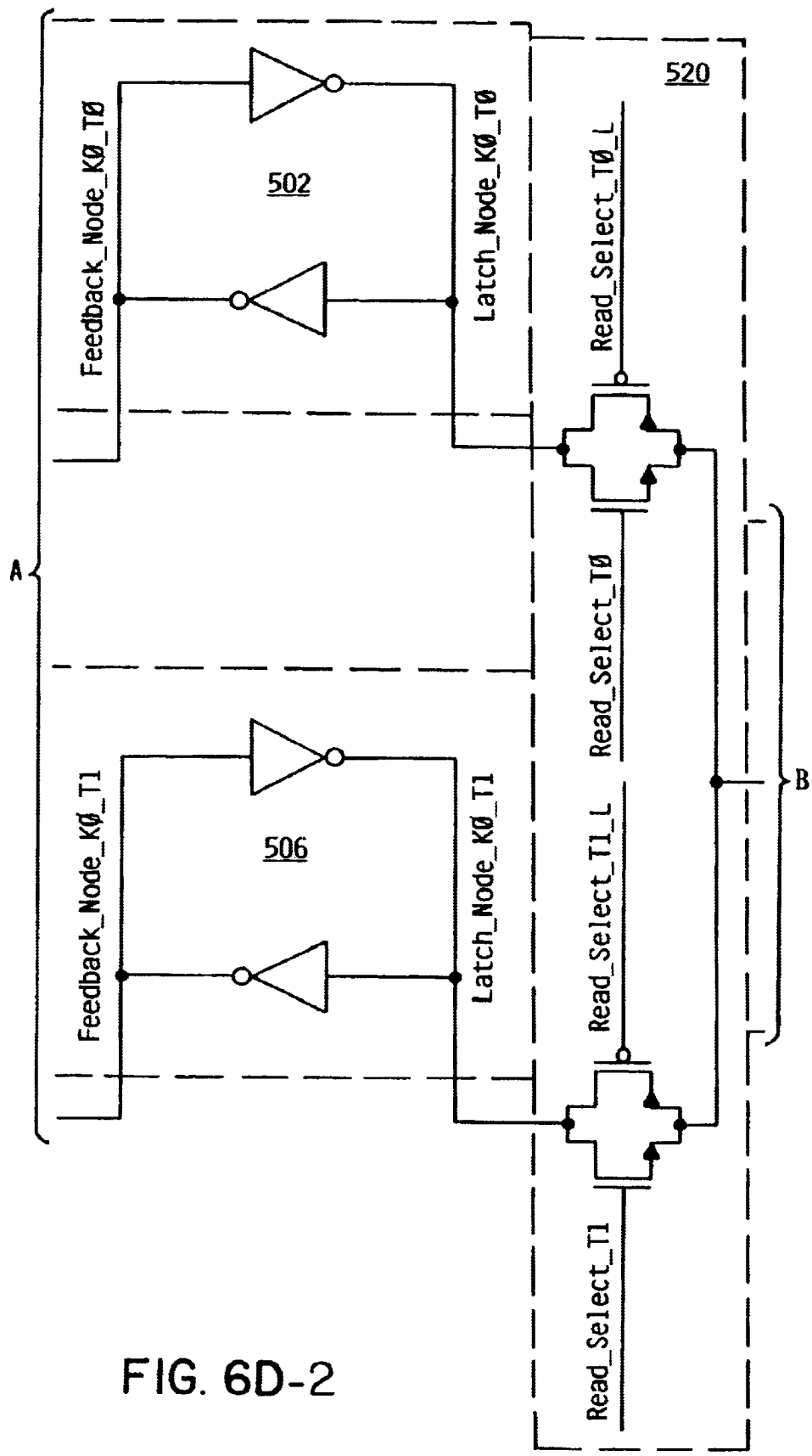
Figures 3, 6D:
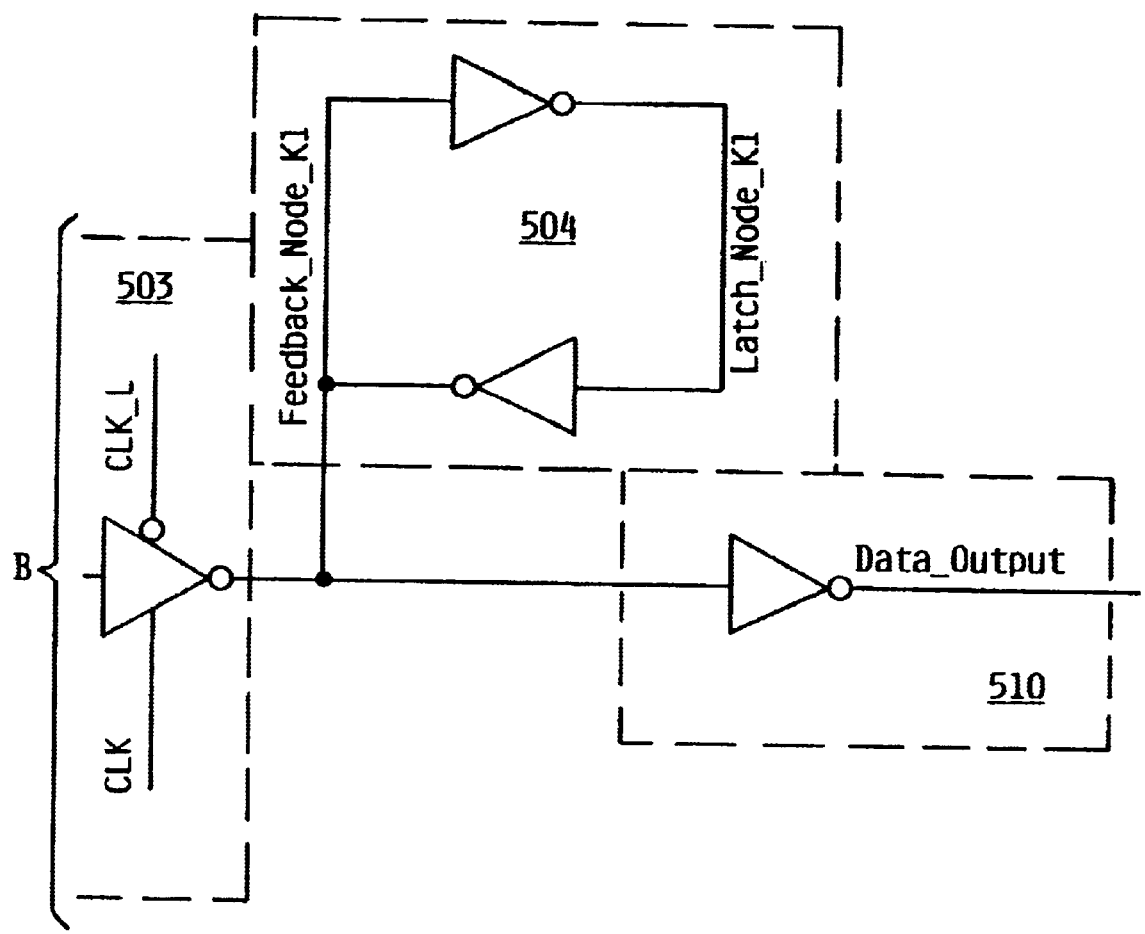

FIGS. 6B, 6C and 6D illustrate detailed implementations of various alternative embodiments of the circuit of FIG. 5. In the circuit of FIG. 6B, the gated inverters 601, 602 of FIG. 6A are replaced by a pair of transmission gates 611, 612, controlled by the same control signals. This has the effect of eliminating four more transistors from the latch (each gated inverter requiring four transistors as opposed to two for a transmission gate), but will further increase the set-up time. In the circuit of FIG. 6C, gated inverter 601 and clocked transmission gate 603 have been replaced by a single gated inverter 621 (and similarly, inverter 602 and gate 604 have been replaced by gated inverter 622), where the control signals to inverters 621 and 622 include the clock, i.e.:

CLK_CNTRL0=CLK AND CNTLR0=CLK AND -HOLD AND Write_Select_T0

CLK_CNTRL1=CLK AND CNTLR1=CLK AND -HOLD AND Write_Select_T1.

In the circuit of FIG. 6D, gated inverter 601 and clocked transmission gate 603 of FIG. 6A have been replaced by a single transmission gate 631 (and similarly, inverter 602 and gate 604 have been replaced by transmission gate 632), where the control signals to inverters 631 and 632 are the same as to inverters 621 and 622, respectively. While circuits 6C and 6D show fewer components than circuit 6A, whether there actually are fewer components is problematic, because a more complex control signal must be generated for controlling inverters 621, 622 or gates 631, 632.

In the design of processors and other complex logic, it is frequently desirable to implement scannable logic designs for testing purposes. In a scannable design, a global scan signal (usually imposed on an input pin of the processor chip) forces the processor into a scan mode of operation. In scan mode, pre-determined data patterns are sequentially clocked through the processor's registers to verify that the logic is working properly. Scanned data must pass through each register to be tested individually, and therefore has its own data path.

Figures 2, 7A:
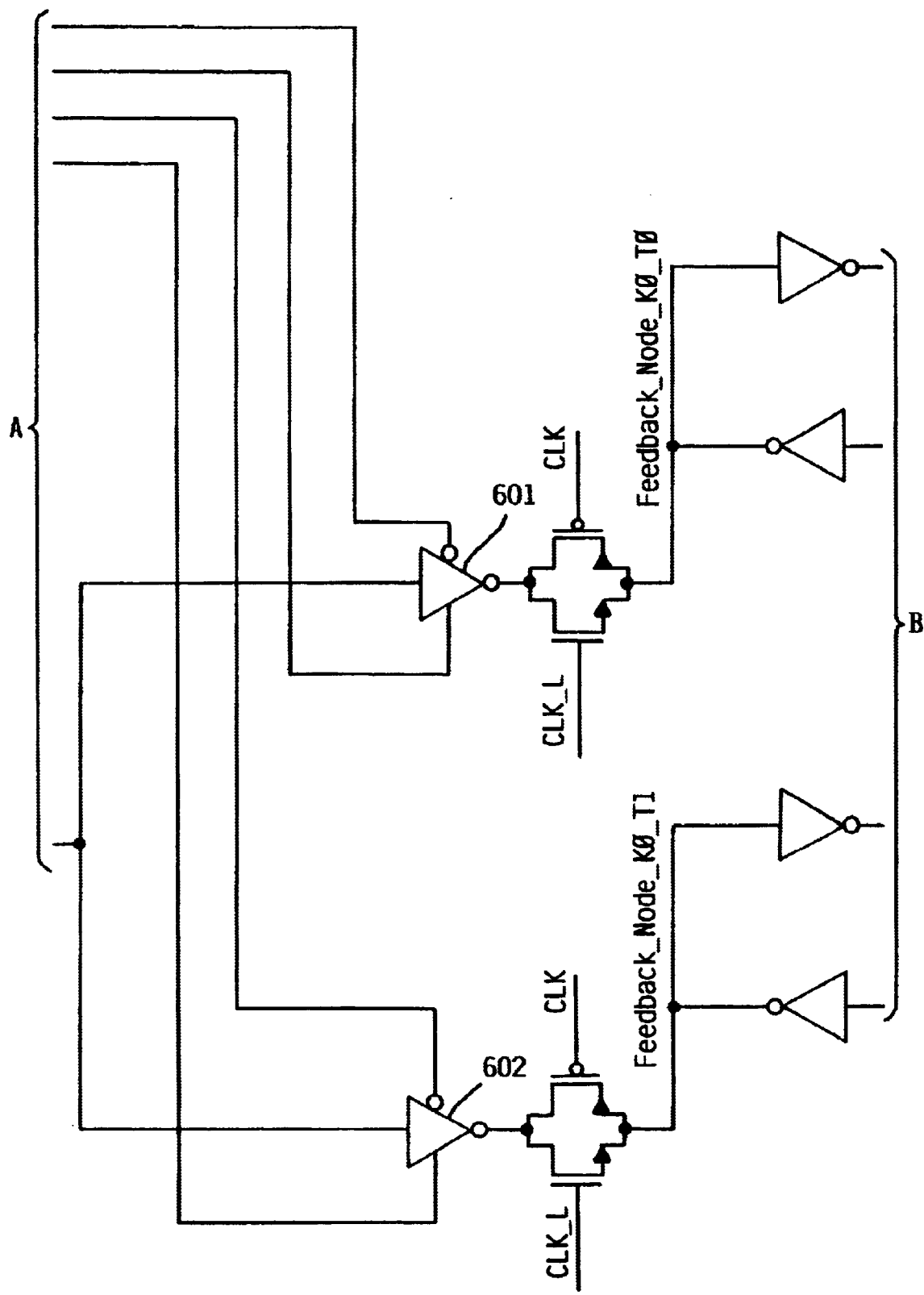
FIGS. 7A and 7B illustrate the application of input control signals, including scan capability, to the multithreaded latch circuits of FIG. 6A and FIG. 6C, respectively, in accordance with certain embodiments of the present invention.
Figures 3, 7A:
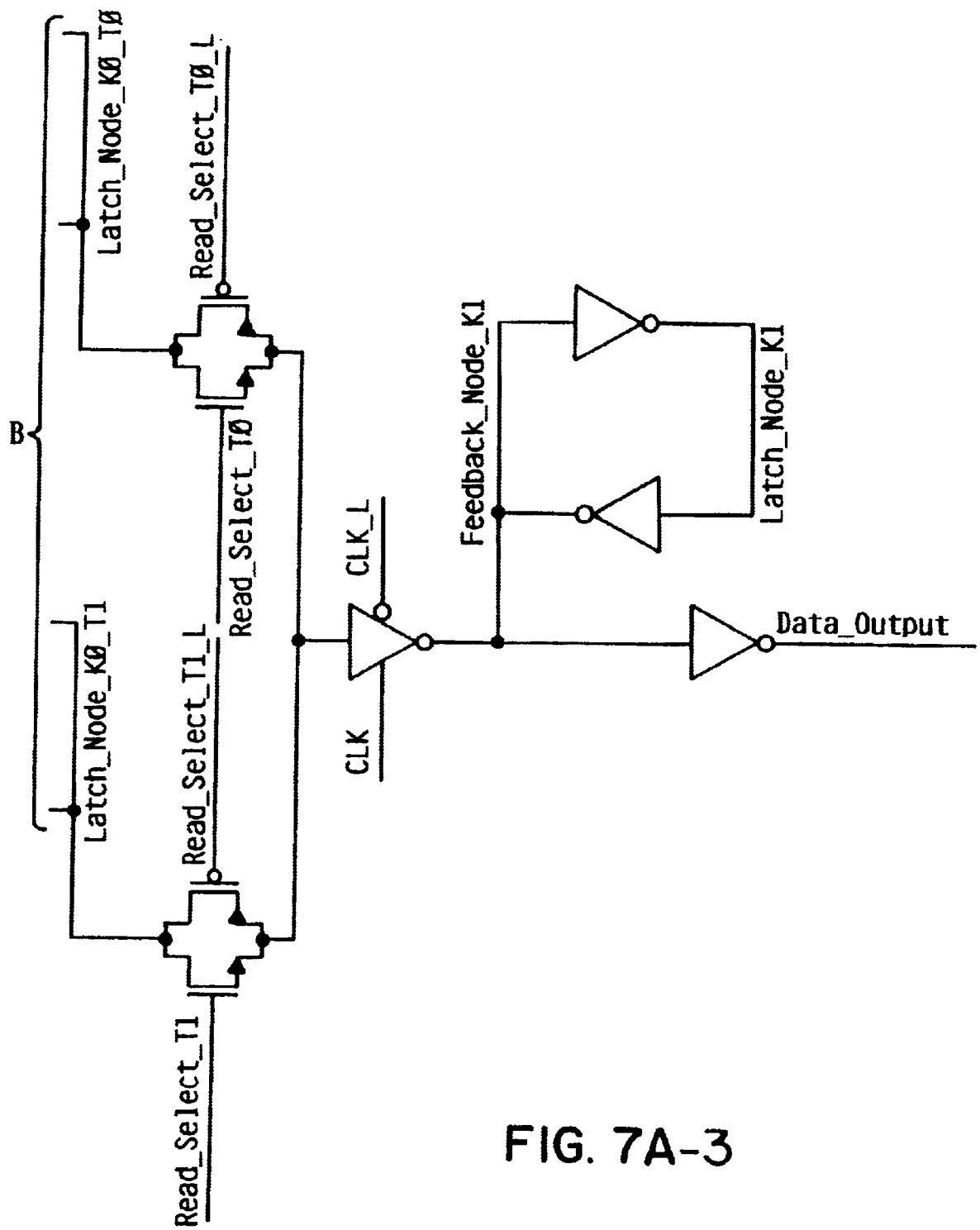

FIG. 7A illustrates the application of input control signals, including scan capability, to the multithreaded latch circuit of FIG. 6A. As shown in FIG. 7A, the basic circuit of FIG. 6A is unchanged. The data input line is received from the output of a multiplexer 701, controlled by multiplexer control circuit 702. In normal operating mode, multiplexer control 702 directs multiplexor 701 to pass Data_In signal 710 through to the Data_Input 712 of the latch circuit. When Scan signal 721 is active, multiplexer control 702 causes multiplexer to pass Scann_In signal 711 through to the Data_input 712 of the latch. There may be one Data_In signal, or more typically, multiple Data_In signals selected by the multiplexer and multiplexer control, as shown. Thus, Scan_In signal 711 is typically only one of many possible inputs to the latch. When Scan signal 721 is active, it overrides all other control lines so that Scan_in is forced into the latch. FIG. 7A also represents the generation of control signals for gated inverters 601, 602 from inverter 731, NAND gates 732, 733, and inverters 734, 735.

Figures 2, 7B:
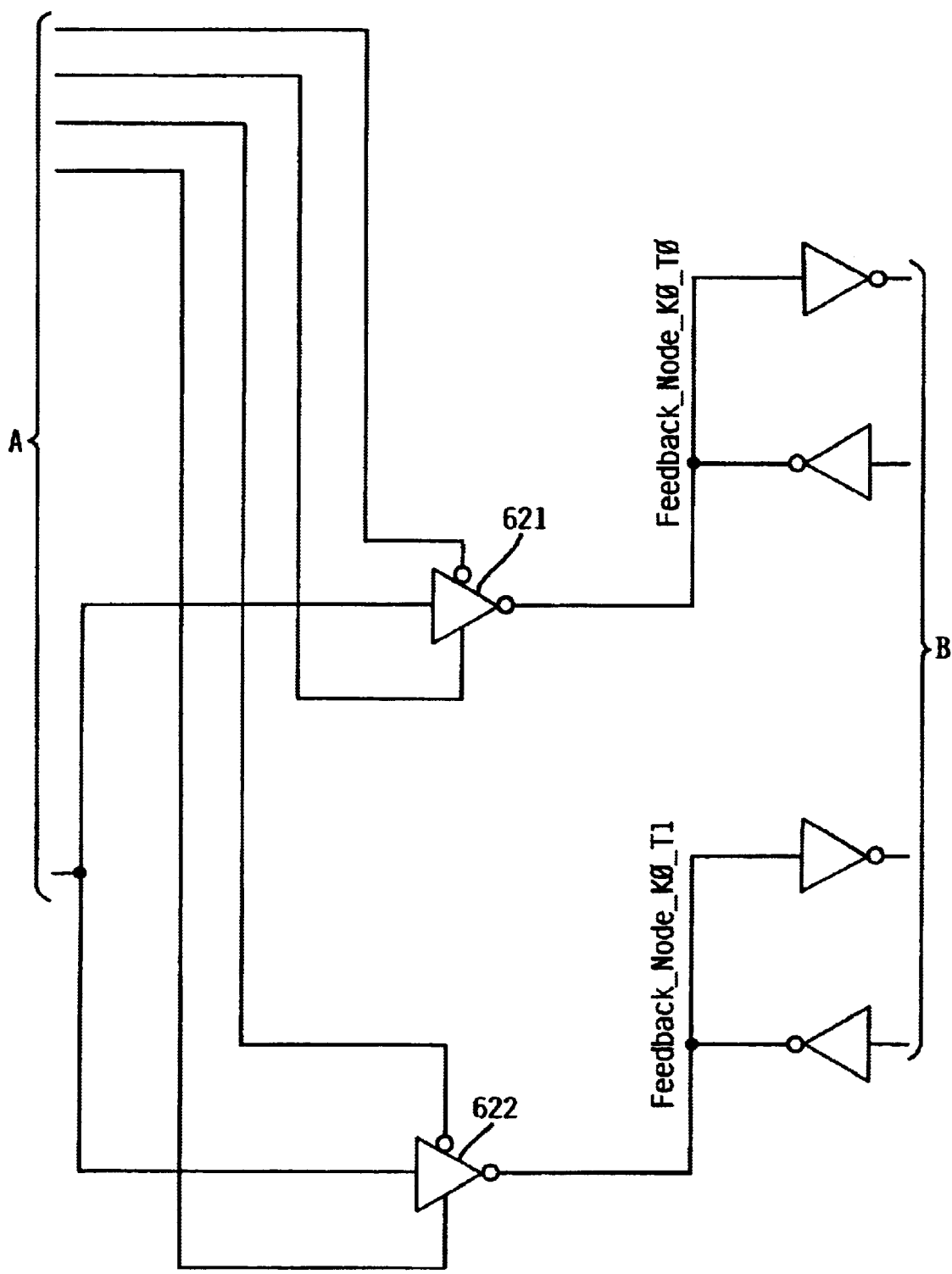
Figures 3, 7B:
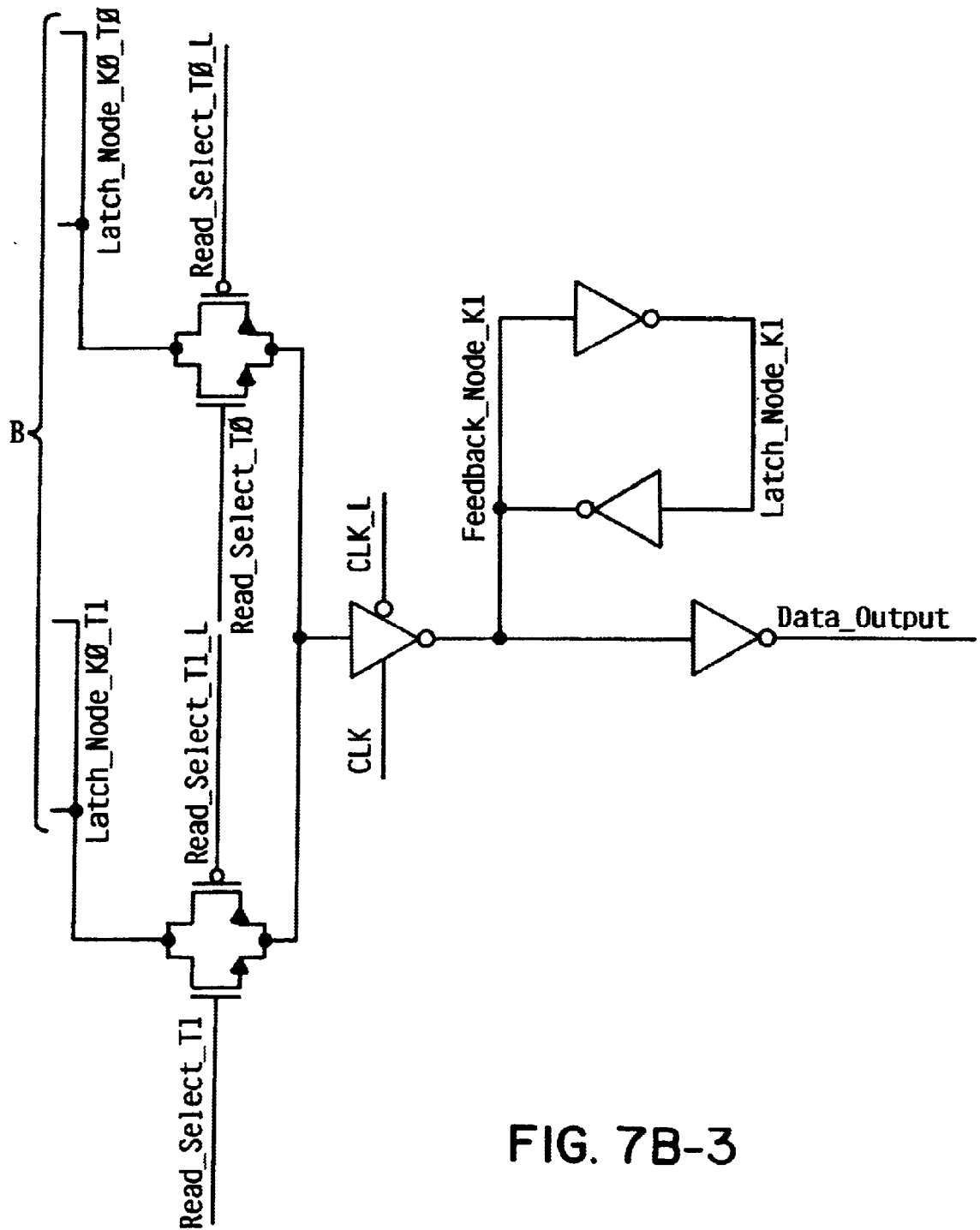
Figure 8A:
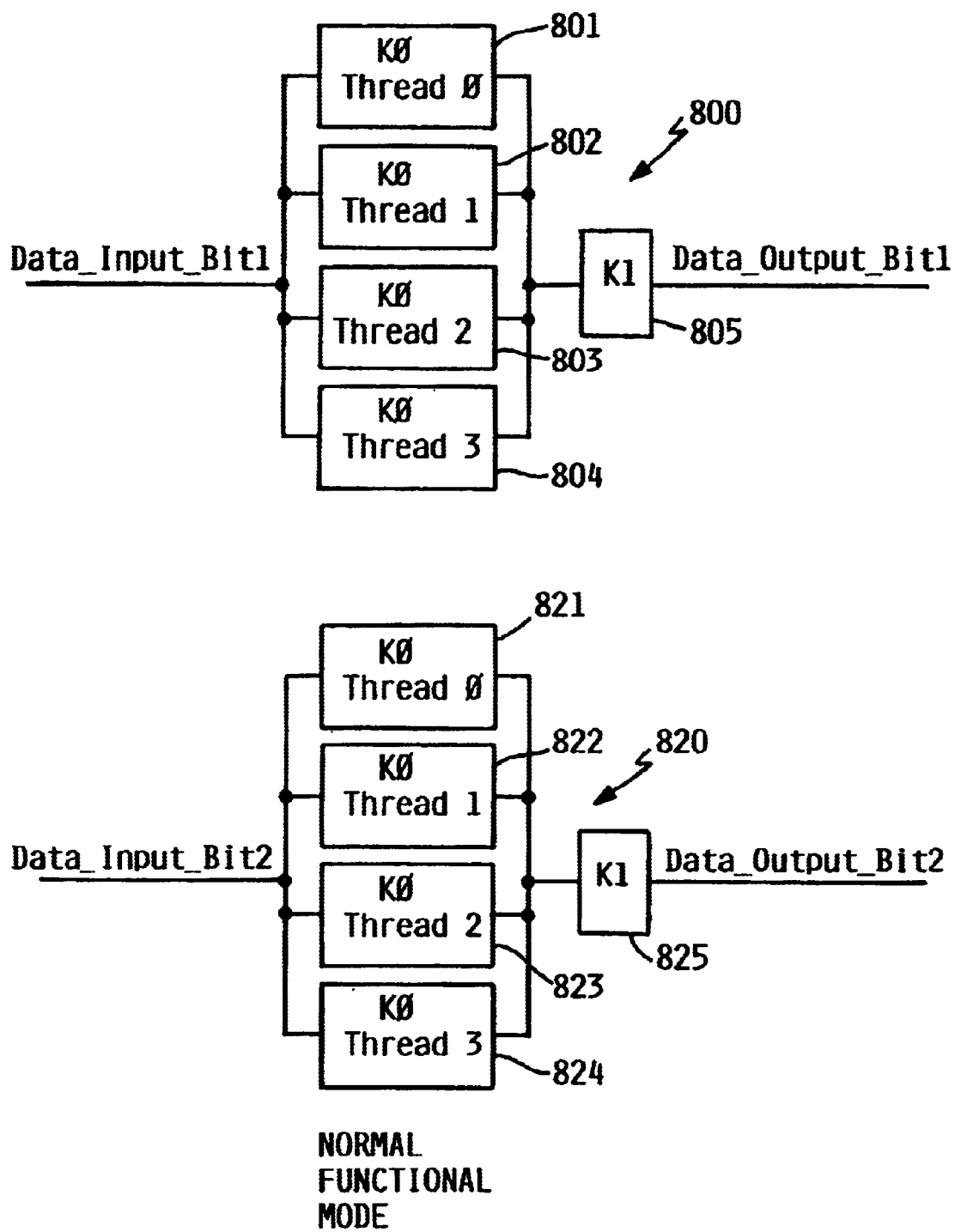
FIG. 8 illustrates at a high level of abstraction a pair of latch circuits having a scan path in which some K0 cells operate as K1 cells, in accordance with certain embodiments of the present invention.
Figure 8B:
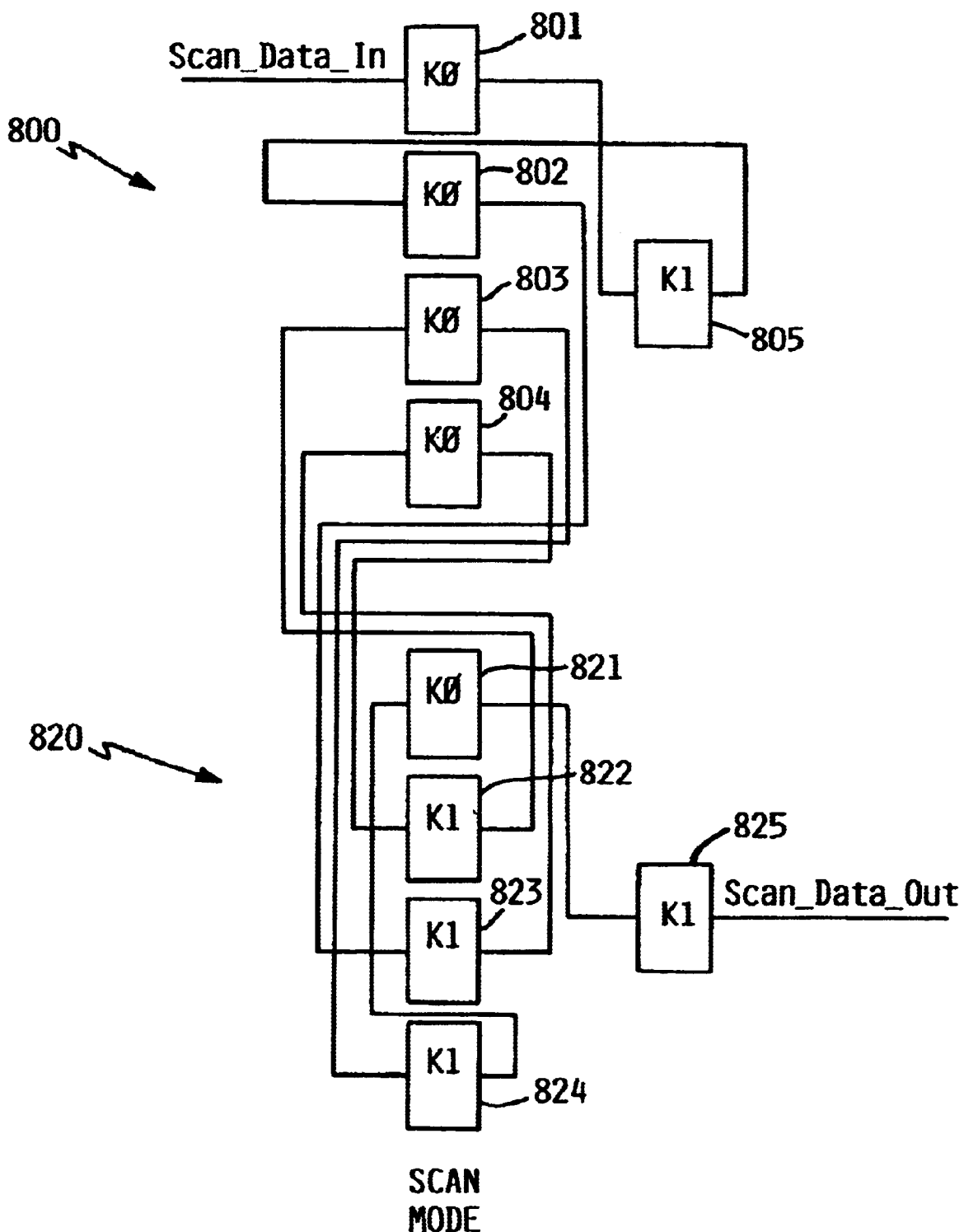

FIG. 7B illustrates the application of input control signals, including scan capability, to the multithreaded latch circuit of FIG. 6C. This circuit uses the same multiplexer 701 and multiplexer control 702 as the circuit of FIG. 7A. However, it will be recalled that the circuit of FIG. 6C uses a gated inverter in which the control signal is the CLK combined with the HOLD and Write_Select signals to produce CLK_CNTRL0 and CLK_CNTRL1. Inverters 741, 744 and 745 and 3-input NAND gates 742, 743 generate the control signals.

While it is possible to implement scan capability as shown in FIGS. 7A and 7B, whether a particular K0 element is used depends upon the state of the Write_Select lines. Write_Select lines are not normally controlled by the scan signals, but instead, by their own complex logic, which may depend on many state variables. This makes 100% testing of the register cells problematical. It would be possible to modify the Write_Select logic, so that when scan is active, the normal logic is overridden with scanned in values, but this adds additional complexity to the circuit and to the testing procedure. Furthermore, it makes the scan test unnecessarily redundant with respect to the K1 logic cells, because every value scanned into every one of the K0 cells will have to be scanned through the common K1 cell. All of these problems are aggravated as support for additional threads (and consequently, additional K0 cells sharing the same K1 cell) are added to the processor.

An alternative approach is to modify the basic multithreaded latch circuit as described above, so that the scan path is fundamentally different from the logic path in functional mode, and in particular, so that at least some of the K0 cells function as K1 cells when in scan mode.

Figures 1, 10A:
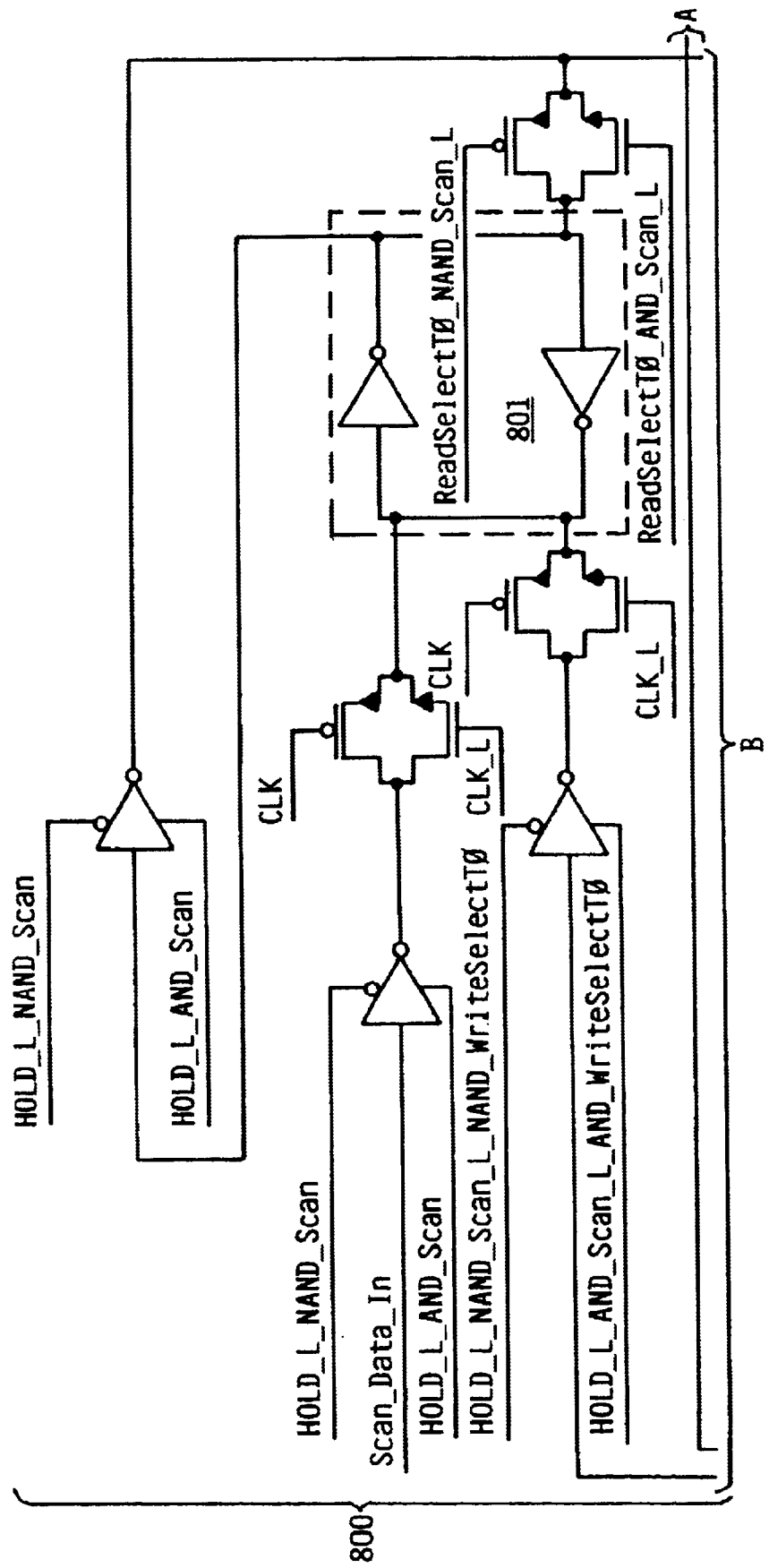
FIGS. 10A and 10B illustrate detailed implementations of various alternative embodiments of the circuit of FIG. 8.
Figures 4, 10A:
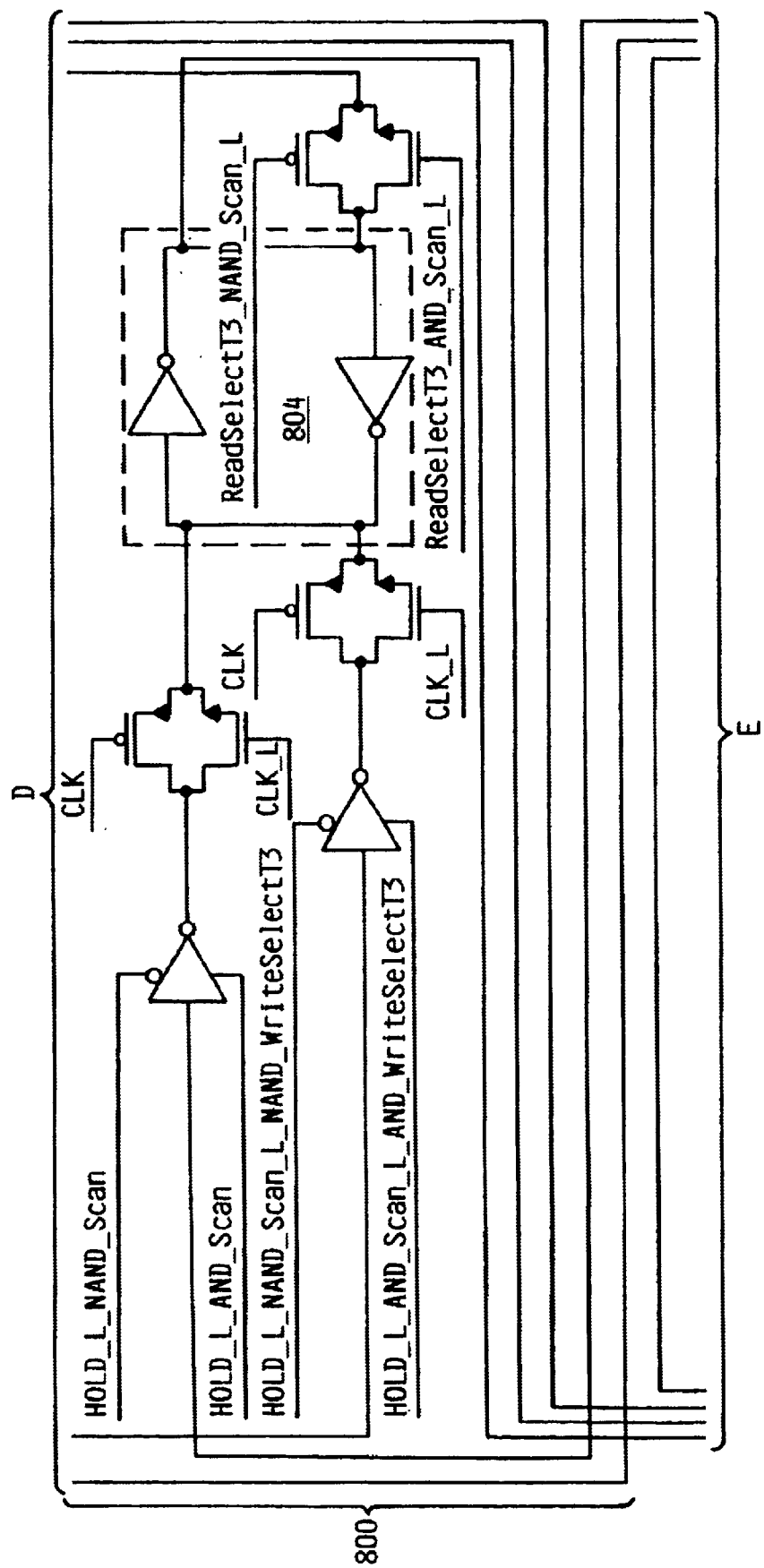
Figures 5, 10A:
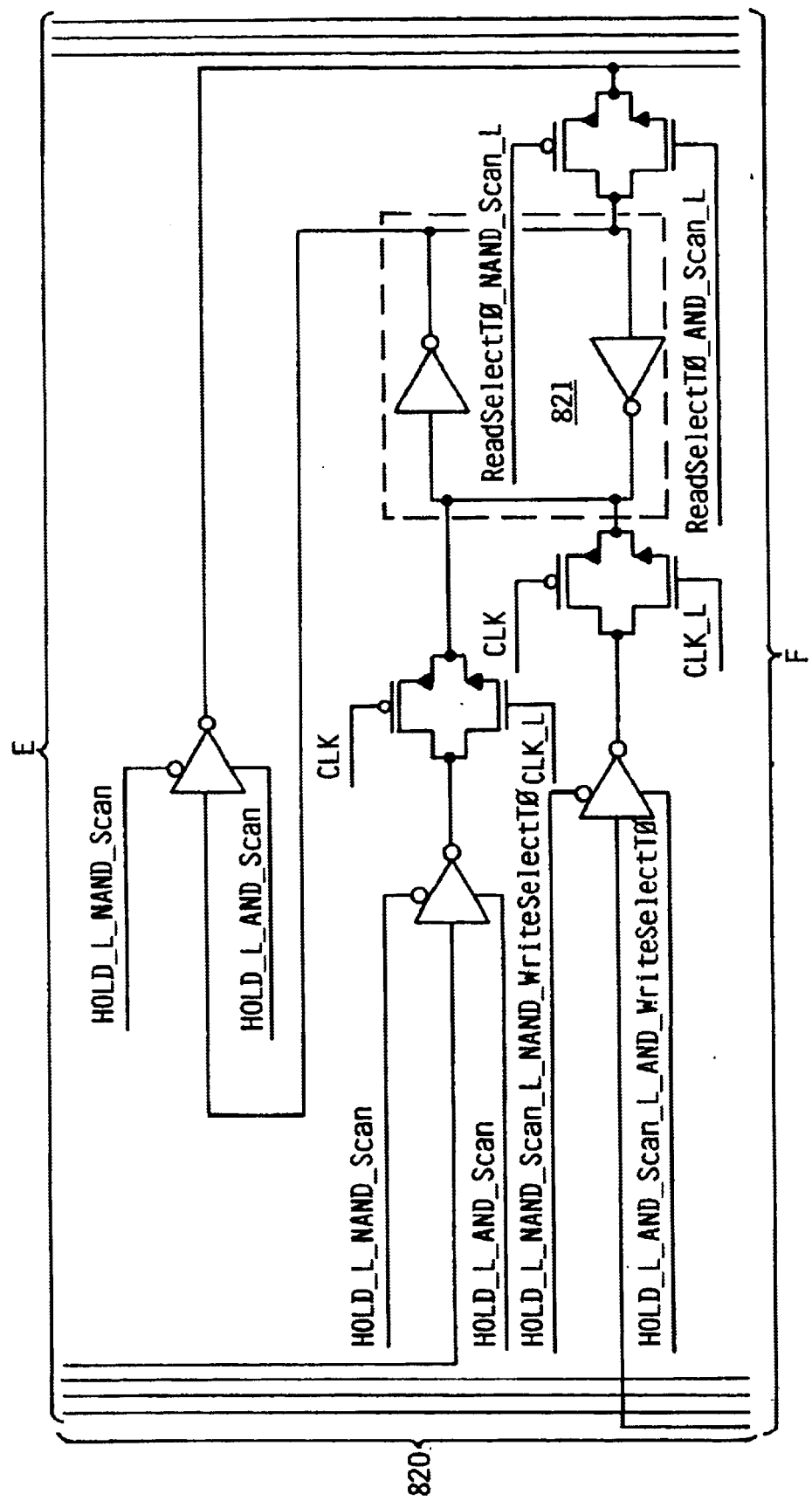
Figures 7, 10A:
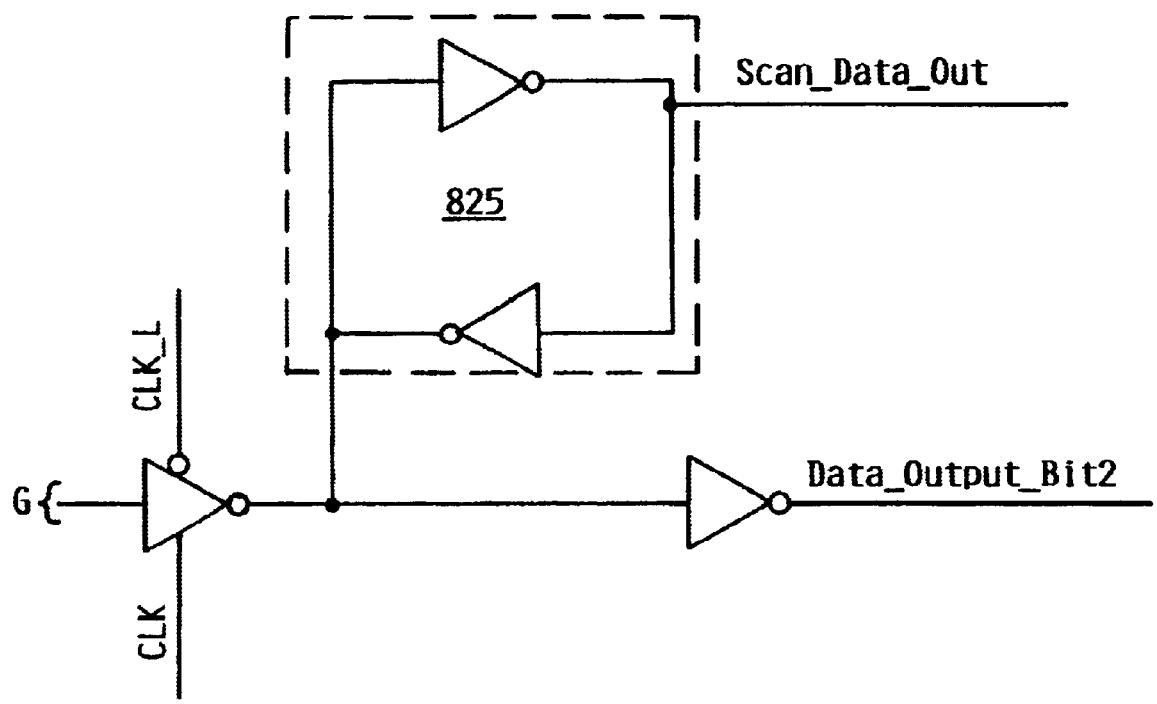
Figures 8, 10A:
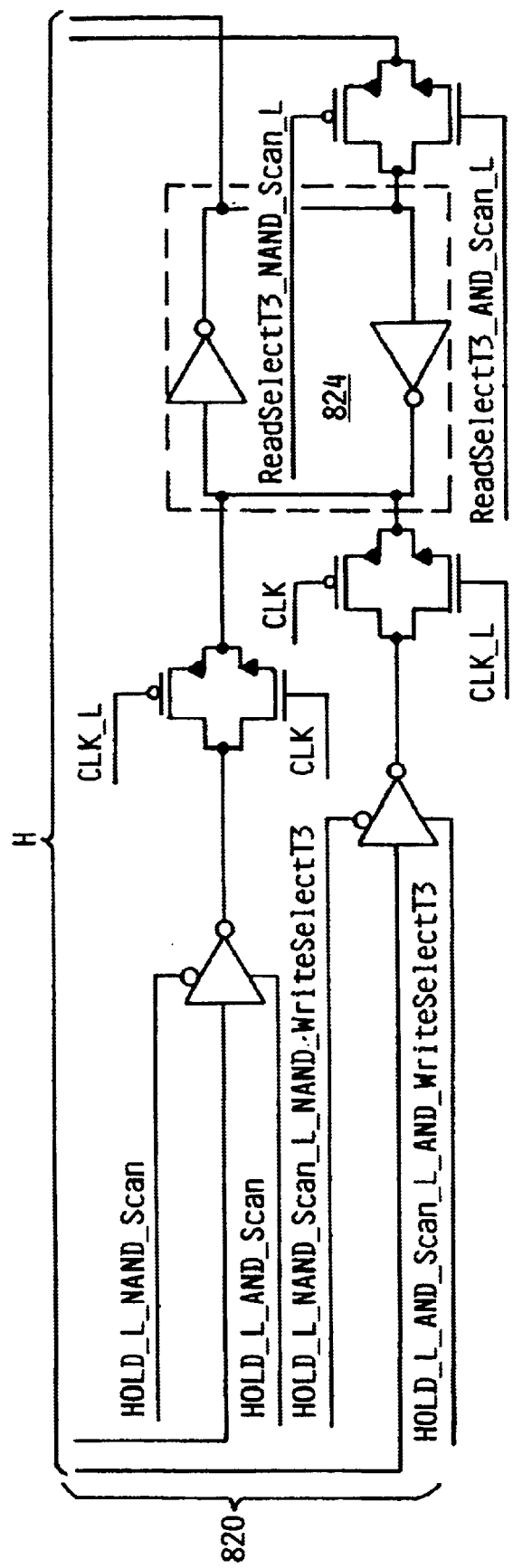

FIG. 8 illustrates such a circuit configuration at a high level. In the circuit of FIG. 8, four threads are supported, it being understood that a different number of threads could be supported. Preferably, two latch circuits 800, 820 are paired, the latch circuits storing a pair of bits (designated Bit 1 (circuit 800) and bit 2 (circuit 820)). On the right, these circuits are illustrated in normal functional mode. I.e., in circuit 800 four K0 cells 801–804 provide input to a common K1 cell 805, and similarly in circuit 820, K0 cells 821–824 provide input to common K1 cell 825. It is understood that select logic, write ports, etc., are omitted from this high-level diagram for clarity of illustration. On the left, these circuits are illustrated in scan mode. In scan mode, cells 822, 823 and 824, which function as K0 cells in normal functional mode, operate as K1 cells. By changing the clock phase of certain cells, the number of K0 cells in the pair of latches 800, 820 equals the number of K1 cells, when the latches are being operated in scan mode. This makes it possible to construct a scan path through each cell once and only once. The scan path is shown on the left side of FIG. 8. I.e., the scan path goes from K0 cell 801 to K1 cell 805 to K0 cell 802 to cell 823 (acting as a K1 cell for scan mode only) to K0 cell 804 to cell 822 (acting as a K1 cell for scan mode only) to K0 cell 803 to cell 824 (acting as a K1 cell for scan mode only) to K0 cell 821 to K1 cell 825.

Figures 1, 9A:
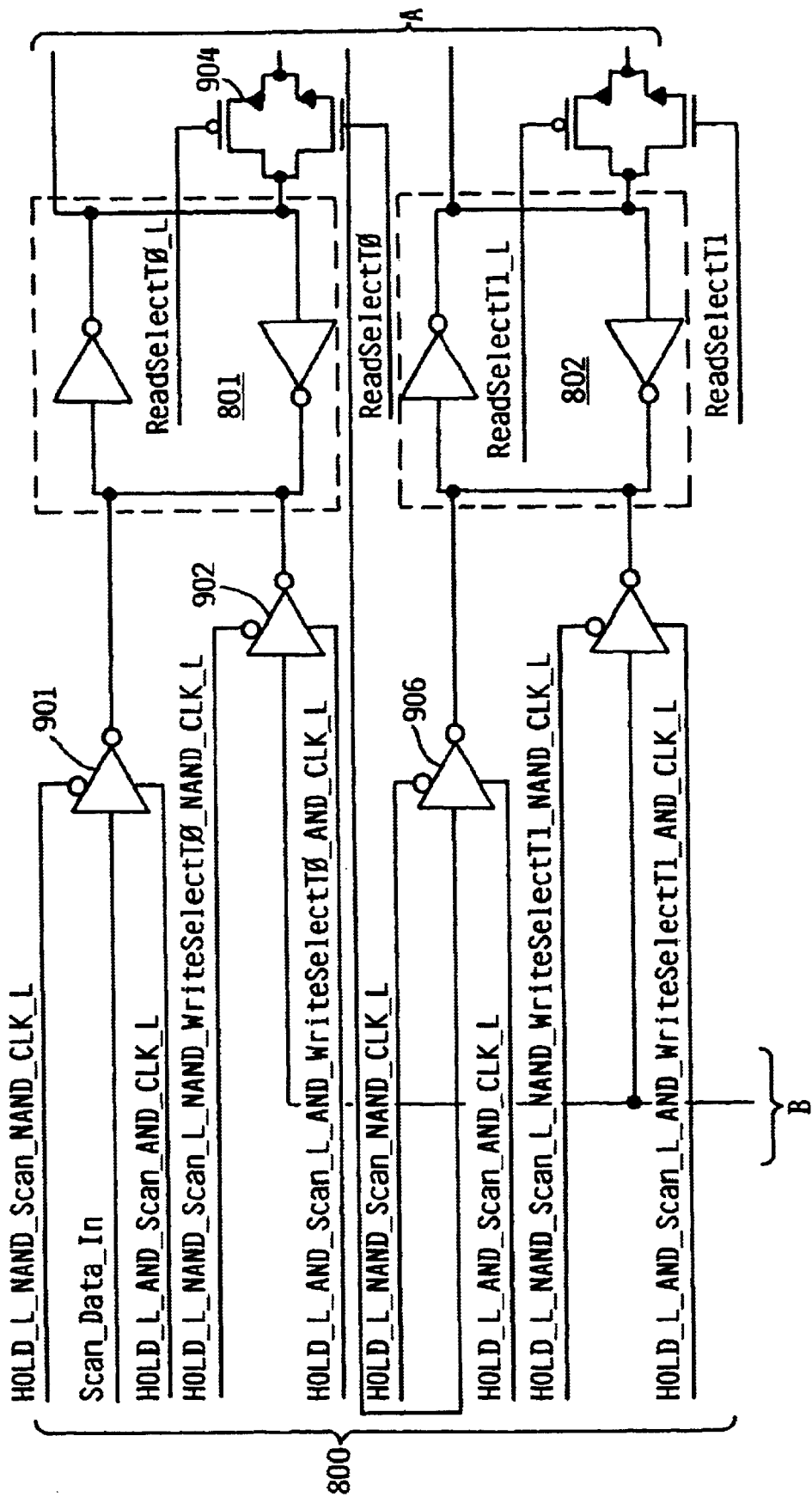
FIG. 9A illustrates a detailed implementation of one embodiment of the circuit of FIG. 8.
Figures 2, 9A:
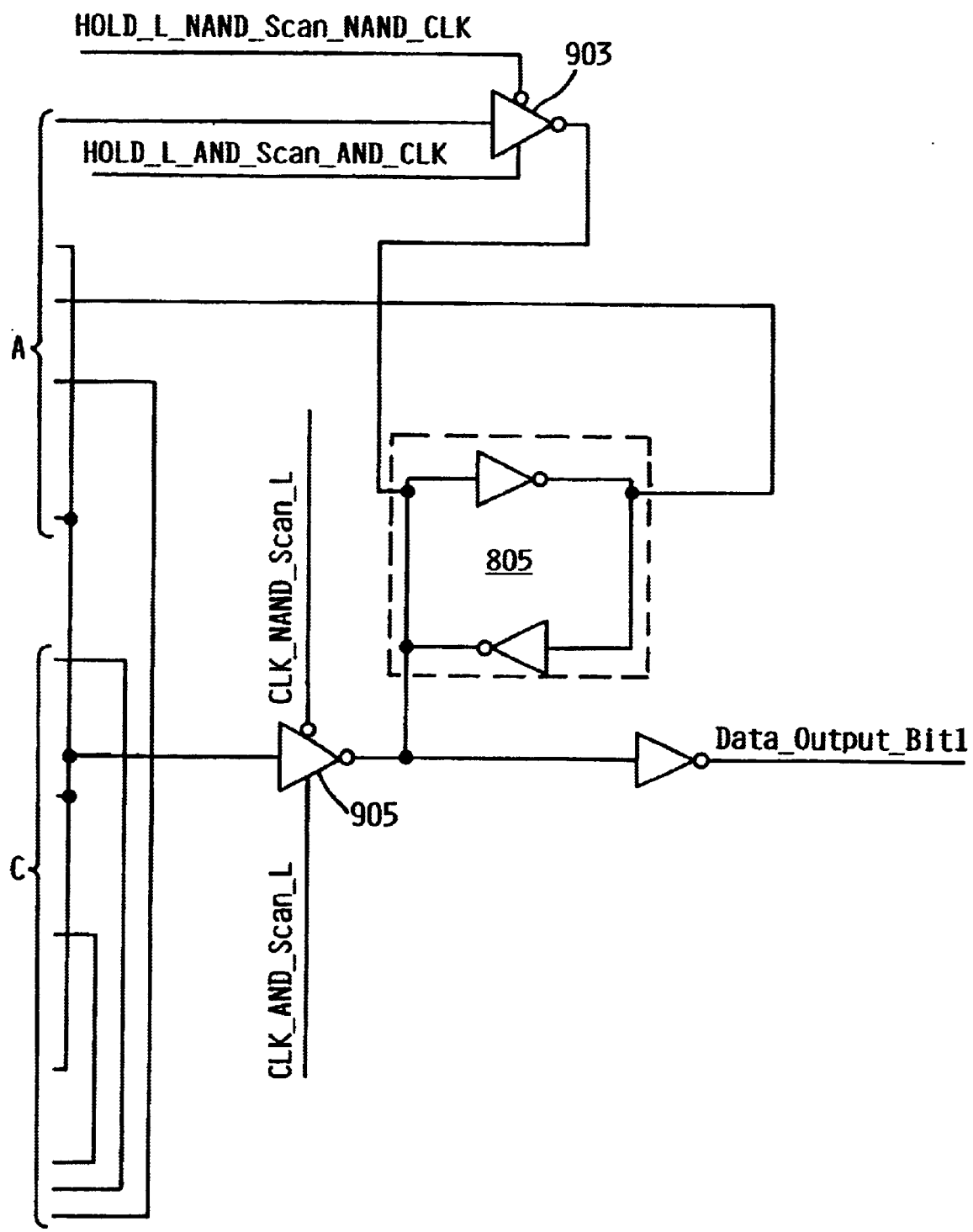
Figures 3, 9A:
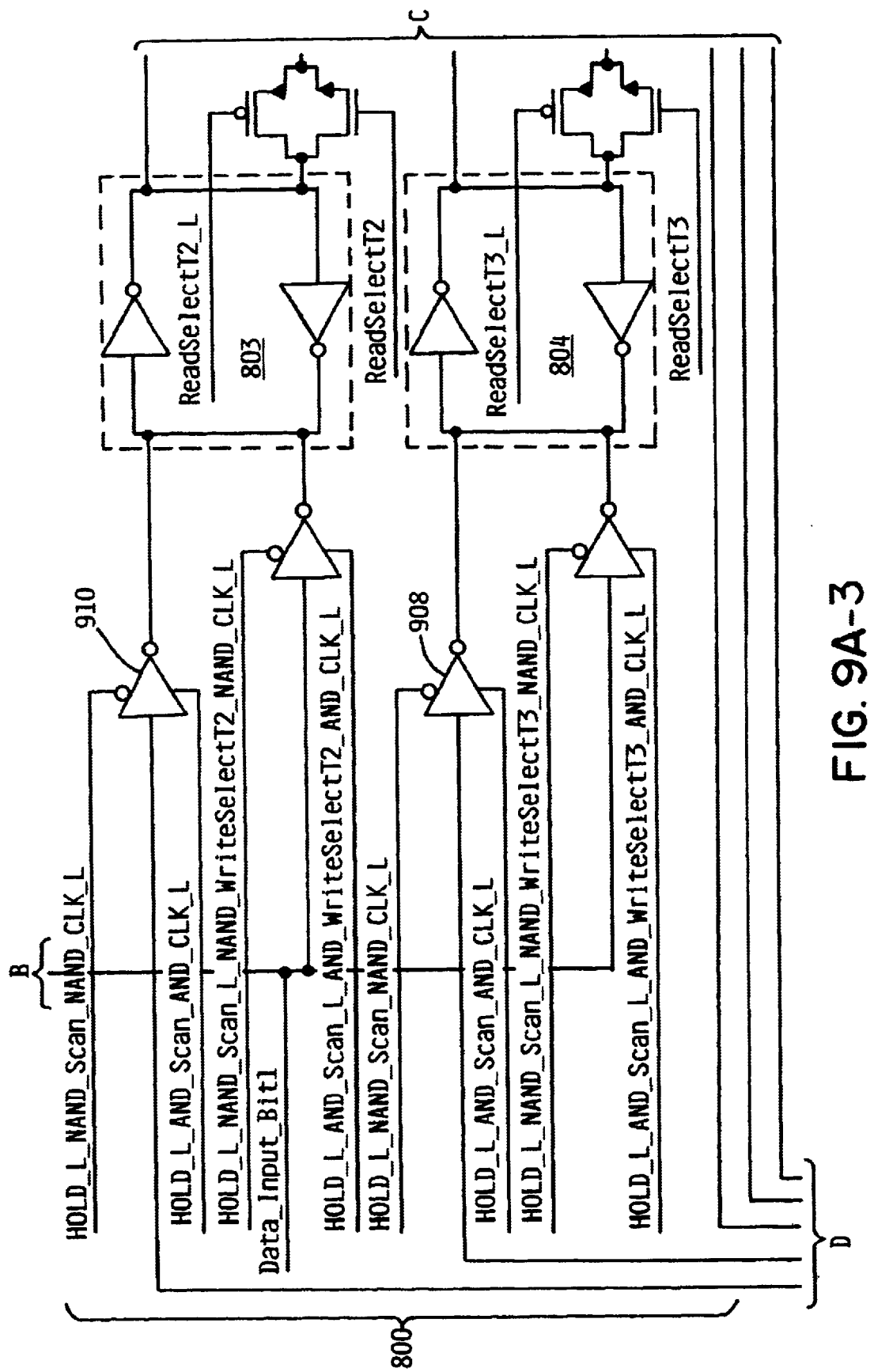
Figures 4, 9A:
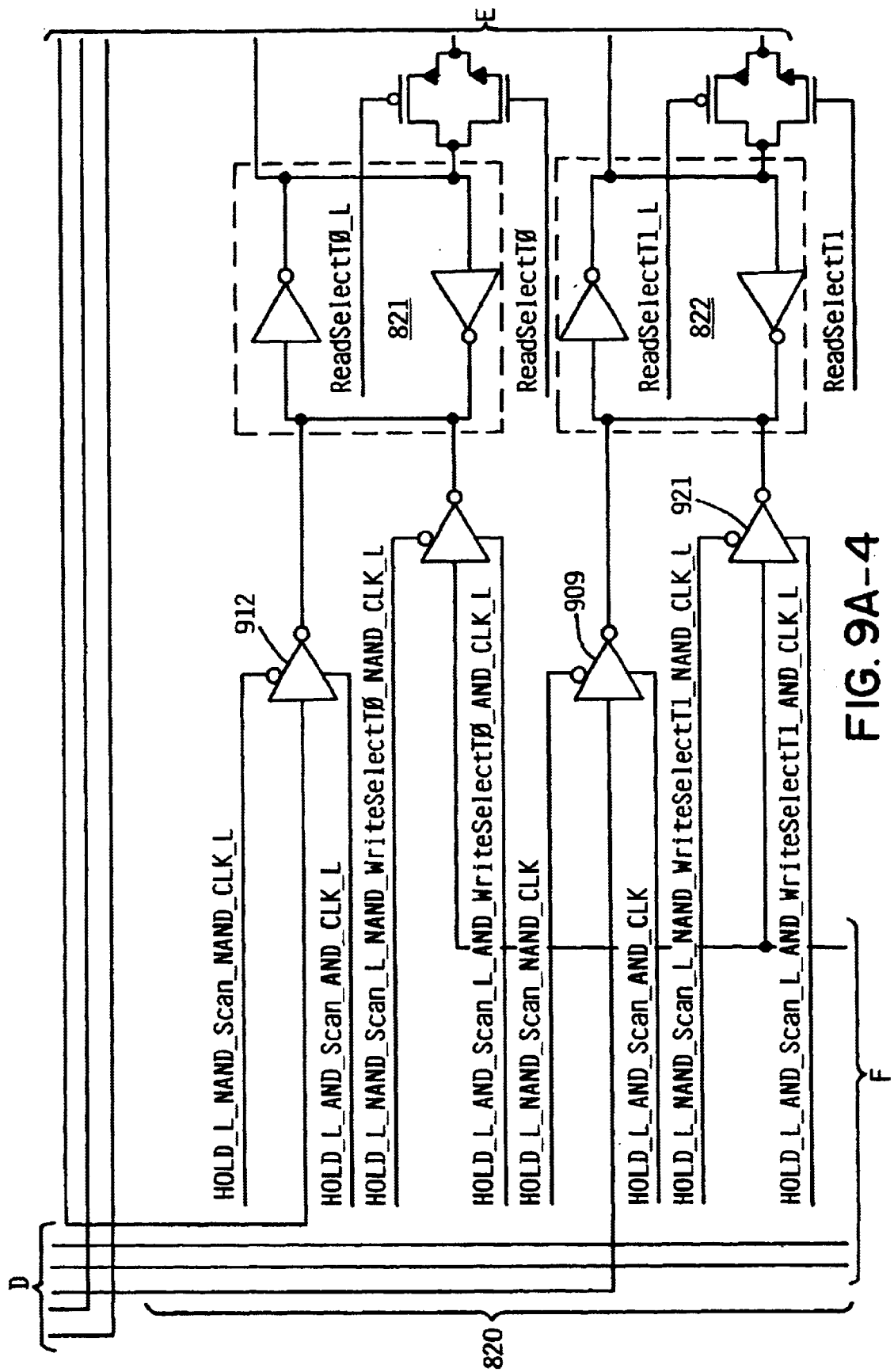
Figures 5, 9A:
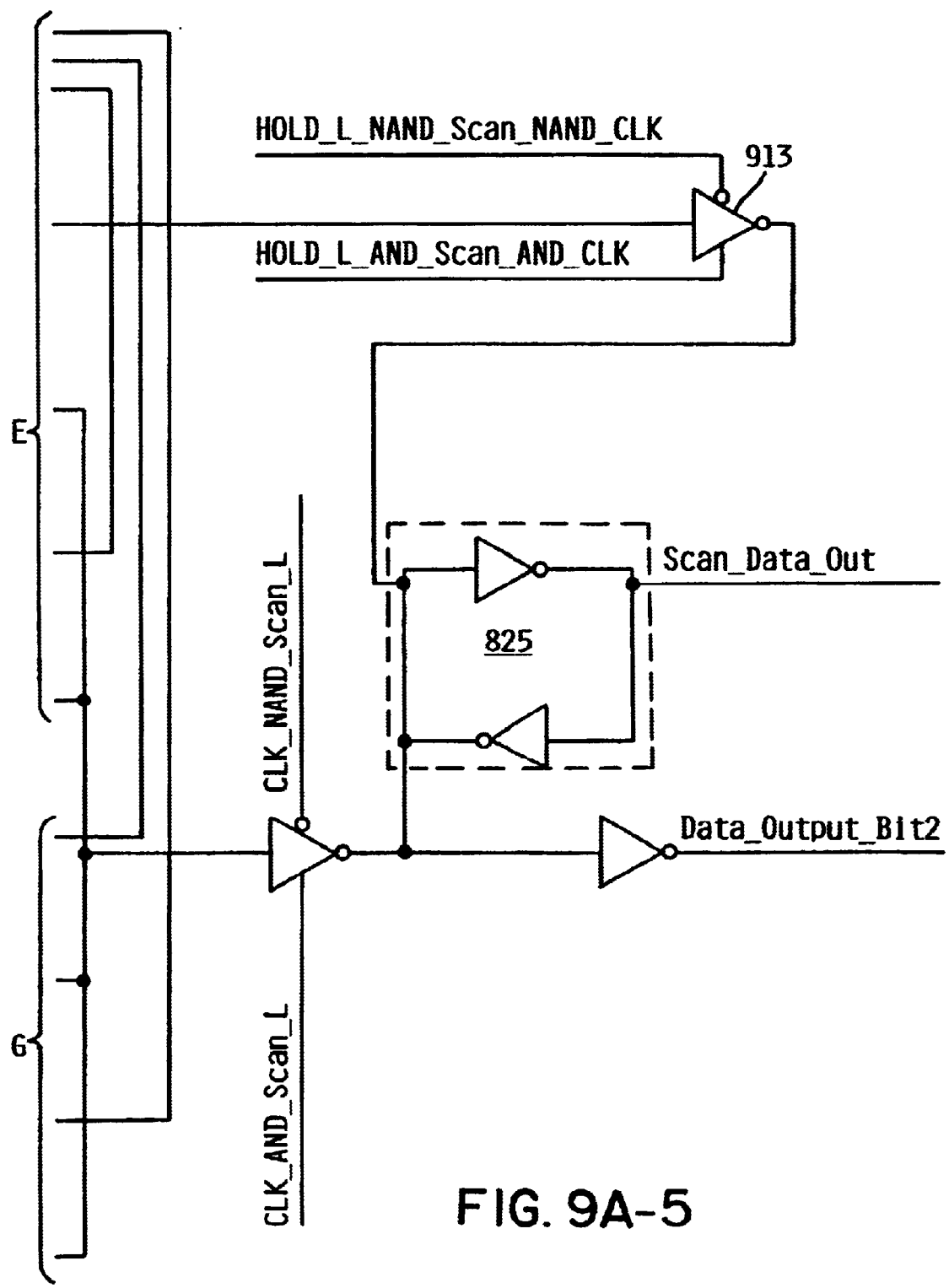
Figures 6, 9A:
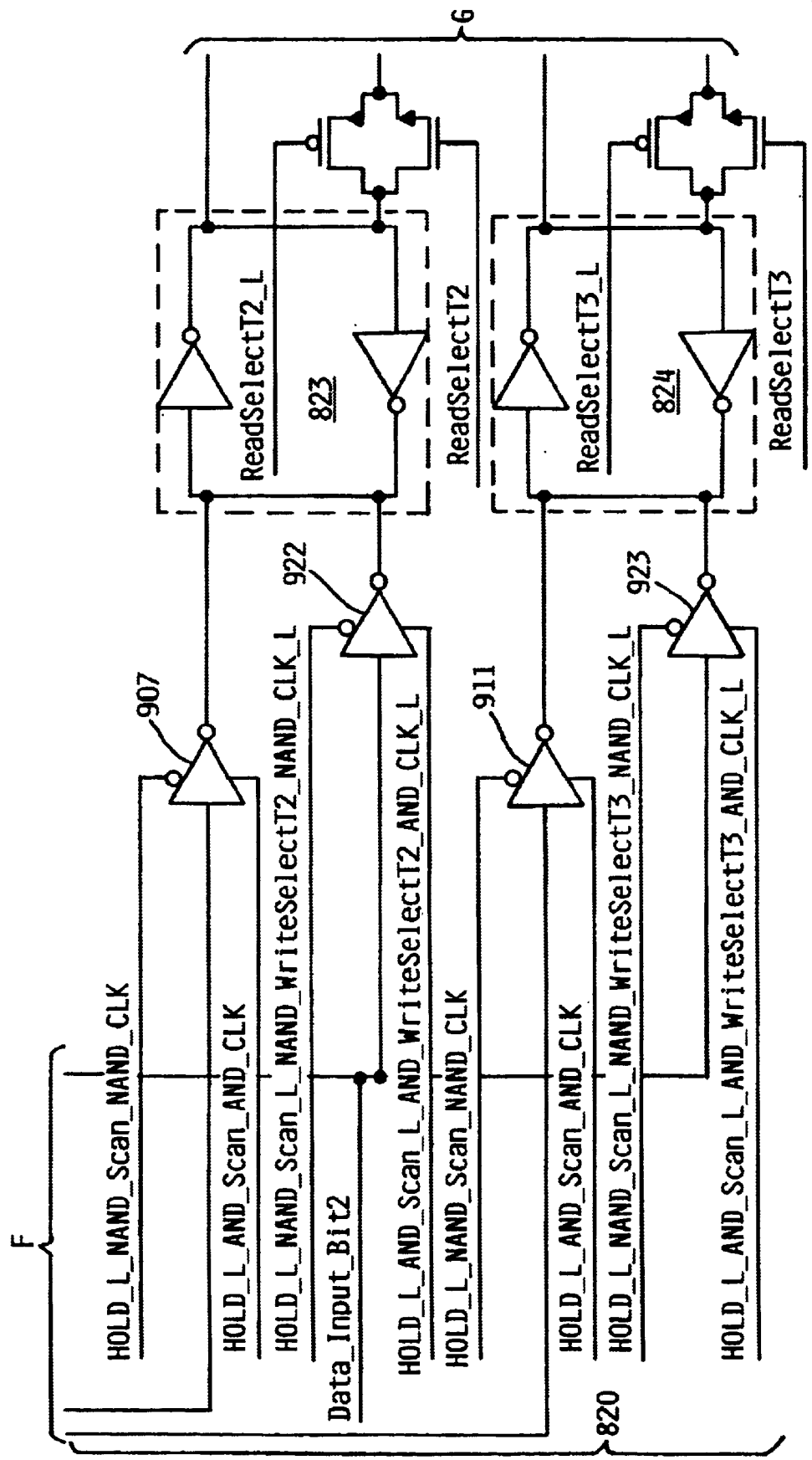
Figures 1, 9B:
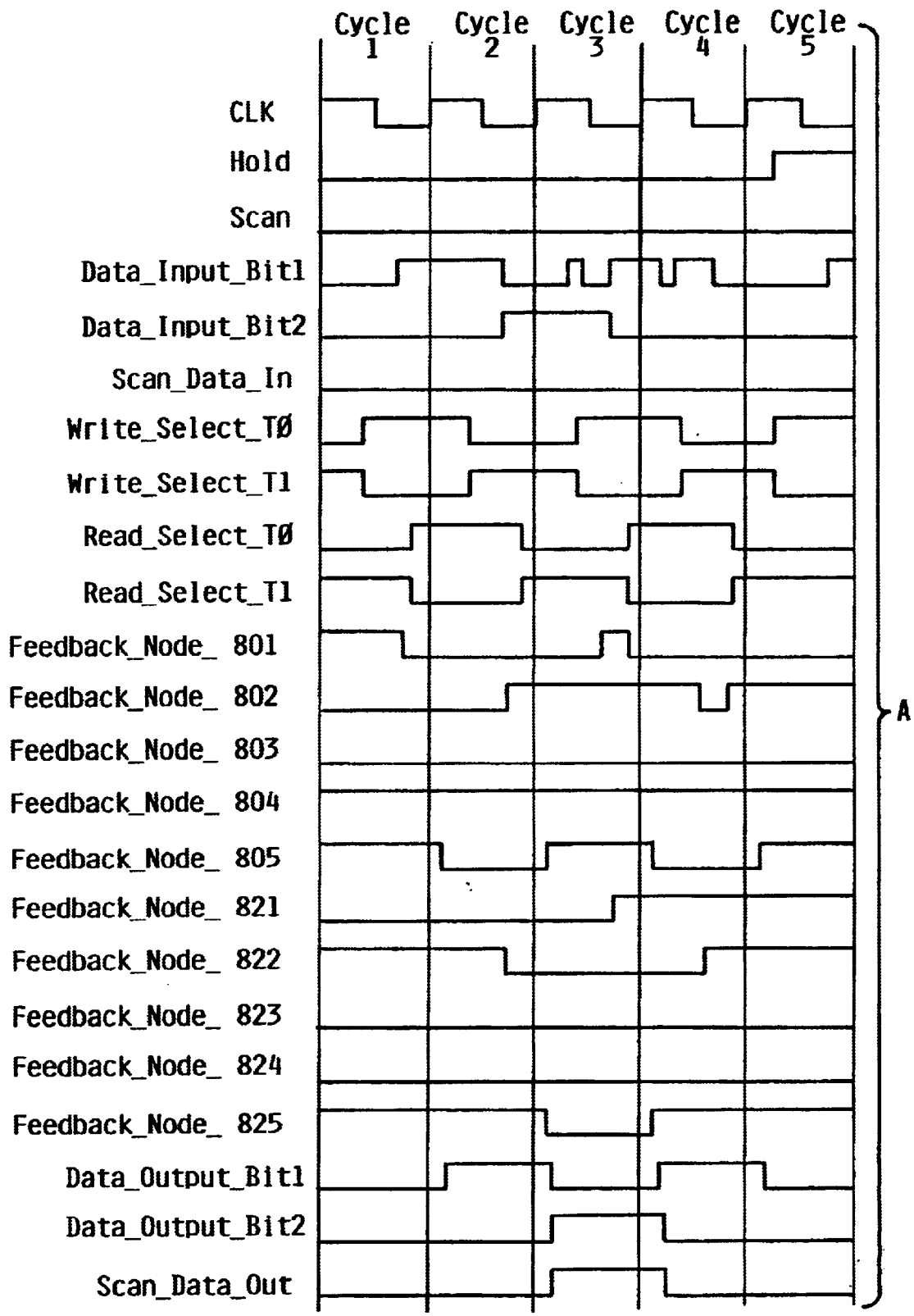
FIG. 9B illustrates a functional waveforms of the circuit of FIG. 9A.
Figures 2, 9B:
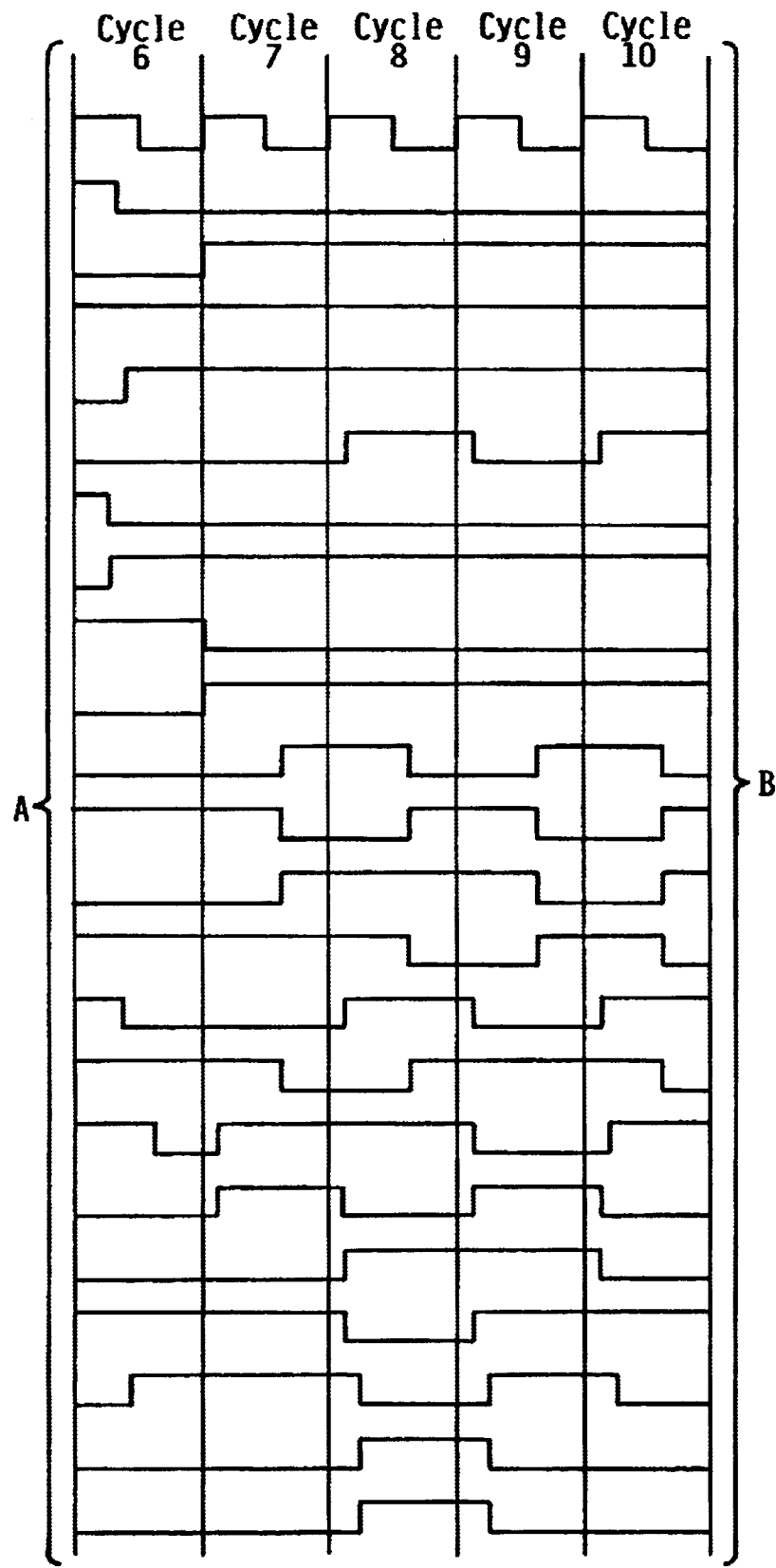
Figures 3, 9B:
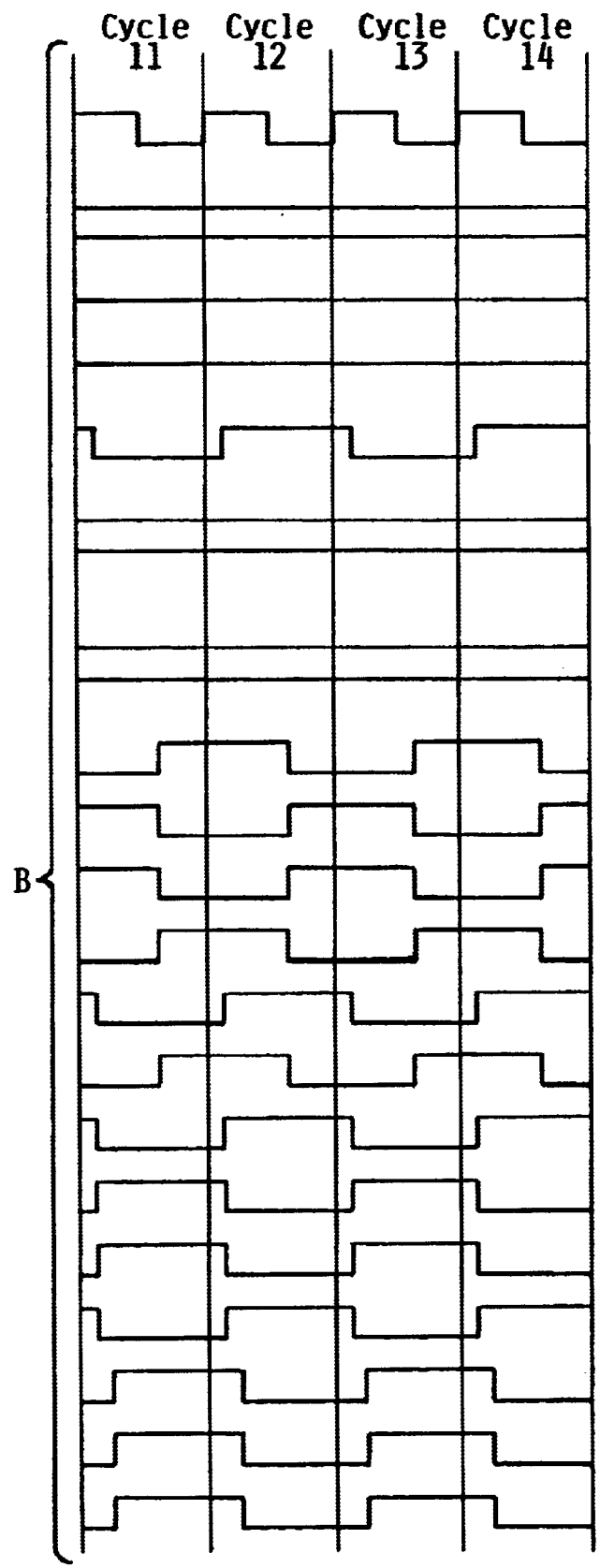

FIG. 9A illustrates one implementation of the scannable paired circuit configuration of FIG. 8. As shown in FIG. 9A, a pair of gated inverters 901, 902 drive K0 memory element 801. Inverter 901 receives scan data, while inverter 902 receives data from functional logic. The scan control is input to the gates of both inverters, so that inverter 901 is gated on only when scan control is active, while inverter 902 is gated on only if scan control is inactive. The output of K0 cell 801 feeds gated inverter 903 and transmission gate 904, which is part of the selection logic. Inverter 903 is gated on only if scan control is active. The four transmission gates which make up selection logic feed clocked inverter 905, which is also shut off is scan control is active. Thus two separate logic paths are provided from K0 cell 801 to K1 cell 805, one (through inverter 903) being active only if scan control is active, while the other (through gate 904 and inverter 905) being active only if scan control is inactive. Thus, the path followed when scan control is active is completely independent of write select and read select signals. From K1 cell 805, the scan path in turn traverses clocked inverter 906, element 802, clocked inverter 907, element 823, clocked inverter 908, element 804, clocked inverter 909, element 822, clocked inverter 910, element 803, clocked inverter 911, element 824, clocked inverter 912, element 821, clocked inverter 913, and element 825. It will be observed that inverters 907, 909 and 911 are driven on the high phase of the clock while in scan mode, but that the corresponding inverters 921, 922, 923 which drive the same elements 822,823,824 in normal functional mode are driven on the low clock phase. Thus, elements 822, 823, 824 act as K0 elements in normal functional mode, and as K1 elements in scan mode. FIG. 9B is a timing diagram of the circuit of FIG. 9A.

Figures 1, 10B:
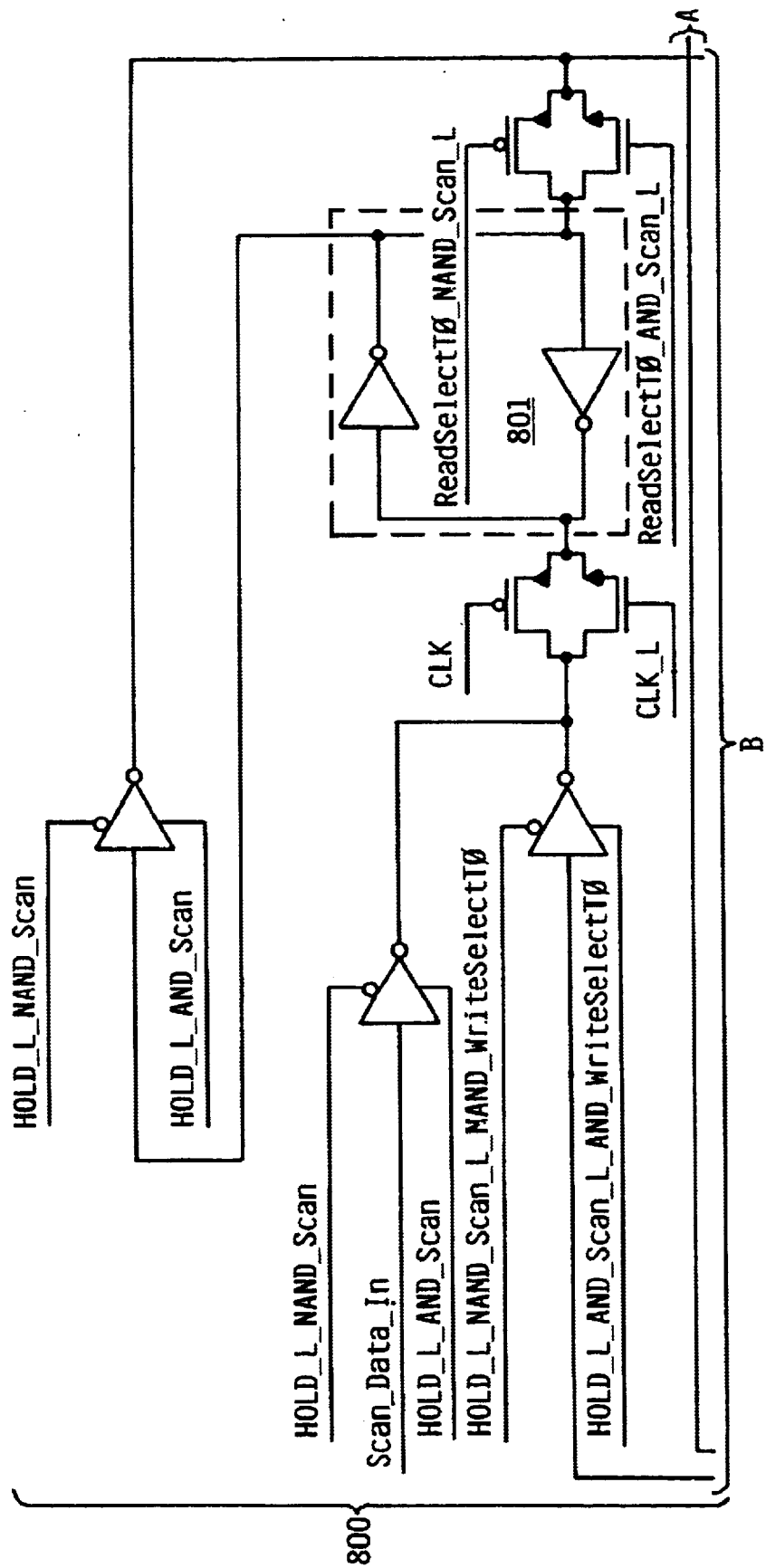
Figures 6, 10B:
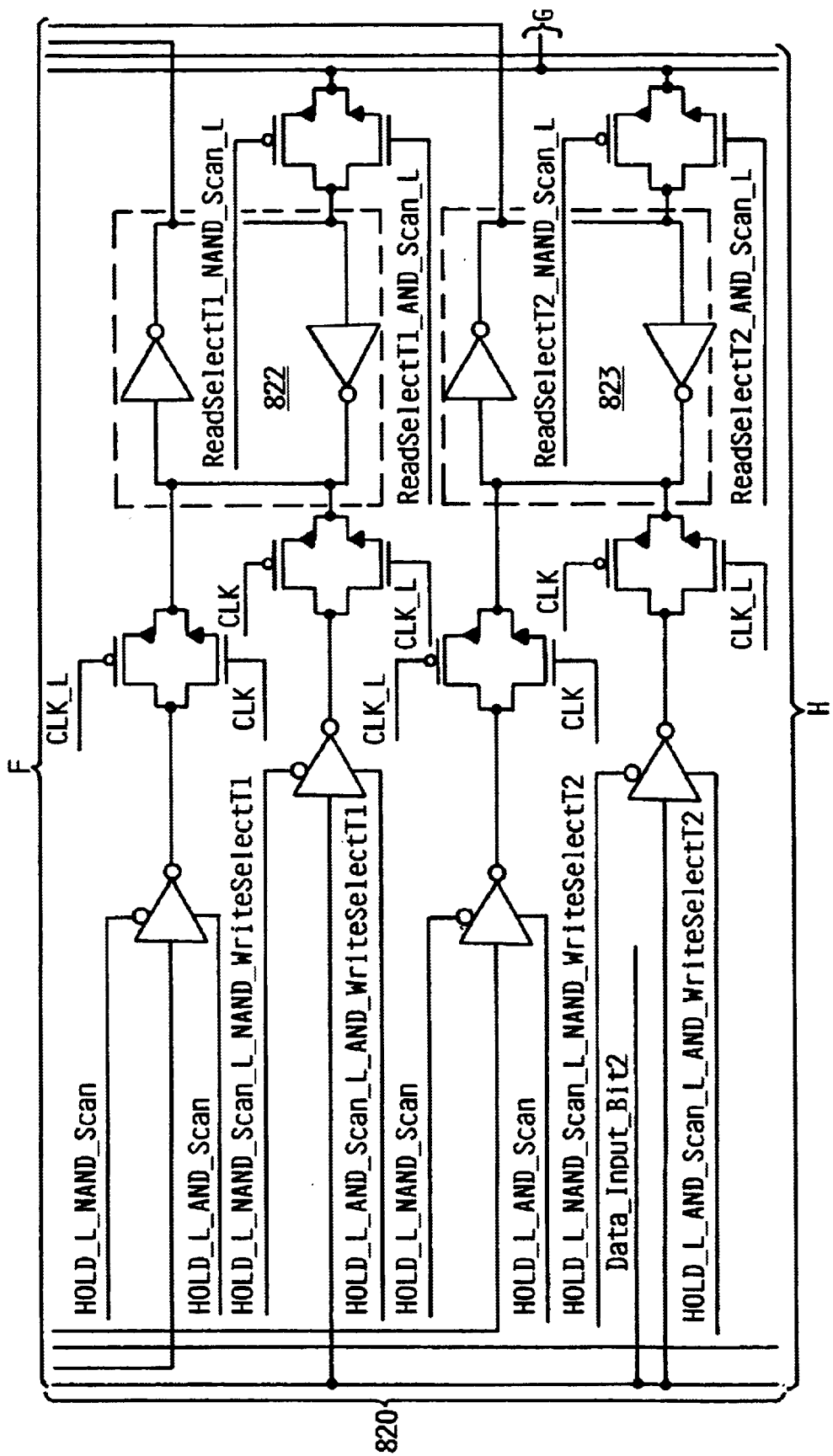
Figures 7, 10B:
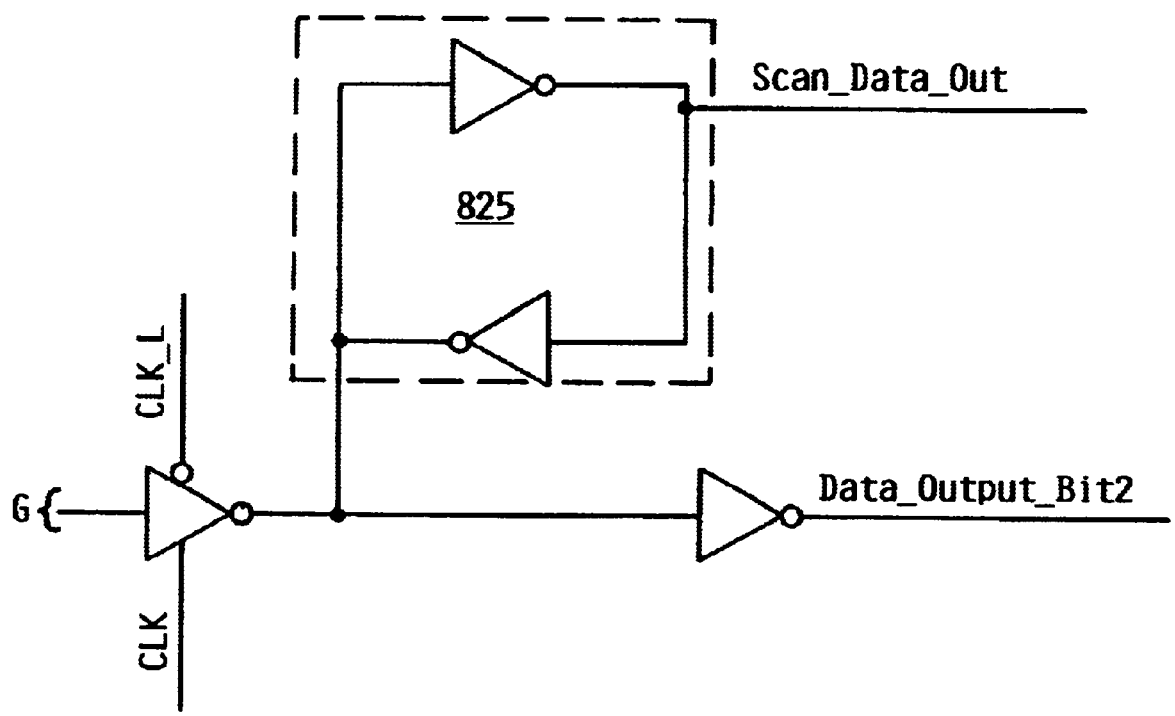
Figures 8, 10B:
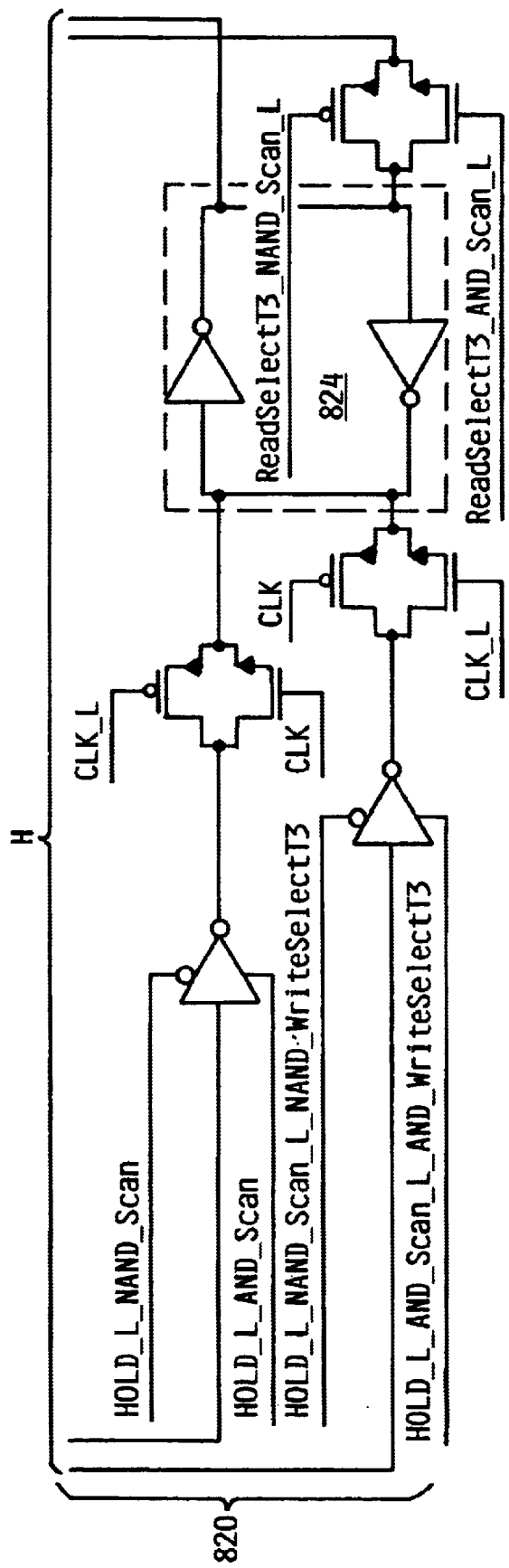

FIGS. 10A and 10B represent alternative embodiments of the circuit configuration of FIG. 8. In comparing the circuit of FIG. 10A to that of FIG. 9A, it will be observed that in FIG. 9A, the clock is logically ANDed with other control lines for control of various gated inverters, while in FIG. 10A the clock is separate. In the circuit of FIG. 10B, the circuit of FIG. 10A is further modified by combining the two inputs to each of elements 801–804 and 821 before the clocked transmission gates, thus eliminating five transmission gates (one for each element). Note that it is not possible to combine the inputs for elements 822–824, because these inputs (scan and normal functional mode) require different clocks.

As observed, the prior art circuit of FIG. 4A contains a feedback loop from the K1 element to the K0 element, gated by the HOLD signal. In the various embodiments of the present invention discussed above, the K0 element holds its value because all the drivers are shut off in the presence of the HOLD signal, obviating the need for a feedback loop. However, there may be applications in which it is desirable to drive the K0 elements in the presence of a HOLD signal, rather than simply shut off all input drivers. There may, for example, be subtle timing concerns with the various input controls.

A HOLD signal, when active, should take precedence over all other control signals. I.e., if HOLD is active, the circuit should hold all values, regardless of the state of other control signals. If the HOLD is inactive, and Scan control is active, the circuit operates in scan mode. If neither HOLD nor Scan is active, the circuit operates in normal functional mode.

If one considers only a single latch circuit in functional mode, it would appear impossible to provide a feedback loop for each K0 element, because there is only one K1 element, which is shared. However, as discussed above and shown in the configuration of FIG. 8, and various embodiments thereof, it is possible to pair two latch circuits, and to alter the clock phase for some of the elements, so that the number of K0 and K1 elements is equal. If the number of K0 and K1 elements is equal, it is also possible to provide feedback from each K1 element to a corresponding K0 element, thus positively driving the K0 element in the presence of a HOLD signal.

Figure 11:
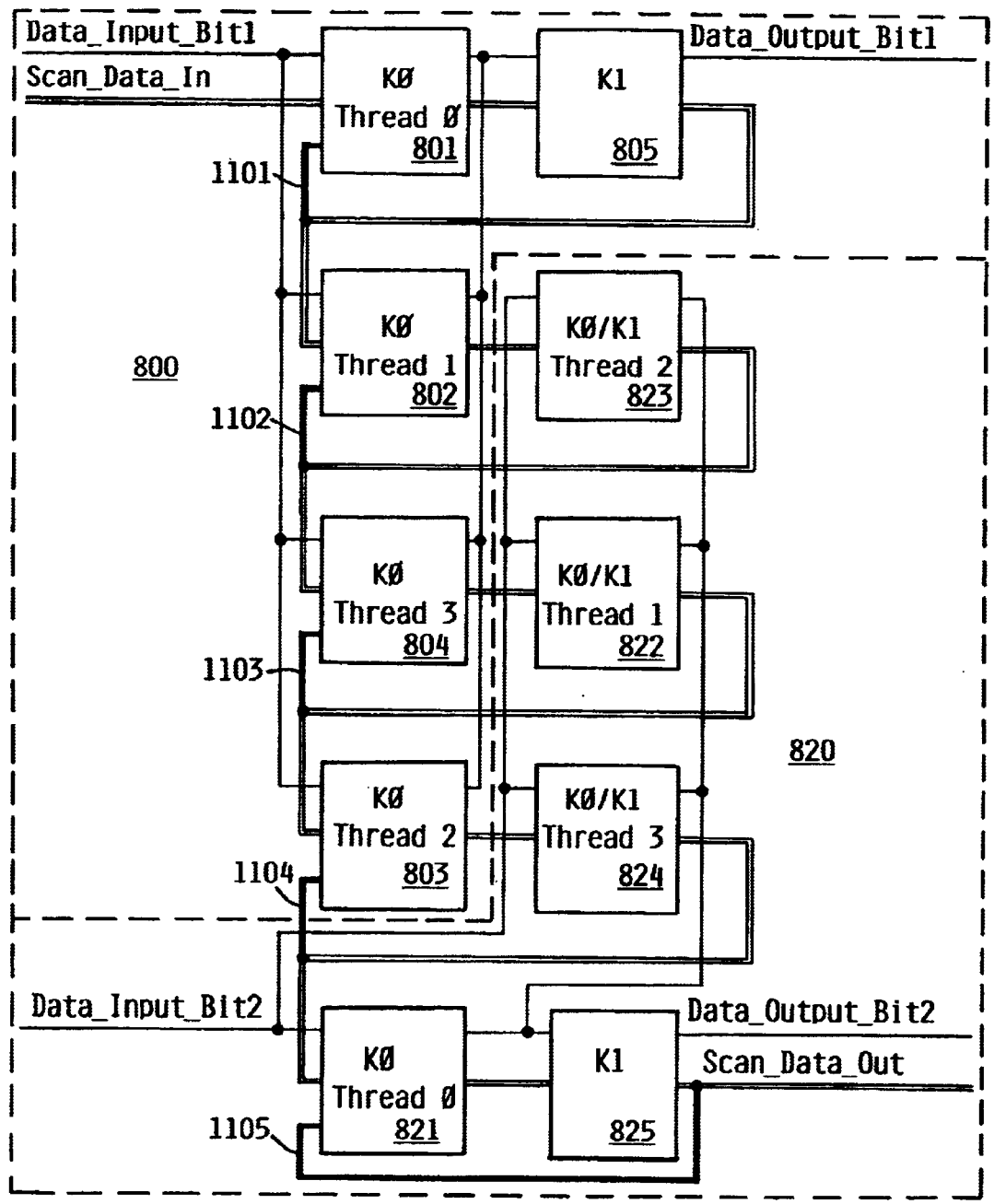
FIG. 11 illustrates at a high level of abstraction a pair of latch circuits having scan and feedback paths, in accordance with certain embodiments of the present invention.
Figure 12A:
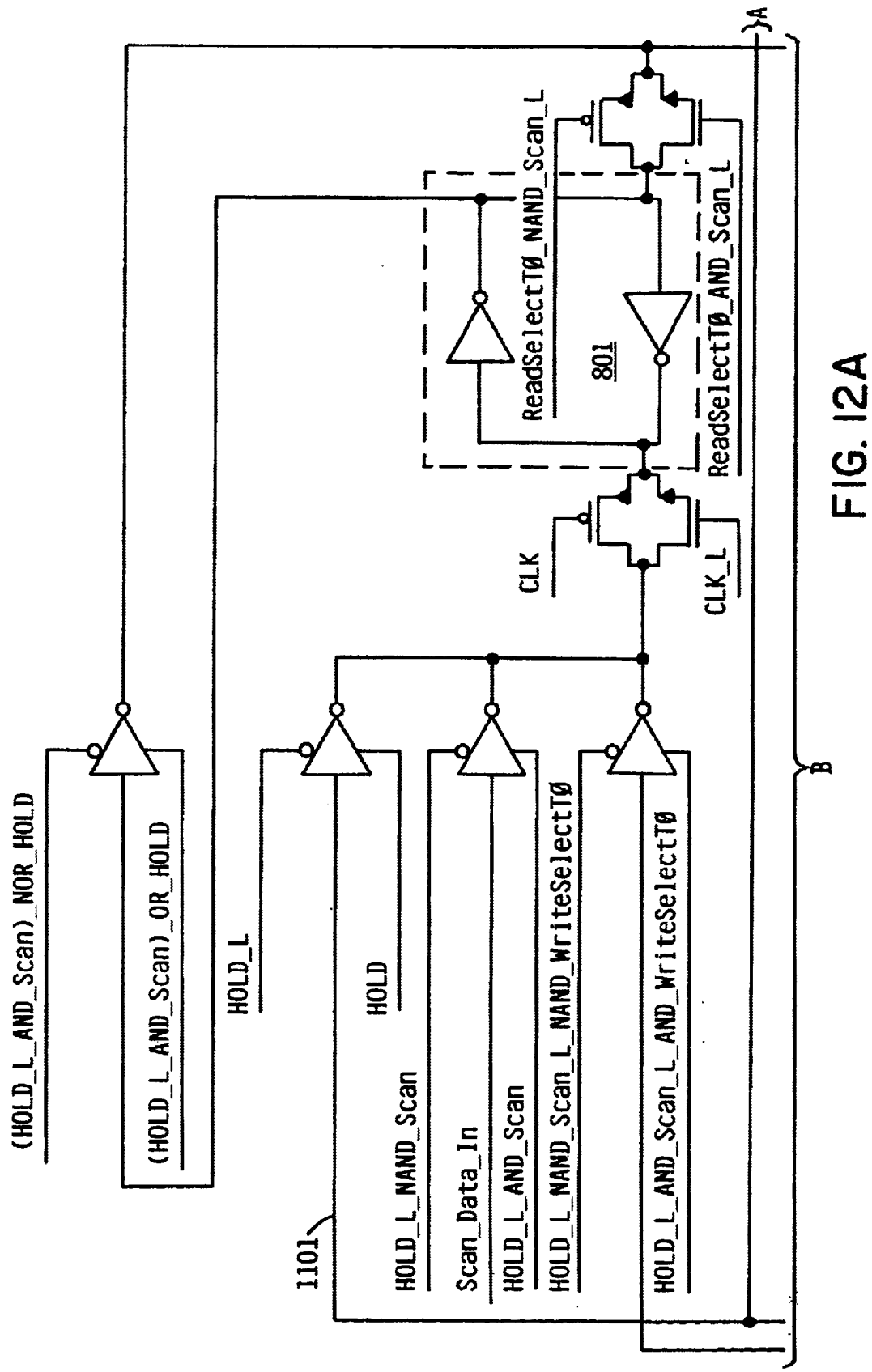
FIG. 12 illustrates a detailed implementation of one embodiment of the circuit of FIG. 11.
Figure 12B:
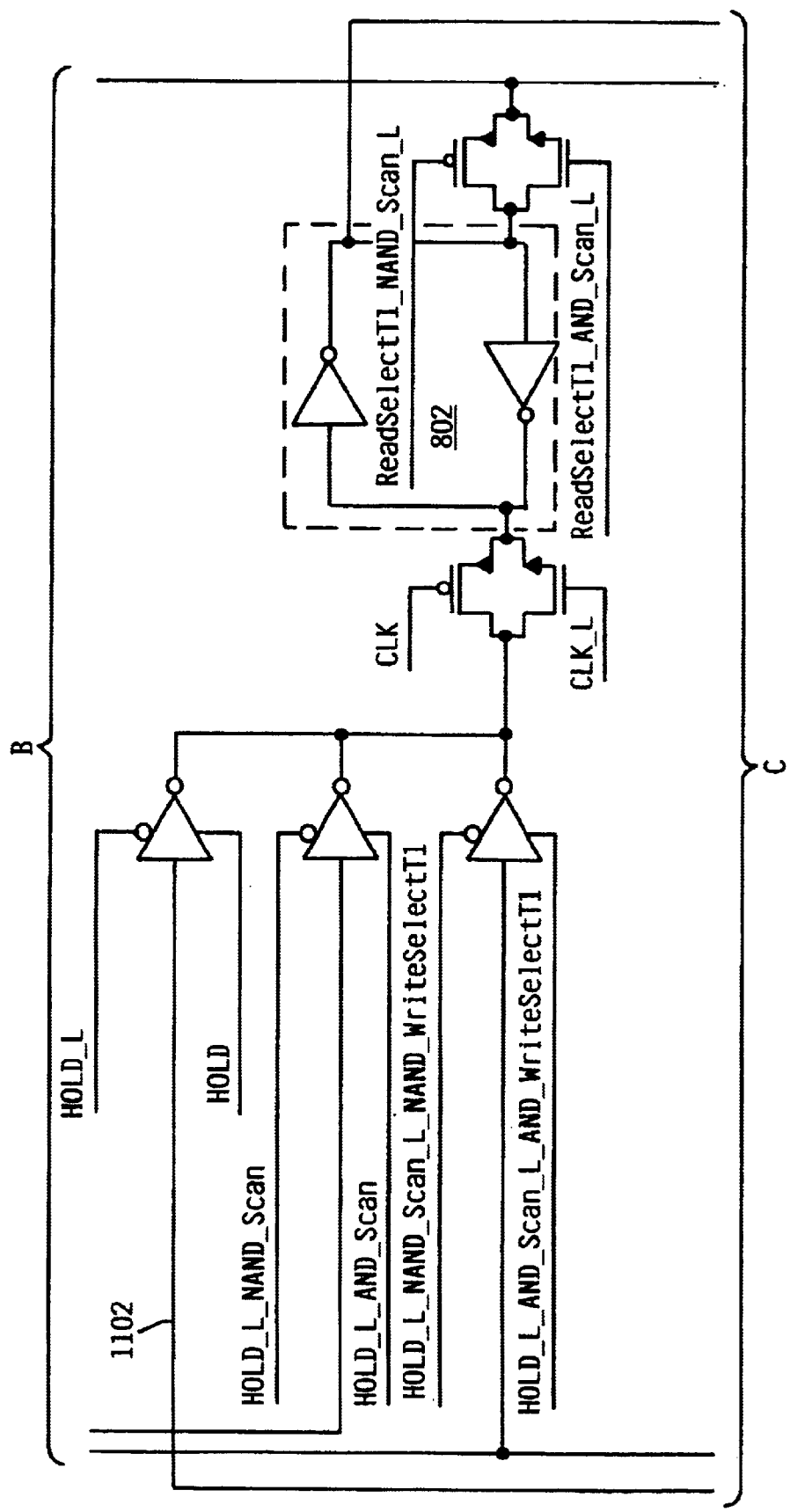
Figure 12C:
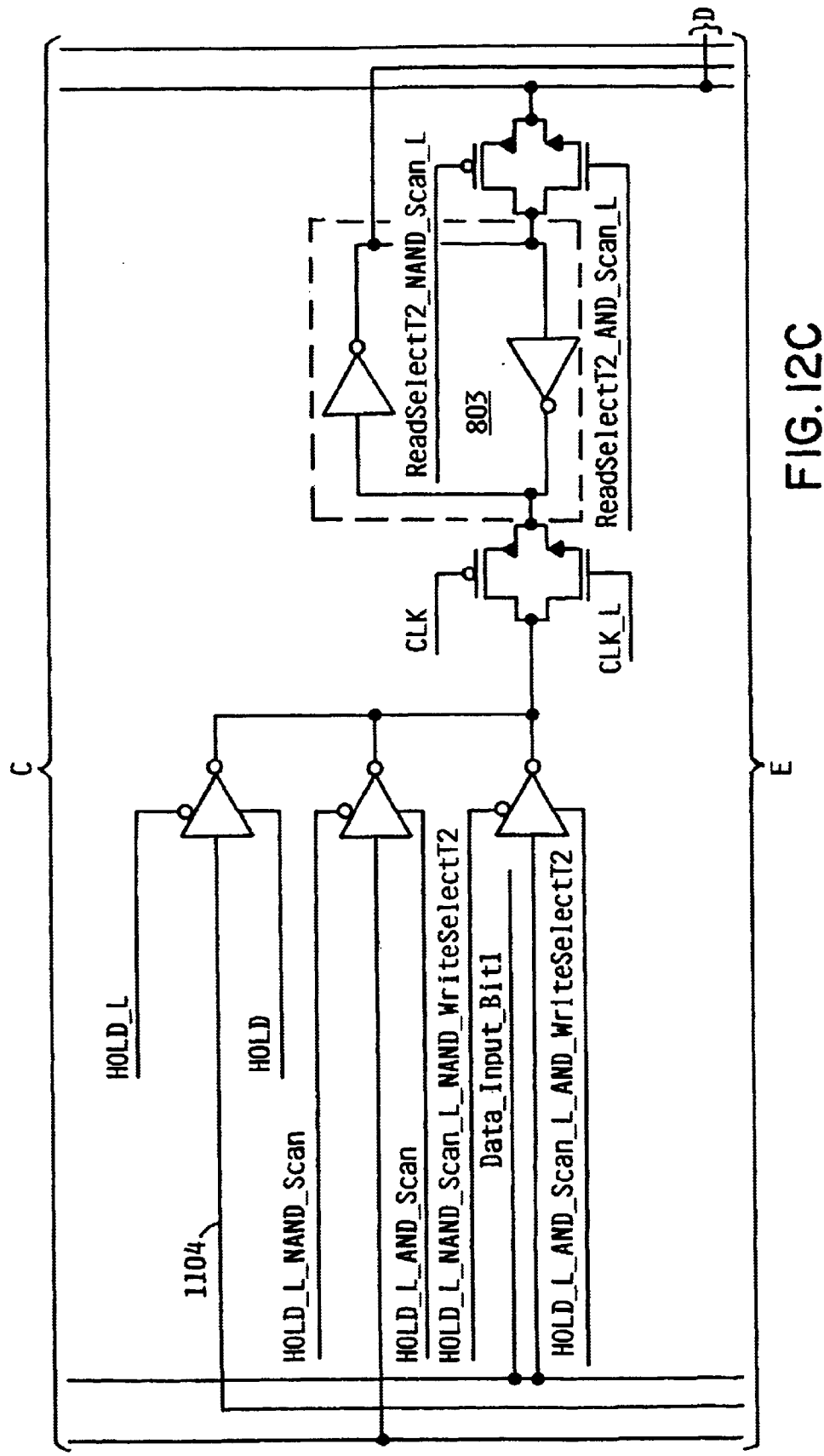
Figure 12D:
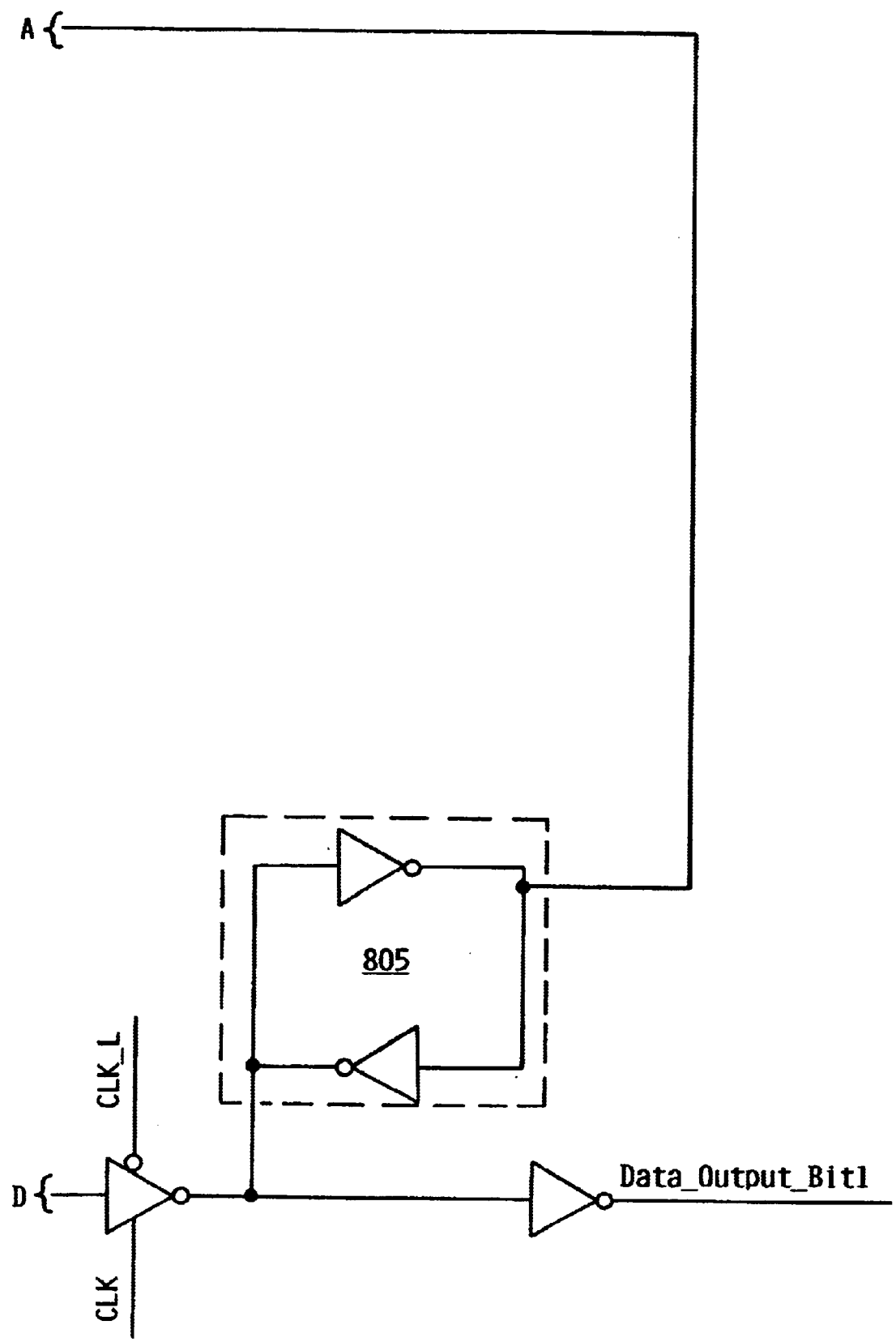
Figure 12E:
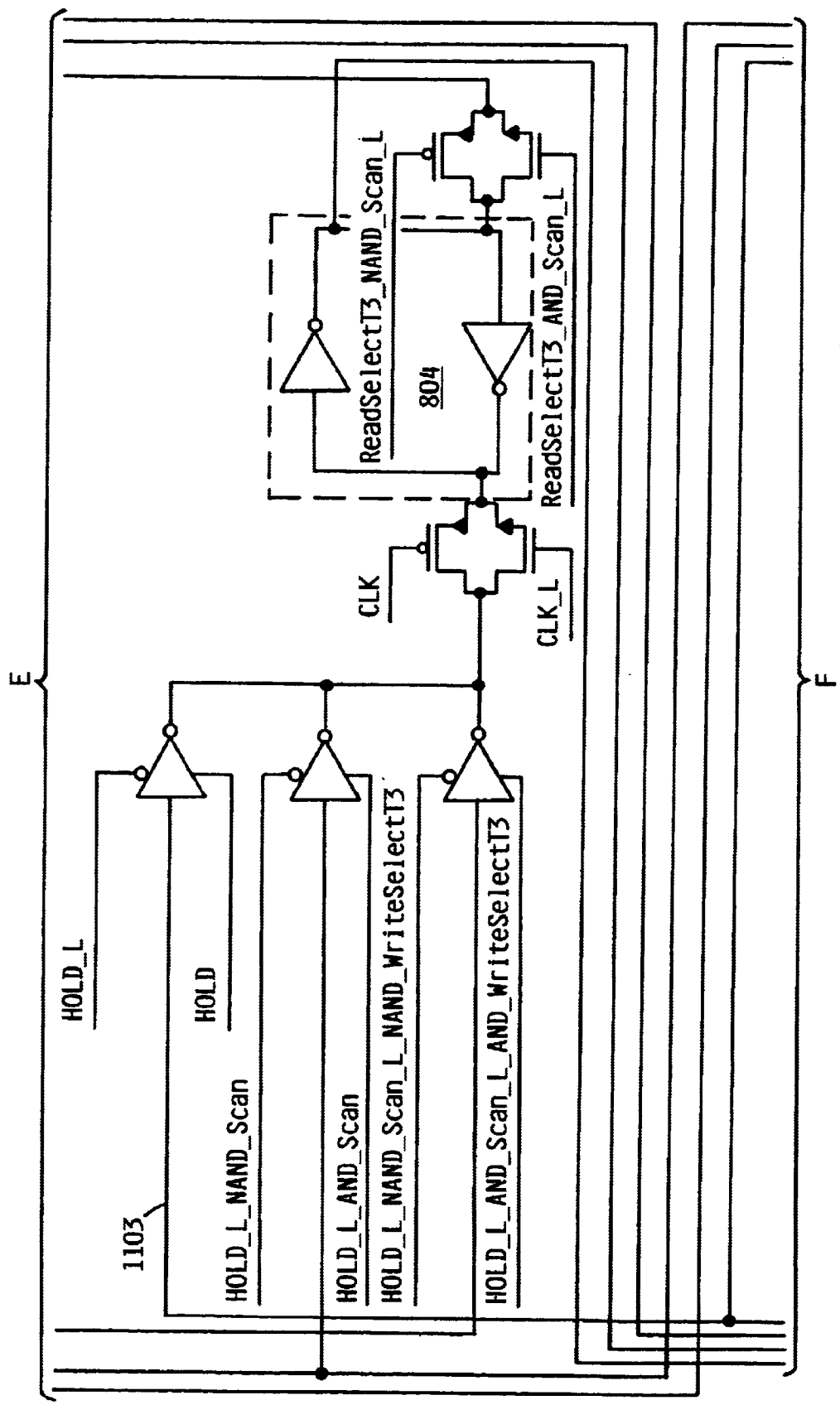
Figure 12F:
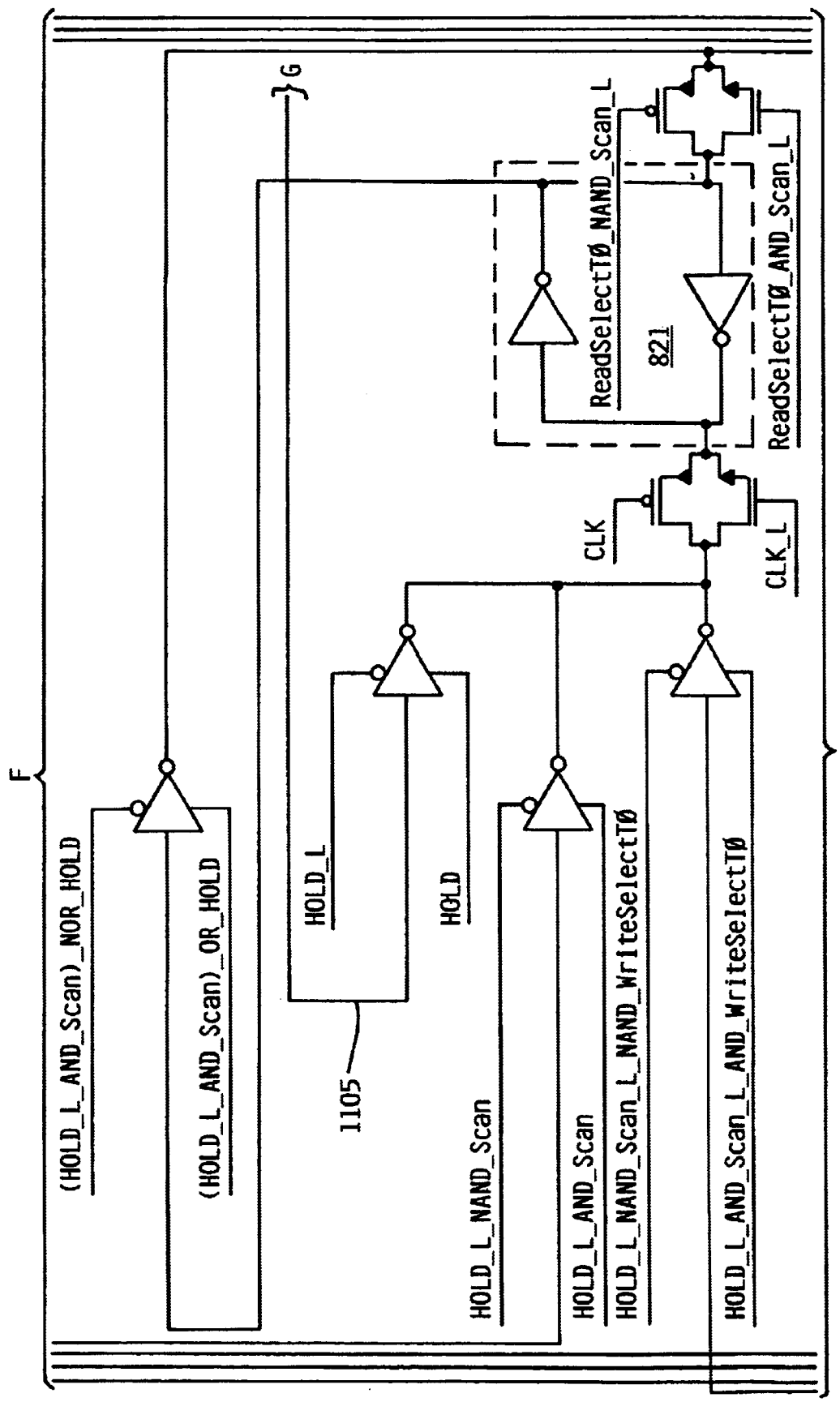
Figure 12G:
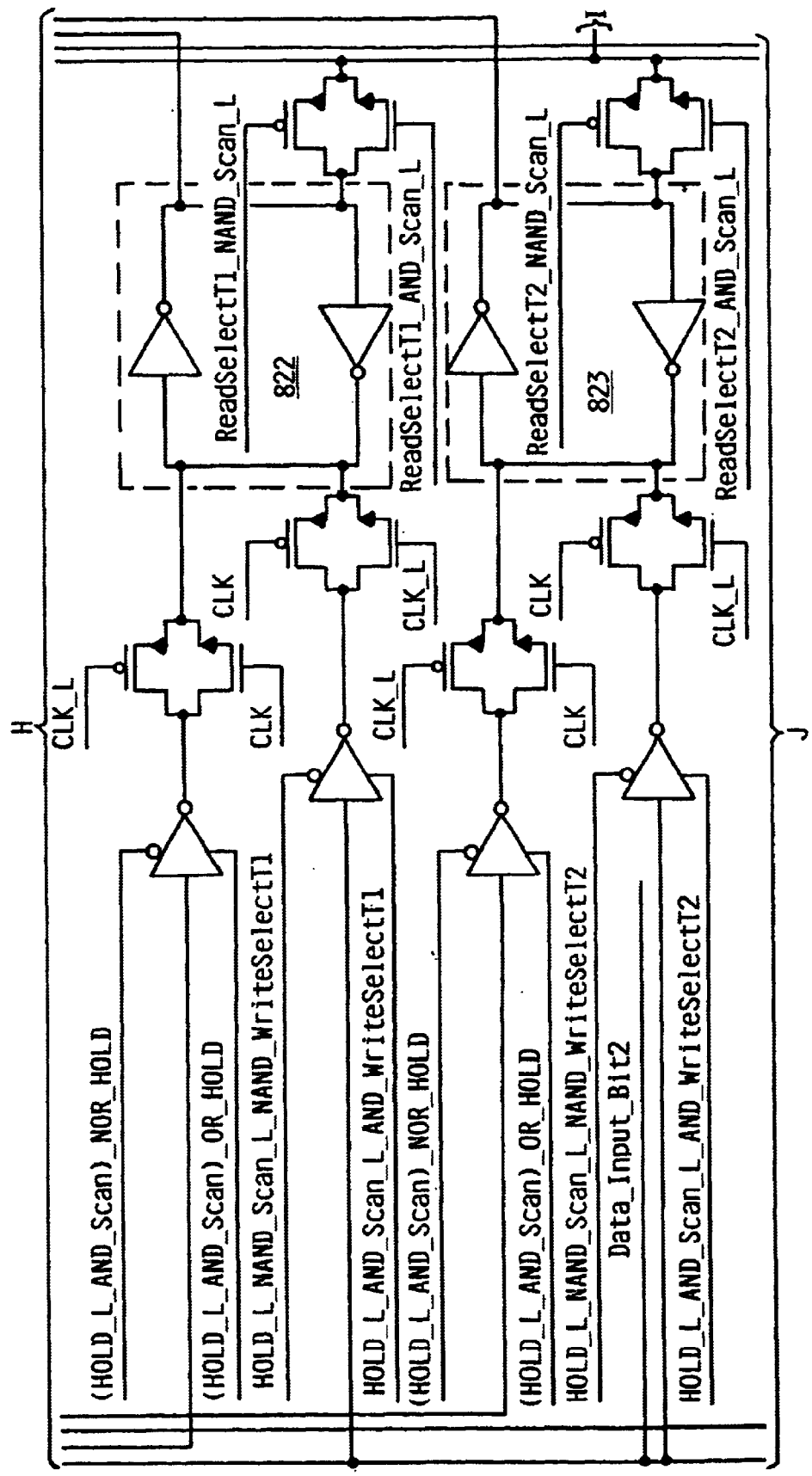
Figure 12H:
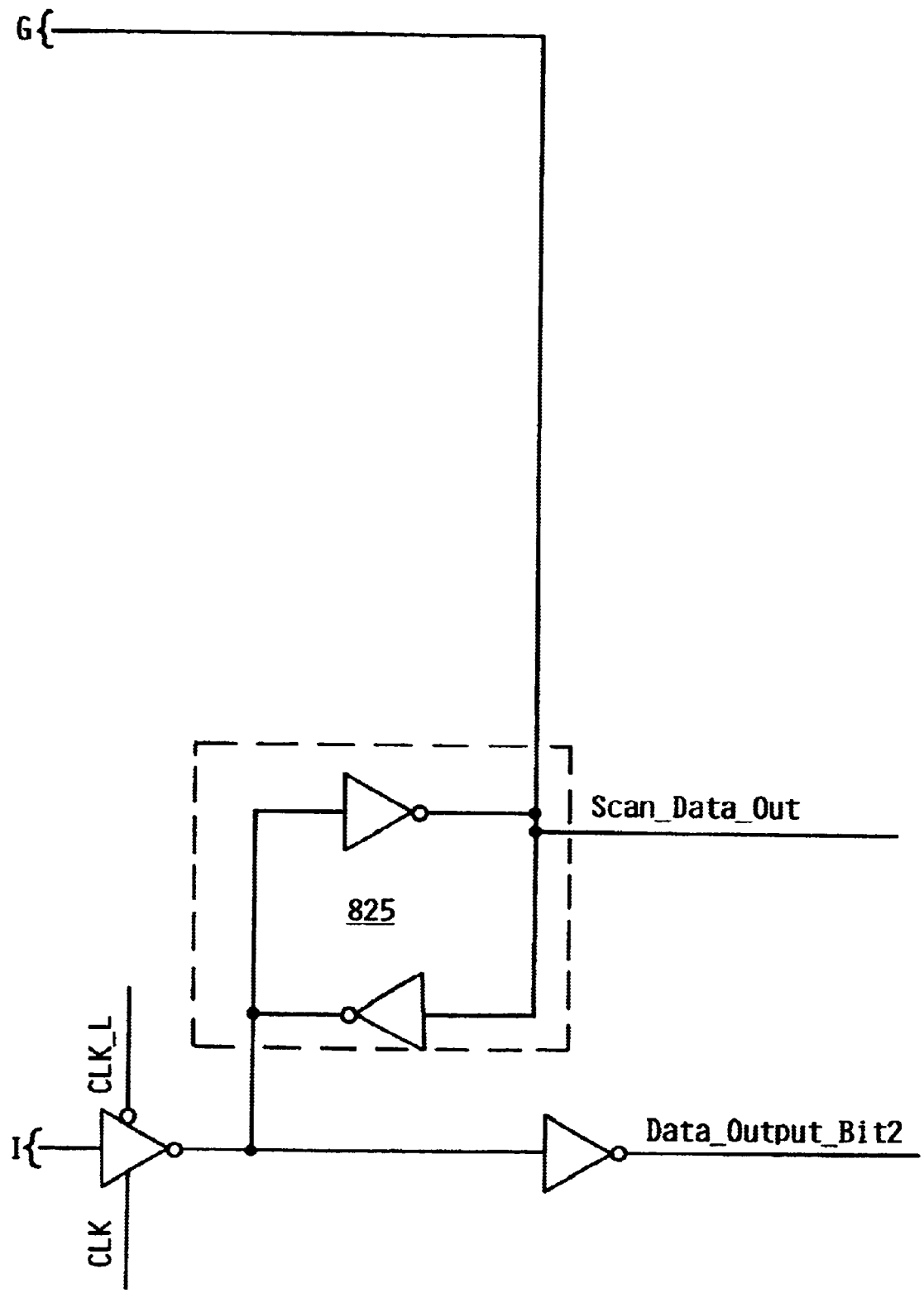
Figure 12I:
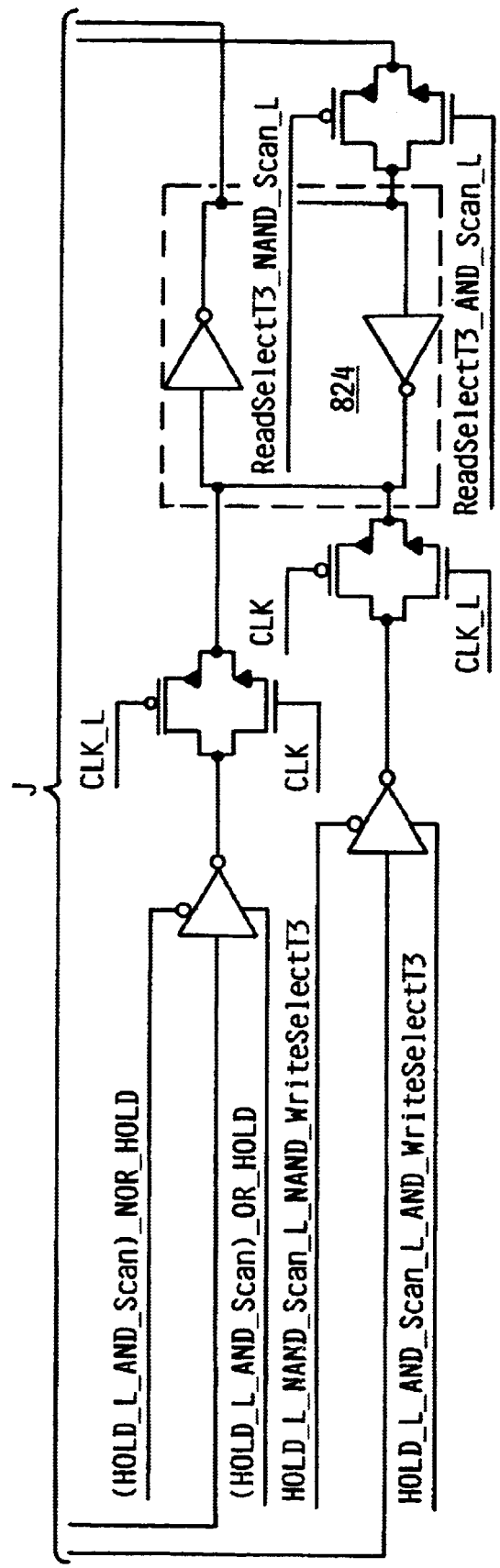

FIG. 11 illustrates this concept at a high level. FIG. 11 is the circuit of FIG. 8, in which the graphical arrangement of the memory elements has been changed for clarity of illustration, and feedback has been added. In FIG. 11, the normal operating mode has been superimposed upon the scan mode. For clarity, the scan mode connections are represented as double lines, to distinguish them from normal operating mode. In HOLD mode, the K0 and K1 elements take the same clock phase as they do in Scan mode, so that there is an equal number of K0 and K1 elements. A respective feedback line 1101–1105 is provided to each K0 element 801, 802, 804, 803, 821 in HOLD mode, the feedback lines receiving input from respective K1 elements 805, 823, 822, 824, 825, as shown.

FIG. 12 illustrates one embodiment of the high-level circuit of FIG. 11. FIG. 12 is essentially the circuit of FIG. 10B, to which feedback paths 1101–1105 have been added. As shown, each feedback path 1101–1105 is gated by the HOLD signal at a gated inverter. If HOLD is active, the value of the K1 element 805, 823, 822, 824, 825 will be fed back to the corresponding K0 element 801, 802, 804, 803, 821; no other conditions need be satisfied.

Various circuit embodiments have been shown in the figures, but it will be understood that there are a large number of possible permutations within the spirit and scope of the present invention. For example, various combinations of transmission gates, gated drivers, or other logic may be used to control and drive the input signals to the latch, of which those illustrated are only a sample. A multithreaded latch circuit may be constructed with or without scan path support, and a scan path may be different from that shown in the examples herein. A HOLD feedback loop may exist independently or in conjunction with scan logic.

Although a specific embodiment of the invention has been disclosed along with certain alternatives, it will be recognized by those skilled in the art that additional variations in form and detail may be made within the scope of the following claims:

What is claimed is:

1. A master-slave latch circuit for use in a multithreaded processor, comprising:

a plurality of master elements, each master element corresponding to a respective thread supported by said multithreaded processor;

selection logic coupled to the outputs of said master elements, said selection logic selecting a single one of said outputs of said master elements in response to a thread designation input; and a common slave element coupled to said selection logic and receiving as input the selected single one of said outputs of said master elements;

wherein said plurality of master elements function as master elements during a first mode of operation, and wherein at least one of said master elements functions alternatively as a slave element during a second mode of operation;

wherein when operating in said second mode of operation, said master-slave latch circuit is paired with another master-slave latch circuit, the total number of elements in the pair acting as master elements during said second mode of operation being equal to the total number of elements in the pair acting as slave elements during said second mode of operation.

2. The master-slave latch circuit for use in a multithreaded processor of claim 1, wherein said thread designation input designates the currently active thread of said multithreaded processor.

3. The master-slave latch circuit for use in a multithreaded processor of claim 1, wherein said second mode of operation is a scan mode of operation.

4. The master-slave latch circuit for use in a multithreaded processor of claim 1, wherein said second mode of operation is a hold mode of operation.

5. The master-slave latch circuit for use in a multithreaded processor of claim 1, wherein each said master element and said common slave element comprise a respective pair of inverters, the output of a first inverter of each pair driving the input of a second inverter of each pair, and the output of the second inverter driving the input of the first inverter.

6. A master-slave latch circuit for use in a multithreaded processor, comprising:

a plurality of master elements, each master element corresponding to a respective thread supported by said multithreaded processor, selection logic coupled to the outputs of said master elements, said selection logic selecting a single one of said outputs of said master elements in response to a thread designation input; and a common slave element coupled to said selection logic and receiving as input the selected single one of said outputs of said master elements;

wherein said plurality of master elements function as master elements during a first mode of operation, and wherein at least-one of said master elements functions alternatively as a slave element during a second mode of operation wherein said second mode of operation is one of the set consisting of: a scan mode of operation, and a hold mode of operation.

7. The master-slave latch circuit for use in a multithreaded processor of claim 6, wherein when operating in said second mode of operation, said master-slave latch circuit is paired with another master-slave latch circuit, the total number of elements in the pair acting as master elements during said second mode of operation being equal to the total number of elements in the pair acting as slave elements during said second mode of operation.

8. A multithreaded processor supporting concurrent processing of a plurality of threads, comprising:
   at least one register for storing data for each of said plurality of threads, said register comprising a plurality of master-slave latch circuits, each master-slave latch circuit comprising:
   (a) a plurality of master elements, each master element corresponding to a respective thread supported by said multithreaded processor;
   (b) selection logic coupled to the outputs of said master elements, said selection logic selecting a single one of said outputs of said master elements in response to a thread designation input; and
   (c) a common slave element coupled to said selection logic and receiving as input the selected single one of said outputs of said master elements;
   wherein said processor supports first and second modes of operation, and wherein said plurality of master elements function as master elements during said first mode of operation, and wherein at least one of said master elements functions alternatively as a slave element during said second mode of operation;
   wherein said second mode of operation is one of the set consisting of: a scan mode of operation, and a hold mode of operation.

9. The multithreaded processor of claim 8, wherein said thread designation input designates the currently active thread of said multithreaded processor.

10. The multithreaded processor of claim 8, wherein when operating in said second mode of operation, multiple master-slave latch circuits of said register are paired with each other, the total number of elements in a pair of master-slave latch circuits acting as master elements during said second mode of operation being equal to the total number of elements in the pair acting as slave elements during said second mode of operation.

11. The multithreaded processor of claim 8, wherein each said master element and said common slave element comprise a respective pair of inverters, the output of a first inverter of each pair driving the input of a second inverter of each pair, and the output of the second inverter driving the input of the first inverter.

12. The multithreaded processor of claim 8, wherein said multithreaded processor supports fine-grained multithreading.

13. The multithreaded processor of claim 8, wherein said multithreaded processor supports coarse-grained multithreading.

14. A multithreaded processor supporting concurrent processing of a plurality of threads, comprising:
   at least one register for storing data for each of said plurality of threads, said resister comprising a plurality of master-slave latch circuits, each master-slave latch circuit comprising:
   (a) a plurality of master elements, each master element corresponding to a respective thread supported by said multithreaded processor;
   (b) selection logic coupled to the outputs of said master elements, said selection logic selecting a single one of said outputs of said master elements in response to a thread designation input; and
   (c) a common slave element coupled to said selection logic and receiving as input the selected single one of said outputs of said master elements;
   wherein said processor supports first and second modes of operation, and wherein said plurality of master elements function as master elements during said first mode of operation, and wherein at least one of said master elements functions alternatively as a slave element during said second mode of operation;
   wherein when operating in said second mode of operation, multiple master-slave latch circuits of said register are paired with each other, the total number of elements in a pair of master-slave latch circuits acting as master elements during said second mode of operation being equal to the total number of elements in the pair acting as slave elements during said second mode of operation.

15. The multithreaded processor of claim 14, wherein said second mode of operation is a scan mode of operation.

16. The multithreaded processor of claim 14, wherein said second mode of operation is a hold mode of operation.

17. A multi-stage latch circuit for use in a multithreaded processor, comprising:
   a first stage having a plurality of first stage memory elements, each first stage memory element corresponding to a respective thread supported by said multithreaded processor, each said first stage memory element storing a state corresponding to a respective input at times determined by a first phase of a clock signal;
   selection logic coupled to the outputs of said first stage memory elements, said selection logic selecting a single one of said outputs of said first stage memory elements in response to a thread designation input; and
   a common second stage memory element coupled to said selection logic and receiving as input the selected single one of said outputs of said first stage memory elements, said common second stage memory element storing a state corresponding to said selected single one of said outputs of said first stage memory elements at times determined by a second phase of said clock signal, said second phase being different from said first phase;
   wherein said plurality of first stage memory elements store a state-corresponding to a respective input at times determined by said first phase of said clock signal during a first mode of operation, and wherein at least one of said first stage memory elements stores a state corresponding to a respective input at times determined by said second phase of said clock signal during a second mode of operation.

* * * * *